US005583762A

United States Patent [19]

Shafer

[11] Patent Number: 5,583,762

[45] Date of Patent: Dec. 10, 1996

[54] GENERATION AND REDUCTION OF AN SGML DEFINED GRAMMER

[75] Inventor: Keith E. Shafer, Columbus, Ohio

[73] Assignee: OCLC Online Library Center, Incorporated, Dublin, Ohio

[21] Appl. No.: 295,259

[22] Filed: Aug. 22, 1994

[51] Int. Cl.$^6$ .............................. G06F 17/22; G06F 17/27
[52] U.S. Cl. ............................................................ 395/794
[58] Field of Search ...................................... 395/700, 600; 364/419.1, 419.19

[56] References Cited

U.S. PATENT DOCUMENTS

| | | | |
|---|---|---|---|
| 5,079,700 | 1/1992 | Kozoll et al. | 395/700 |
| 5,140,052 | 8/1992 | Kozol et al. | 364/419.1 |
| 5,276,793 | 1/1994 | Borgendale et al. | 395/148 |
| 5,285,526 | 2/1994 | Bennett, III et al. | 395/100 |
| 5,293,473 | 3/1994 | Hesse et al. | 395/146 |
| 5,487,165 | 1/1996 | Tsay et al | 395/600 |
| 5,506,985 | 4/1996 | Motoyama et al. | 395/600 |

OTHER PUBLICATIONS

EPSIG News, 4(4):13, Winter 1992–1993.
ATLIS DTD Article, EPSIG News, Jun., 1992, pp. 10–11.
Robin Cover, SGML Annotated Bibliography and List of Resources, Jan. 1992, pp. 1–23.
Journal of Computing in Higher Education, Winter 1990, vol. 1(2), pp. 3–26, Steven J. Derose et al.
EPSIG News, May, 1988, p. 4.
EPSIG News 5(4):10–11, 1993.
EPSIG News 4(4):19–20, Winter 1992–1993.
EPSIG News, pp. 3–4, Dec., 1987.
Sandra A. Mainrak et al, "Chameleon: A System for Solving the Data–Translation Problem", IEEE Transactions on Software Engineering, vol. 15, No. 9, Sep. 1989, pp. 1090–1108.
Enk Naggum, "FAQ.O.O", Jan. 1992, pp. 1–6.
"SGML: A Usage Overview", Electric Documents vol. 9, No. 10, pp. 23–32.
Ludo Van Vooren, "Implementing SGML: Where Do You Start?", <TAG>: The SGML Newsletter, Issue 13 Feb. 1990, pp. 5–7.
Haviland Wright, "SGML Frees Information", Byte, Jun. 1992, pp. 279–287.
Erik Naggum, "SGML General Information", Jan. 1992, pp. 1–3.

Primary Examiner—Paul V. Kulik
Attorney, Agent, or Firm—Mueller and Smith, LPA

[57] ABSTRACT

A method for generating a grammar for a collection of sample documents or records which are marked up under the SGML language. Once completed, the grammar is reduced to provide a document type definition (DTD). In constructing the initial or large corpus grammar, SGML tags are extracted and missing tags are accounted for. The tags then are matched to develop a tag structure from which a corpus grammar is built. Utilizing a sequence of reduction procedures, the corpus grammar is reduced.

43 Claims, 25 Drawing Sheets

GENERATION AND REDUCTION OF AN SGML DEFINED GRAMMER

BACKGROUND

Storing document-based information in the memory of a computer installation requires a predesigned system of document order or control. Developing such order is a science of software referred to generally as a database management system (DBMS). DMBSs store information as records carrying facts as to document content and structure. Retrieving information from a collection of records, such as a database, differs among system designers. Document-based databases traditionally have been stored in a hierarchy that resembles an inverted family tree with relationships of root, or parent, child and the like. Alternately, a network database, while resembling a hierarchical model, establishes links between various levels of one or more tree structures. A popular system typically employed with spreadsheet forms of programs is a relational database.

In order to develop a document type hierarchically designed database, it is necessary to compile and simplify information as to document structure. This information can be called a grammar or document type definition (DTD). Creating a DTD is non-trivial, substantial effort and corresponding cost being invested in their development. For example, one major database service organization developed over 10,000 DTDs representing over 10,000 different types of documents in building its databases. Their creation often has been compared to writing a computer program. See generally, the following publications:

(1) Joan Knoerdel, SGML is more than generic coding, *EPSIG News*, pp 3–4, December, 1987

(2) SGML: A usage overview. *Electronic Documents*, 2(10:23–32

(3) Editor's rebuttal. *EPSIG News*, p. 4, May 1988

(4) Ludo VanVooren, Implementing SGML: Where do you start? <TAG>, *The SGML Newsletter*, pp 5–7, February 1990

Several vendors now offer consulting services to write and maintain DTDs.

The hierarchical DTD, in general, is a condensed assemblage of AND, OR, and element rules functioning to identify document structure elements including, for example, title, author, and paragraph. These structural components typically are identified or "marked-up" utilizing a somewhat complex meta-language referred to as Standard Generalized Mark-up Language or "SGML". Utilizing SGML methodology, document publishers insert start and end tags to identify the structural components of the documents they publish from electronic media. Text material similarly is identified. Without such tagging, only human intervention and reading of the "raw" text will find the structural components such as author, title, and the like. With SGML techniques, a start tag typically is formed of a < symbol followed by a tag name which, in turn, is followed by a > symbol. Correspondingly, the end tag has the same structure with the addition of a slash following the < symbol. An example of a simple SGML mark-up may be shown as follows:

```
<record>
<name>Keith Shafer</name>
<title>Research Scientist</title>
<mailcode>MC 410</mailcode>
<ext>x5049</ext>
</record>
```

The corresponding grammar for the above tagged material is as follows:

| <RECORD> | ::= | (<NAME><TITLE><MAILCODE><EXT>); |
|---|---|---|
| <NAME> | ::= | <#PCDATA>; |
| <TITLE> | ::= | <#PCDATA>; |
| <MAILCODE> | ::= | <#PCDATA>; |
| <EXT> | ::= | <#PCDATA>; |

Note that adjacent to the identification of record there are the ANDed grammar elements, name, title, mailcode, and extension. Components containing text are tagged, for example, with the notation: "PCDATA". A large grammar or a compilation, described heroin as a "corpus grammar" may have thousands of rules and hundreds of grammar elements. Even though the corpus grammar is so extensive, it is still of value to those needing to develop a reduced grammar or DTD.

The SGML standard is available as:

(5) Information processing—text and office systems—standard generalized markup language (SGML). International Organization for Standardization. Ref. No. ISO 8879-1986., September 1969.

Several overviews of SGML, SGML resources and related textual needs are available. See, for instance:

(6) Steven J. DeRose, David G. Durand, Elli Mylonas, and Allen H. Renear. What is text, really? *Journal of Computing in Higher Education*, 1(2):3-26, 1990.

(7) Michael Farrell. Text markup, SGML, and text databases. *EPSIG News*, 5(4):19-20, 1993.

(8) Erik Naggum. Sgml Faq.0.0. ftp://ftp.ifi.uio.no/pub/SGML/FAQ.0.0, January 1992

(9) Erik Naggum. SGML general information. ftp://ftp.ifi.uio.no/pub/SMGL/general-info, January 1992

(10) Haviland Wright. SGML frees information. *Byte*, pp 279–287, June 1992

Several books have been written about SGML, a more popular one of which is:

(11) Eric van Herwijnen. *Practical SGML*. Kluwer Academic Publishers, Boston/Dordrecht/London, second edition, 1994

The reader's attention additionally is directed to a bibliography of SGML papers, books, products and the like, which also include abstracts/opinions and many of the listed items.

This bibliography is identified as:

(12) Robin Cover. Standard Generalized Markup Language ISO 8879:1986 (SGML) annotated bibliography and list of resources. ftp://ftp.ifi/uio.no/pub/SGML/bibliography, January, 1992

A DTD of the corpus grammar shown above may be provided as follows:

| <!DOCTYPE RECORD[ | | |
|---|---|---|
| <!ELEMENT RECORD | -- | (NAME, TITLE, MAILCODE, EXT)> |
| <!ELEMENT NAME | -- | #PCDATA> |
| <!ELEMENT TITLE | -- | #PCDATA> |
| <!ELEMENT MAILCODE | -- | #PCDATA> |
| <!ELEMENT EXT | -- | #PCDATA> |

3
-continued

```
<!ENTITY #DEFAULT "          *** UNDEFINED ENTITY
                                  REFERENCE***">
```

From the foregoing, substantial relief in terms of labor requirements and costs can be foreseen in the electronics information industry with the development of a technique for automatically generating a corpus grammar and then additionally for reducing the extent of the corpus grammar or an overly extensive DTD to a grammar of practical size.

SUMMARY

The present invention is addressed to a method for generating a grammar for a collection of sample document records and to a process for reducing the number of rules of such grammars with substantial improvement in efficiency, cost, and speed. In generating a corpus or sample grammar, the start and end tags, for example, SGML tags, are extracted from samples of the document records to create what is termed herein as a tag list. A matching procedure then is carried out wherein each start tag of the list is matched with a corresponding end tag, such matching serving to identify a tag structure of grammar elements with a parent-child pairing. A unique utilization of a computer stack is employed to derive the hierarchical parent-child relationships of the resultant tag structure. The grammar elements represented by the matched tags of the tag structure then are accumulated as corresponding rules exhibiting hierarchical tree structures representing a sample grammar.

While development of the sample or corpus grammar is a valuable aspect of the invention, further procedures may be employed to reduce or condense its size. This reduction acquires and operates discretely upon each grammar element of the hierarchical tree structure. Then, a determination is made as to whether each such acquired grammar element is combined with a rule of a given form of tree structure. Where that is the case, then any of a selected sequence of reduction procedures from a reduction guide assemblage of such procedures is applied, each of the sequence of procedures being designed to aid in the carrying out of a next subsequent procedure. In general, these procedures remove any subrule of the rule established with the grammar element where such subrule is not required. The identification and sequence of these reduction procedures are, for example, as follows: single and empty reduction; collapse ANDs, collapse ORs; a repeating reduction; PCDATA to ORs reduction; identical bases reduction, off-by-one reduction; other reduction; and redundant reduction.

Another feature of the invention is to provide a method for generating a corpus grammar for a collection of document records with grammatical structure components identified by start and end tags, which comprises the steps of:

extracting the start and end tags from samples of the records and forming a tag list therefrom;

matching each start tag of the list with a corresponding end tag with respect to each of the records to derive matched tags. These matched tags represent a tag structure of grammar elements paired in a parent-child defined relationship; and accumulating the grammar elements represented by the matched tags of the tag structures as corresponding rules substantially exhibiting hierarchical tree structures to establish a corpus or sample grammar.

Another feature of the invention is to provide a method for reducing the number of rules of a sample grammar present as an electronic compilation of grammar elements associated as AND and element rules within a hierarchical document describing tree structure which comprises the steps of:

(a) acquiring a grammar element with a rule, R, of a given type of the tree structure from the sample grammar;

(b) applying a reduction guide selected reduction procedure to the rule R and subrules thereof of the acquired grammar, (c) removing any subrule when the applied reduction procedure has eliminated them from the rule R of the acquired grammar element; and (d) acquiring a next grammar element and reiterating the aforesaid steps a–c.

The invention further features a method combining the above two procedures of generating a grammar and then reducing it to derive a DTD of efficient and practical size.

The invention, accordingly, comprises the method possessing the steps which are exemplified in the following detailed disclosure.

For a fuller understanding of the nature and objects of the invention, reference should be had to the following detailed description taken in connection with the accompanying drawings.

DETAILED DESCRIPTION

Figure 1:
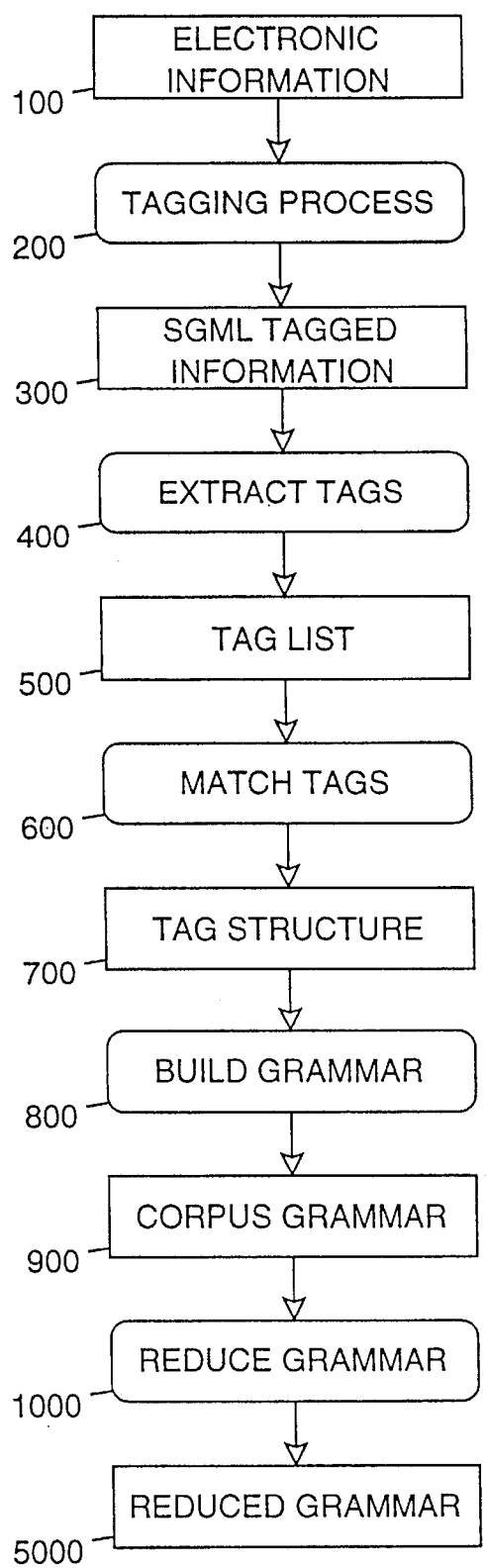
FIG. 1 is a block diagram showing a method for developing a tag list, forming a tag structure, forming a corpus grammar and reducing the grammar according to the invention.

Referring to FIG. 1, a general overview of the process of the invention is illustrated in block diagrammatic form. In general, the grammar builder will receive document or text material in electronic form as represented at block 100. For the most part, this electronic information will have been tagged by procedures which may have been essentially carried out by hand, but usually are developed by a software-based translation system. This tagging process is represented at block 200 and, preferably, the result of the tagging process as identified at block 300 is an SGML tagged body of information which, for the purpose of the invention, will have a sampling size. That sampling size may vary depending upon the diversity of documents encountered in any record collection. As is apparent, for most databases, the number of records involved will be one of essentially continuously increasing number. Thus, the sample should be of adequate extent so as to remain valid for the anticipated record collection. At this juncture, the electronic information is tagged but there is no grammar or DTD describing the documents involved. Next, as represented at block 400, the documents are opened electronically and the tags are extracted into a list That tag list is represented at block 500.

As represented at block 600, the tag list then is examined to assure that the sequence of tags is adequate to define a structure. For example, an error may occur where a start tag is not followed by or matched with an end tag. Keeping in mind that there is no DTD to define the sample document structure, the matching tags procedure determines whether an aberration should be ignored, a tag added, or the like, in order to generate a tag structure. That tag structure is represented at block 700. This tag structure 700 is a specific instance of a document and examining it, one may perceive sequences such as: author-title--paragraph-paragraph--paragraph. Another document record might show: author--title--paragraph-paragraph--paragraph--paragraph--paragraph. These specific instances of document structure then are combined into a relatively large general structure as represented at block 800. This construction will change the noted specific instances into rules, for example, AND rules, OR rules or element rules as have been logically perceived from the tag structure sequences. These rules or grammar elements typically will be extensive in number, all of the rules developed from all of the documents or records being present within a corpus grammar or sample grammar as represented at block 900. Generally at this position in the process, the rules will be element rules or AND rules, and the procedures which follow provide for reducing or condensing the number of these rules to reduce the corpus grammar as represented at block 1000. This reduction process can be used for other applications, for example, building a database interface or reducing further a preexisting DTD. Ultimately, as represented at block 5000, a reduced grammar or DTD is evolved essentially as an automatic process from the originally produced sample document grouping.

Figure 2:
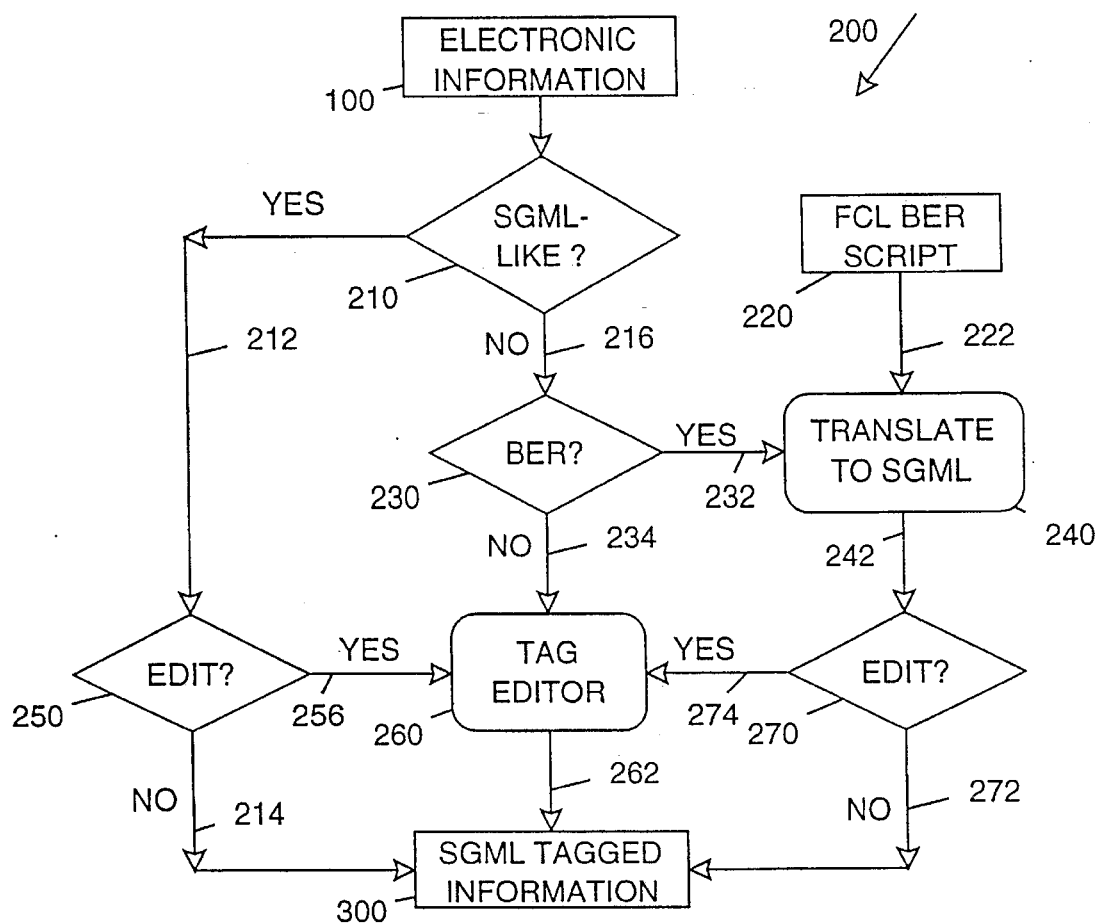
FIG. 2 is a block diagrammatic representation of a method for generating SGML tagged information which is employed with the process of the invention.

Referring to FIG. 2, a block diagrammatic representation of the tagging process discussed in connection with FIG. 1 at block 200 is revealed and represented again in general at 200. The diagram reproduces block 100 representing a sampling of electronic information or electronically retained documents or publications. The goal is to assure that the information 100 is tagged in SGML format. A variety of techniques can be employed for this purpose, certain being commercially available. With this procedure, as represented at block 210, a determination is made as to whether the information at 100 is SGML-like. If the information does appear to be of an SGML tagged variety, then as represented at line 212 and block 250, a determination is made as to whether it is desirable or necessary to edit the information to assure SGML compliance. Where that is not required, then as represented at line 214, the information 100 is deemed to be properly SGML tagged information as represented by block 300 which reappears from FIG. 1.

Where the inquiry at block 210 reveals that the electronic information is not SGML-like, then as represented at line 216 and block 230, an inquiry, for example, can be made as to whether another form of tagging is present, for example, whether it is of a BER variety. The BER system is a fairly standard version of a conventional tagging arrangement referred to in industry as ASN.1. In the event of an affirmative determination at block 230, then as represented at line 232, the BER records are translated to SGML standards. To carry out this translation, typically a format control language (FCL) is employed as represented at block 220 and line 222. Following the translation represented at block 240, then as represented at line 242 and block 270, a determination again is made as to whether editing is called for. In the event that it is not, then as represented at line 272 and block 300, the electronic information is now deemed to be translated to SGML mandated format, and SGML tag information is present. Where the determination at block 270 is that editing should take place, then as represented at line 274 and again at block 260, user-interactive editing is carried out. As represented at line 262, following such editing, the SGML tagged information then is present again as represented at block 300. Where the inquiry at block 230 results in a negative determination, then tag editing is necessary as represented at line 234 and block 260.

Figure 3:
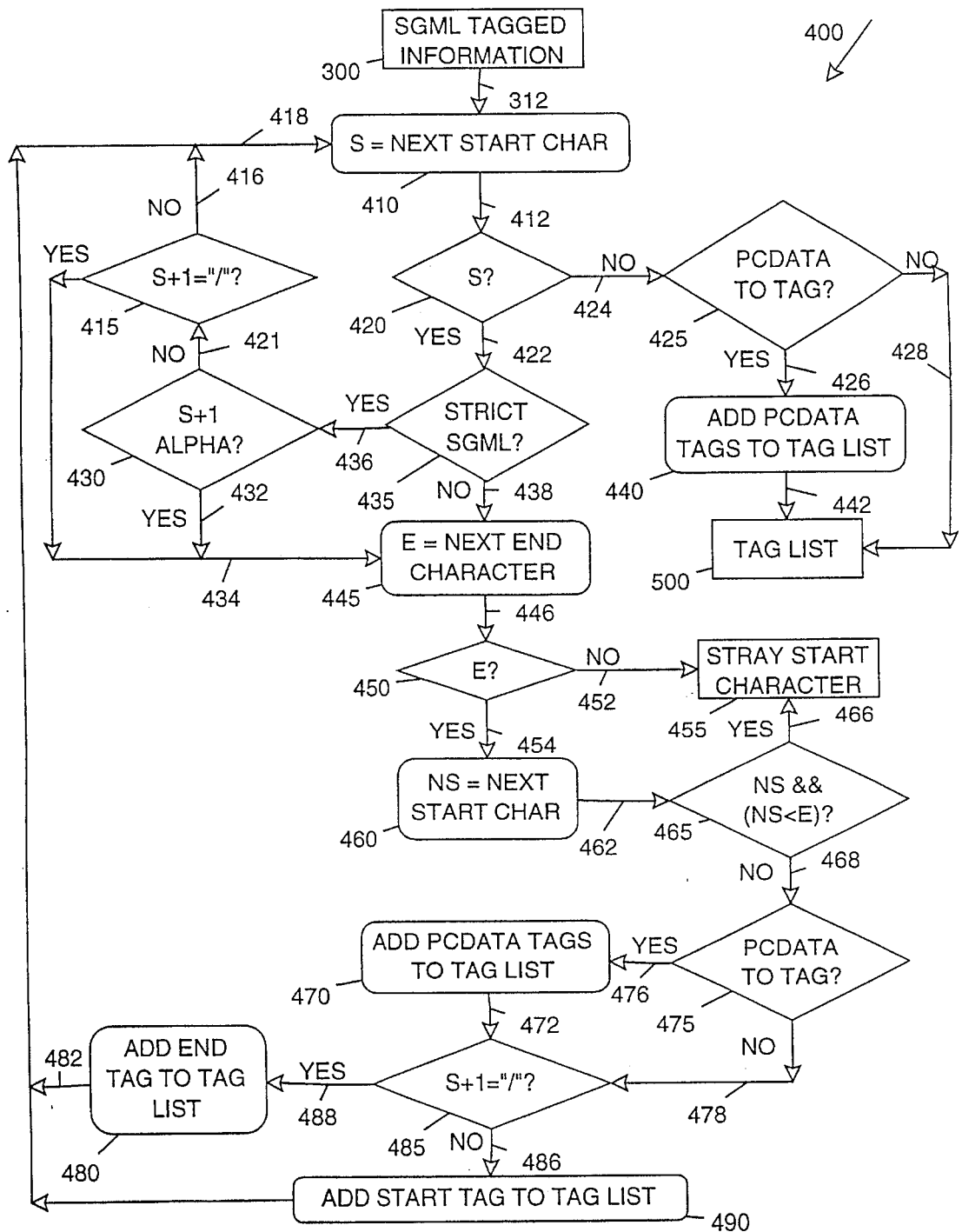
FIG. 3 is a flow chart showing the method according to the invention for extracting tags from SGML tagged information.

Turning to FIG. 3, block 300 representing the presence of properly tagged SGML information reappears in conjunction with a flow chart represented generally at 400 in consonance with the identification of block 400 of FIG. 1 describing the technique for extracting tags. This procedure 400 commences as represented at block 410 wherein the variable S is designated as a next start character. It may be observed that the procedure at this stage will look for a character which will be present as a < sign as opposed to an entire tag. The method will continue to look for start characters until they are no longer found, at which point it may be assumed that the document or record at hand is ended. Accordingly, as represented at line 412 and block 420, a determination as to whether a first start character, i.e. a < sign is present. In the event that it is, then as represented at line 422 and block 435, a determination is made as to whether the start character is within the criteria of being present in strict SGML format. The SGML language has strict rules as to what a tag name can be. For example, the presence of numerical information such as 1, 2, 3 immediately after the < symbol representing. the start character would be invalid. In this regard, the numerical information following the < symbol would indicate that the < symbol is not a component of a tag but is indeed a "less than" symbol or character. Thus, as represented at line 436 and block 430, a determination is made as to whether that character which follows the start character S is a character of the alphabet. If it is, then as represented by lines 432 and 434 as well as block 445, a start character is deemed to be present and the program commences to determine the presence of an end character by setting the variable E as the next end character. Where the inquiry at block 430 determines that the next character following S is not an alphabetical character, then as represented at line 421 and block 415, a determination is made as to whether the character next following the start character is a slash mark. It may be recalled that the slash mark is the second character of an end tag. Thus, where an affirmative determination is made at block 415, then as represented at line 434 and block 445, the program commences to set the variable E as the next end character. However, where no slash mark is present as the second character, then the determination at block 415 is in the negative and the program reverts as represented at lines 416 and 418 to the setting of the variable S as the next start character at block 410.

Returning to block 435, where the program is not looking for strict SGML compliance, then, as represented at line 438 and line 445, the program commences to look for the next end character which will be a > symbol. Block 445 also is accessed as noted above in connection with block 415 and line 434 when a tag start character component has been located. With the setting of E as the next end character, then as represented at line 446 and block 450, a determination is made as to whether a next end character is present as a match for the located start character. Where the determination as to that query is in the negative, then as represented at line 452 and block 455, an indication is present that a stray start character is in existence. In general, the user will be told that the stray start character is present and a call, for example, for manual intervention is made. Where an affirmative determination is made with respect to the query posed at block 450, it is necessary for the program to assure that a start character and an end character match or belong to the same tag. In this regard, for example, if a start character is followed by another start character which, in turn, is followed by an end character an invalid or stray start character still is at hand. Accordingly, as represented at line 454 and block 460, the variable NS is set as the next start character. Then, as represented at line 462 and block 465, the logical ANDing condition is tested as to the presence of a next start tag, NS, and a determination is made as to whether the location of that start character is to the left or is of lesser value than the position or value of the end character, E. Where that condition is true, then as represented at line 466 and block 455, an alert is published that a stray start character is at hand. However, where the determination at block 465 is in the negative, then as represented at line 468 and block 475, the program has found that a matched start and end character are present. As tags are found, the location of the previous tag is known. If the previous tag is not adjacent to the current tag, then there is text between the tags. This text is marked as PCDATA—borrowing from SGML terminology. Accordingly, that text material is then to be identified by the tag, "PCDATA". With an affirmative determination at block 475, as represented at line 476 and block 470, PCDATA tags are added as text identifying tags to the tag list being generated and described earlier at block 500. The program then proceeds, as represented at line 472 to block 485. Block 485 also is accessed with a negative determination at block 475 as represented at line 478. At block 485, the earlier-noted determination is made as to whether a slash mark is next adjacent the start character. If it is not, then as represented at line 486 and block 490, a start tag is added to the tag list earlier described at block 500 and the program loops as represented at line 418 to block 410 in search of a next start character. Where a slash mark has been located next to the start character in connection with the query posed at block 485, then as represented at line 488 and block 480, an end tag is present and an end tag is added to the tag list. The program then loops as represented at fines 482 and 418 which are directed to block 410.

Returning to block 420 and the question as to whether a next start character is present, in the event of a negative determination, then as represented at line 424 and block 425, a further determination needs to be made as to whether there is text at the end of the last tag. That text is marked with the text identifying tags, PCDATA and, as represented at line 426 and block 440, PCDATA tags are added to the tag list. Correspondingly, with a negative determination at block 425, as represented at line 528, the tag list is completed. Similarly, upon the adding of PCDATA tags to the tag lists in connection with block 440, as represented at line 442, the tag list earlier described at 500 is completed as set forth by the representation of block 500 in the instant figure, all tags having been extracted.

In summary, the foregoing tag extraction process is one wherein start characters and end characters are sought in a manner assuring they are matched to the extent that stray characters are identified for intervention. The name of the tag is between the start and end characters, and a determination has been made as to whether an end tag is present by virtue of the first Character in the name being a slash. Finally, the program has looked to determine whether there is text around the tag that was found, and that text is marked PCDATA. The program thus knows where the text is and knows where the tags are.

Figure 4:
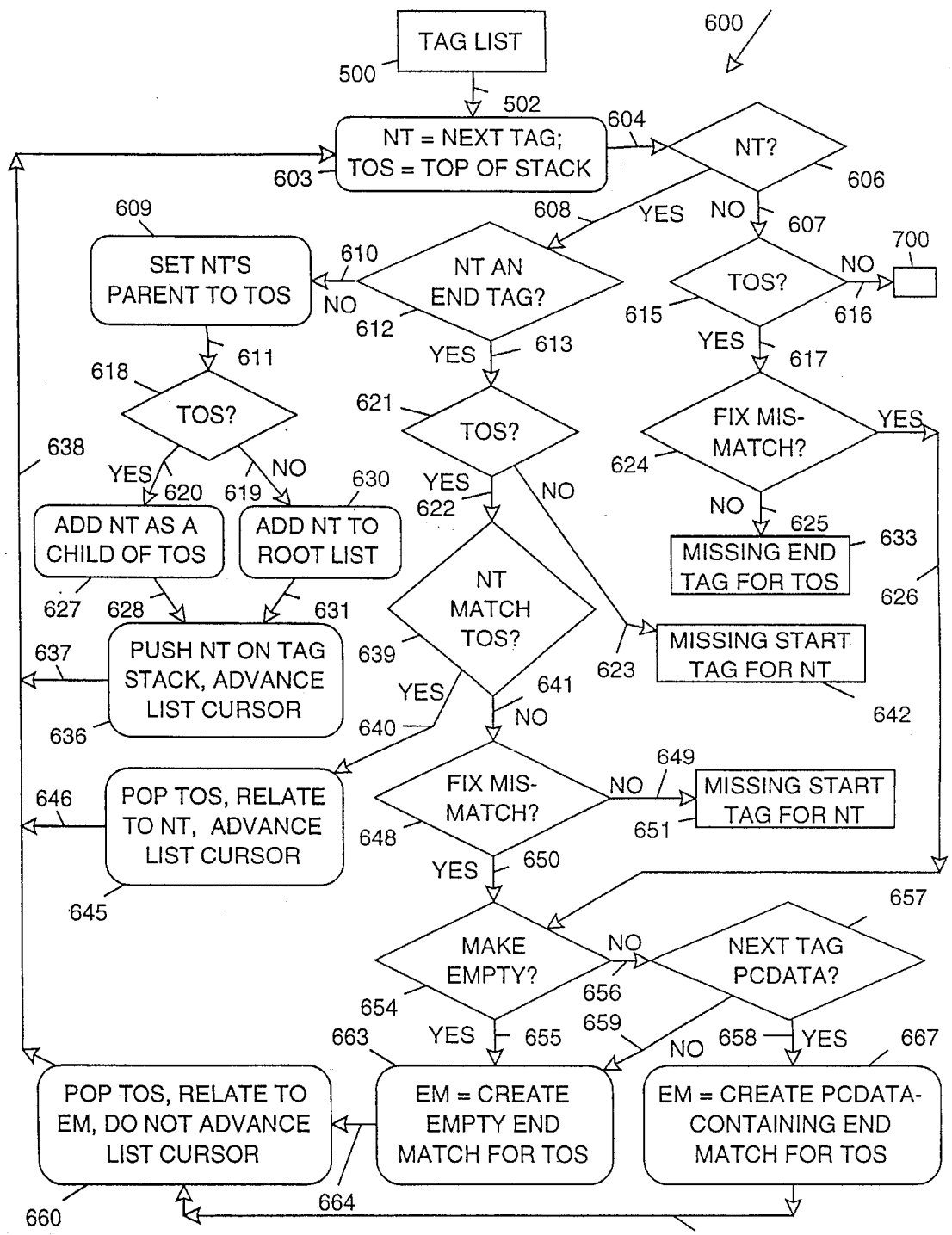
FIG. 4 is a flow chart showing the method for matching tags from a tag list in accordance with the method of the invention.

Referring to FIG. 4, the tag matching process described in connection with FIG. 1 at block 600 is revealed in enhanced detail and is identified in general by that same numeration. The matching tag procedure performs in conjunction with the tag list developed as described in connection with FIG. 3 and block 500 representing the tag list reappears in FIG. 4. In general, the tag matching procedure is one wherein start tags are placed on a stack, a computer arrangement wherein the fast item placed in or "pushed" onto the stack is the first item removed, and end tags are used to match against the top item on the stack, causing the item at the top of the stack to be removed or "popped" from the top of the stack. Thus, the stack feature of the computer is used to carry out the present matching procedure. The process additionally looks to a failure of achieving a match, as well as to a commencement of-the development of a hierarchical (tree) structure.

In FIG. 4, line 502 is seen directing the program as block 603 which sets the variable NT as the next tag and the variable TOS to the top of the stack. Then, as represented at line 604 and block 606, a determination is made as to whether a next tag is available. In the event that it is available, then as represented at line 608 and block 612, a determination is made as to whether NT is an end tag. In the event that it is not, then it is a start tag which will be placed upon the stack. Accordingly, in the event of a negative determination with respect to the query posed at block 612, then as represented at line 610 and block 609, the procedure sets the next tag is parent as the top of the stack. The tag on the top of the stack is NT's parent. Thus evaluation as a structural tree is commenced to be carried out; and this is the first step in evaluating how deep within the document structure the present tag is. In effect, structure commences to be developed by the simple expedient of looking at the top of the stack. Then, as represented at line 611 and block 618, a determination is made as to whether a tag is present at the top of the stack. If there is no tag at the top of the stack, then the present tag is, as represented at line 619 and block 630, a root tag. Thus, as shown in block 630, this next tag is added to a root list. It may be observed that the heirarchical structure under development may have many trees or there is a "forest" with no single root to all trees. In the presence of a single root, the root list will have only one entry in it. The program accumulates this mot list for all tags that have no parent structure. Additionally, as represented at line 620 and block 627, where a component is at the top of the stack then NT is added as a child of the top of the stack component, and the parent-child relationship thus is completely established. With the completion of the structure identification in conjunction with blocks 627 and 630, then as represented by respective lines 628 and 631 leading to block 636, the NT identified tag is pushed onto the stack and the list cursor is advanced. Then as represented at lines 637 and 638, the program loops to block 603 and continues.

Returning to the inquiry at block 612, where the next tag is an end tag, then as represented at line 613 and block 621, a query is made as to whether a component is present at the top of the stack. In the event there is a tag allocated to the top of the stack, then as represented at line 622 and block 639, a determination is made as to whether that end tag matches the tag at the top of the stack. In the event that it does, then as represented at line 640 and block 645, the top of the stack tag is popped and related to the end tag NT, and the list cursor is advanced. The program then loops to block 603 and continues as represented by lines 646 and 638.

Returning to block 621, where no tag is present at the top of the stack, then as represented at line 623 and block 642, the operator is advised that a missing start tag is present for the end tag in question. The user can then take such action as is deemed appropriate. On the other hand, where the determination at block 621 is that the start tag at the top of the stack is present and the query posed at block 639 determines that the end tag does not match the start tag at the top of the stack, then as represented at line 641 and block 648, a determination is made as to whether the user wishes to fix the mismatch automatically or intervene, for example, interactively. Where an automatic fixing of this mismatch is rejected, then as represented at line 649 and block 651, the operator may be alerted as to the presence of a missing start tag. It may be recalled that in connection with FIG. 3, pointers were retained for the text that indicates where all tags come from. The system can take the user to the specific tag which is missing an end tag for evaluation. Where the program has been set to provide for a Somewhat automatic fixing of the mismatch, then as represented at line 650 and block 654, a query is made as to whether the program is to create an empty end tag as a correction and match for the top of the stack tag. Where that correction is to be carried out, then as represented at line 655 and block 663, an empty end tag, identified as the end match variable, EM, is created which is located adjacent the start tag at the top of the stack. The program then continues as represented at line 664 and block 660 where the tag at the top of the stack is related to the end match tag, however, it may be observed that the list cursor is not advanced. The program then continues as represented at line 638.

Returning to block 654, where the program has determined not to cream an empty tag, then as represented at line 656 and block 657, a determination is made as to whether the next tag in the list is PCDATA. If it is, then the program incorporates all of the PCDATA tagging and places an end tag after it. Accordingly, in the event of an affirmative determination with respect to the query posed at block 657, then as represented at line 658 and block 667, the end match is developed as a PCDATA containing end match for the top of the stack. The program then continues as represented at line 668 and block 660 to loop to block 603. Where the text at block 657 fails, then as represented at line 659 and block 663, an empty end match is created.

Returning to block 606, where no next tag is located in the list, then as represented at line 607 and block 615, a query is made as to whether any tag remains at the top of the stack. In the event that no such tag is present, then the program is completed and as represented at line 616, the process will have completed the tag structure as represented in FIG. 1 at block 700, and represented in the present figure by a block carrying the same identifying numeration.

Where a tag component is present at the top of the stack and no further tags are available, then the response at block 615 will be in the affirmative and the program proceeds as represented by line 617 and block 624. At block 624, the same query as posed at block 648 is made inquiring as to whether this mismatch or stray start tag could be fixed. If the program is set to a negative response, then as represented at line 625 and block 633, the user is advised of the presence of a missing end tag for the start tag at the top of the stack. Where the program is set to fix the mismatch with respect to the query at block 624, then, as represented by line 626, the program carries out the correcting procedures commencing with block 654 as earlier described, the text at block 657 failing.

Figure 5:
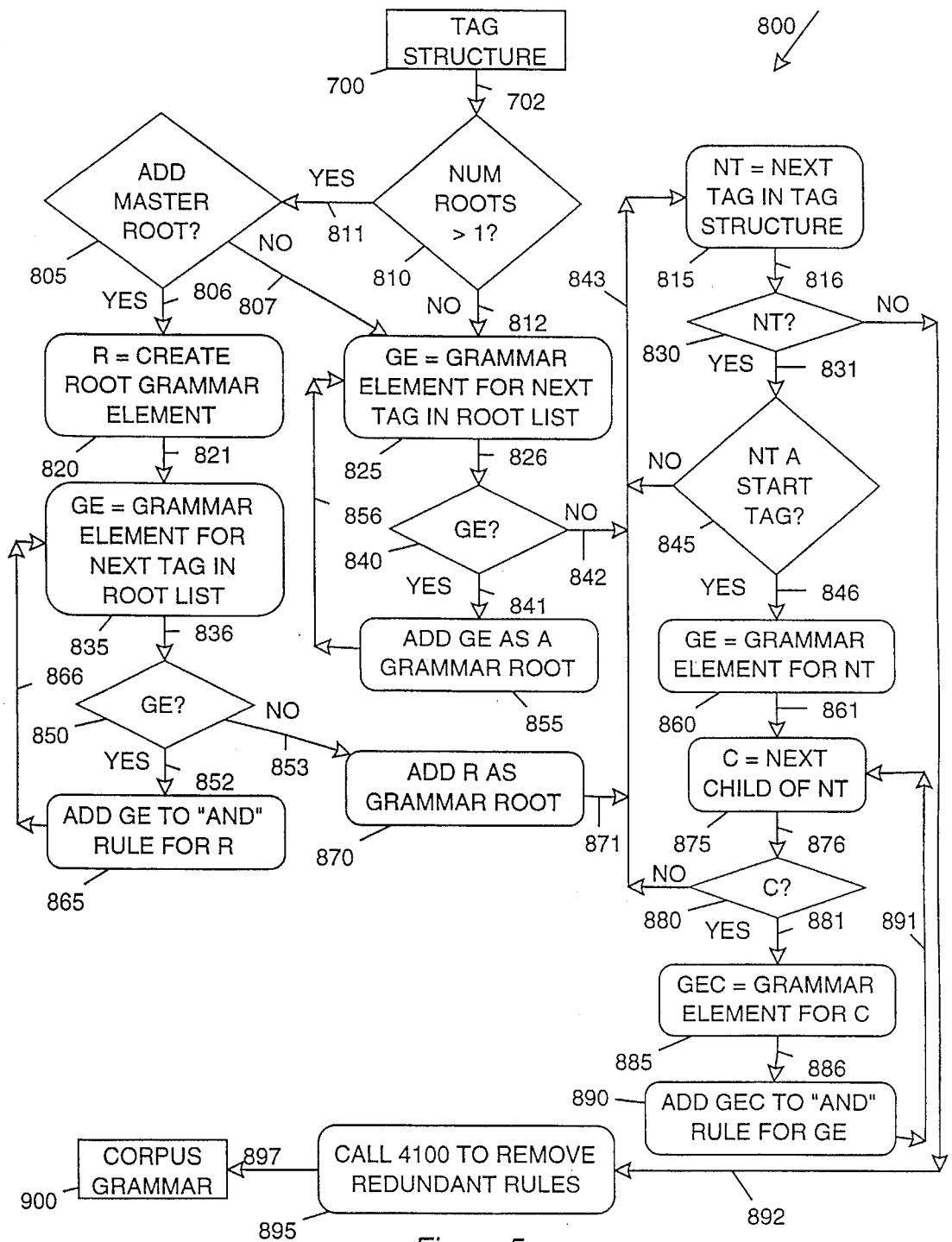
FIG. 5 is a flow chart showing a technique for building a grammar from a tag structure in accordance with the invention.

As discussed in connection with FIG. 1, where the tag structure is identified, the program then commences to build a sample grammar or corpus grammar as discussed in connection with block 800. Referring to FIG. 5, the grammar building procedure is illustrated in enhanced detail under the general numeration 800 as repeated from FIG. 1. The tag structure at block 700 reappears from FIGS. 1 and 4 with the same identifying numeration. Tag structure 700 was developed from each specific instance of a record or document. As a consequence, the same tags can reoccur in numerous instances, for example the tag identifying a paragraph might occur hundreds of times. In building a corpus grammar, grammar elements are developed with rules, for example AND rules and element rules, based upon the parent-child structures identified in the course of creating the tag structure 700. In this sample grammar, all of these parent-child relationships or rules are related uniquely together. In general, it is preferable that all of the rules be accumulated under one root of the heirarchical structure. Accordingly, as represented at lines 702 and block 810 of FIG. 5, the program determines whether the number of entries in the root list as generated in conjunction with block 630 of FIG. 4 is greater than 1. In the event of an affirmative determination, then as represented at line 811 and block 805, a master root is added. As an example, the root list may contain a sequence of tags such as "document"—"document"—"document". A master root to these multiple document tags might be called "file" and would AND all of the document tags. Accordingly, with an affirmative determination to add a master root at block 805, then as represented at line 806 and block 820, the variable R is set as creating a root grammar element. Then, as represented at line 821, the variable GE is set as the grammar element for the next tag within the root list. This is for the purpose of creating a rule for each element that is present in the root list. Accordingly, as represented at line 836 and block 850, a query is made as to whether a grammar element is present in the root list. In the event that such tag is present in the root list, then as represented at line 852 and block 865, the grammar dement is added to the rule for R, the root being created in conjunction with block 820. In effect, the process is creating parent-child relationships between all those previous roots and the new master root created in conjunction with block 820. Thus, block 865 provides for adding GE to the AND rule for R. This portion of the program then loops as represented at line 866 to acquire all of the grammar elements, GE.

Returning to blocks 805 and 810, where a negative determination is made with respect to either of the queries posed therein, then as represented by respective lines 807 and 812, the program is directed to a procedure commencing at block 825. Where the determination at block 810 is that the number of root tags is not greater than 1, then the variable GE or grammar element is set for that tag. The program then proceeds as represented at line 826 and block 840 to the inquiry as to whether a grammar element is present in the root list. In this case of a single tag in the root list, then the determination will be in the affirmative, and as represented at line 841 and block 855, GE is added as a grammar root, and the program loops as represented at line 856. In the next iteration, the test at block 840 will fail and the program will then continue as represented at lines 842 and 843. Where the instructions at block 825 are accessed from line 807, the user will have determined that the utilization of multiple root tags is acceptable. With this arrangement, the test at block 840 and instructions at block 855 will, in effect, consider in a looping manner all of the root list tags and mark them all as grammar roots. Thus, the grammar has many roots or start symbols. On the other hand, where a master root has been created in conjunction with the test at block 805, then, with a negative determination at the test represented at 850 and line 853, the master root, R, is added as the grammar root as shown at block 870 and the program proceeds to line 843 as represented by line 871. Thus, with either the master root from line 871 or the singular root tag or multiple root tags from line 842, the program then proceeds as represented at line 843 and block 815 to process the tags in the tag structure. It may be recalled that at this juncture in the process, the tag structure is totally matched up. Accordingly, the variable NT is set to the next tag in the tag structure as represented at block 815. Then, as shown at line 816 and block 830, a determination is made as to whether a next tag is present. Where the determination is in the affirmative, then as represented at line 83 1 and block 845, a determination is made as to whether the tag NT is a start tag. It may be recalled that the parent-child relationship was identified for the start tags in conjunction with the building of the tag structure as discussed in conjunction with FIG. 4. Accordingly, in the presence of an affirmative determination with respect to block 845, as represented at line 846 and block 860, a grammar element, GE, is obtained for this tag, NT. This is to assure that the tag is unique in the grammar structure. If it is already in the grammar at this point in the process, a unique grammar element is used. For example, if a paragraph tag appears 100 times, there is a unique grammar element which is called paragraph. Then, as represented at line 861 and block 875, since the start tag is marked to identify all of the children thereof, the next child of that tag is acquired. In this regard, the variable C is set to the next child of NT. Then, as represented at line 876 and block 880, a determination is made as to whether such child identification is present. If it is, then as represented at line 881 and block 885, the grammar element child, GEC variable, is set to the grammar element for C. Then, as represented at line 886 and block 890, this grammar element child, GEC, is added to the AND rule for the grammar element and, as represented by line 891 extending to block 875, the next child is acquired as a tag. When the tag has no more children, then the process loops via line 843 to block 815. Thus, the process procures the unique grammar element corresponding to the tag in question and creates an AND rule for all of the children of that tag. When no further start tags are present, the test at block 845 fails and a return is made to block 815 until the test at block 830 fails. When the test at block 830 fails and the process continues as represented at line 892 to call a subroutine for removing redundant rules identified as "4100" and discussed later herein in conjunction with FIG. 17. This removal of redundant rules is represented at block 895, is one which seeks to remove precise duplicates. Then, as represented at line 897, the corpus grammar is built as earlier described in connection with block 900 in FIG. 1 and which reappears with the same numeration in the instant figure.

As described in conjunction with block 1000 in FIG. 1, the process of the invention carries out procedures for reducing, inter alia, the corpus grammar 900. The reduction is carried out with some options, for example a mechanism is provided which permits the user to turn specific reduction procedures off and on. Certain of the SGML requirements are avoided. For example, the procedure will look to the use of a notation of one or more or zero or more. It is theoretically impossible to prove those conditions, however, this vagary is offset by the importance of reducing the structure to its simplest form. This reduction is carried out with a sufficient number of samples to provide an adequate assurance of accuracy.

Figure 6:
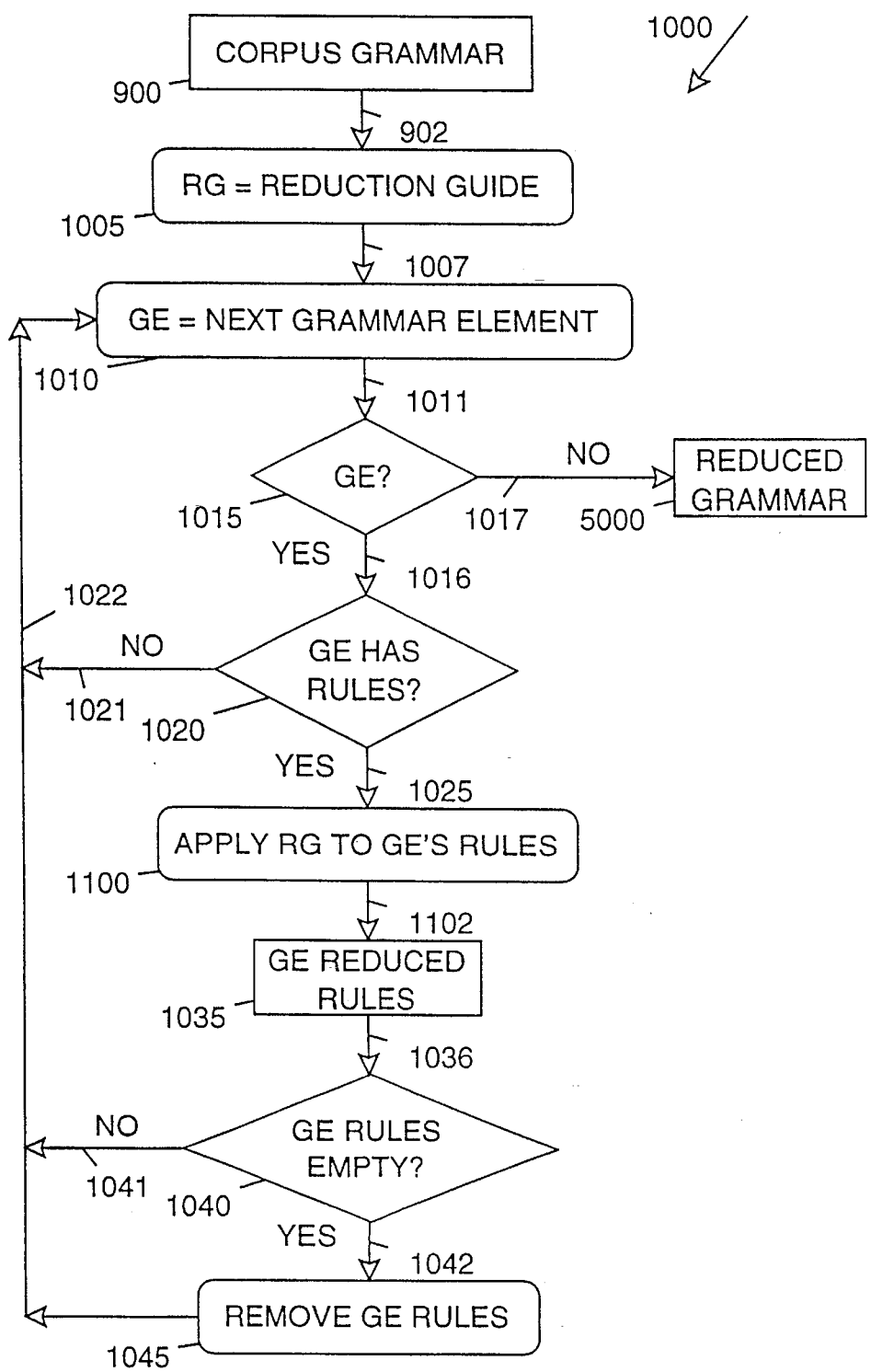
FIG. 6 is a flow chart showing a general technique for reducing a grammar in accordance with the invention.

Referring to FIG. 6, block 900 identifying the corpus grammar again is reproduced in conjunction with line 902 leading to block 1005 which, in turn, provides for utilization of the reduction guide of the system. This guide is, as noted above, an arrangement wherein the user is permitted to pick those reduction procedures desired. Then, as represented by block 1010, each of the grammar elements are accessed. In this regard the variable, GE is set to the next grammar element and, as represented at line 1011 and block 1015, a determination is made if a grammar element is available. If it is, then as represented at line 1016 and block 1020, an evaluation is made as to whether the grammar element has rules. In this regard, it may be recalled in the process of FIGS. 4 and 5, AND rules were created. If the grammar element under scrutiny does not have such rules, then as represented at lines 1021 and 1022, the program reverts to block 1010 and locates the next grammar element. On the other hand, where rules are present, then as represented at line 1025 and block 1100, the reduction guide, RG, is applied to the rules of that grammar element under scrutiny. Following application of this reduction at block 1100, then as represented at line 1102 and block 1035, a grammar element with reduced rules now is present. The reduction carried out may have no rules remaining. Accordingly, as represented at line 1036 and block 1040, an inquiry is made as to whether the grammar element under scrutiny has any non-empty rules. In the event that it has non-empty rules, then as represented by lines 1041 and 1022, the program reverts to block 1010 and acquires the next grammar element. Where the grammar element rules under scrutiny are determined to be empty, then as represented at line 1042 and block 1045, the grammar element rules are removed and the program reverts as represented at line 1022 to block 1010 to access the next grammar element.

Thus, in carrying out the overall reduction, a single grammar element is acquired and a reduction as elected by the reduction guide is carried out with respect to that grammar element. Then the next grammar element is accessed and the same procedures are carried out. Note that the program does not attempt to reduce the corpus grammar across its grammar elements. By contrast, it looks at a single grammar element and all of its rules and carries out the reduction in that space. This procedure acquiring each grammar element and carrying out a reduction thereon continues until the inquiry at block 1015 fails and as represented at line 1017, the process considers the production of a reduced grammar 5000 to be complete. Block 5000 reappears from FIG. 1.

Figure 7:
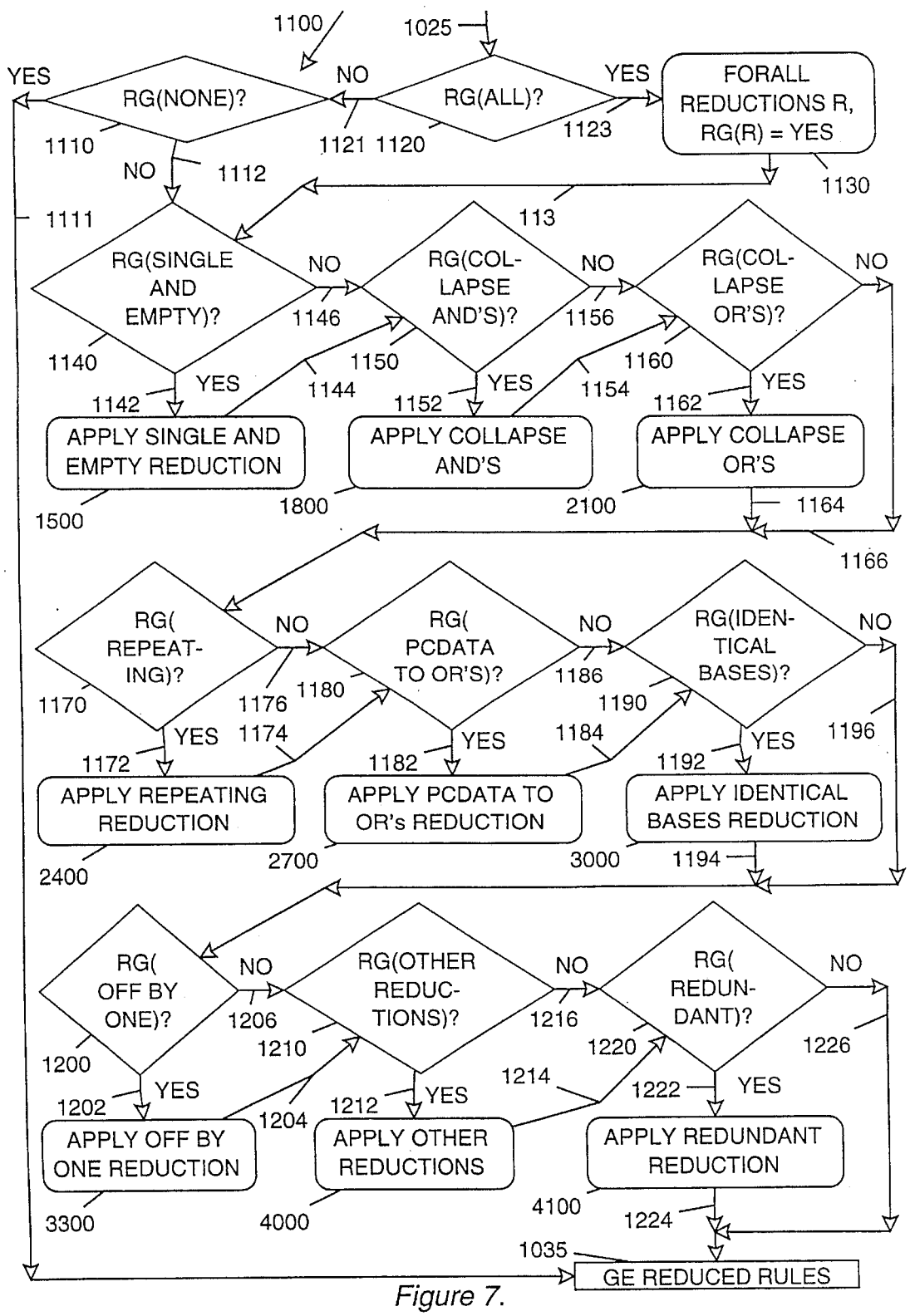
FIG. 7 is a general flow chart showing the method for applying a reduction guide to a grammar element's rules as described generally in FIG. 6.

Referring to FIG. 7, the procedure for applying the reduction guide as described in connection with block 1100 is revealed at an enhanced level of detail. The identification of this procedure is represented in the figure in general at 1100, and the introductory line 1025 reappears. All of the reduction procedures carried out work upon complete trees and thus process recursively. Line 1025 is directed to the inquiry at block 1120 where a determination is made by the user as to whether to use all of the reduction procedures or sub-procedures. In this regard, the user may apply only those reductions desired or others, or none for the grammar element at hand. Thus, in the event of a negative determination at block 1120, then as represented at line 1121 and block 1110, a query is made as to whether none of the reduction procedures should be carried out. In the event of an affirmative response, then as represented at line 1111 and block 1035, the grammar element reduced rules earlier described in conjunction with block 1035 in FIG. 6 now contains this unreduced grammar. Where the inquiry at block 1120 results in an affirmative determination, then as represented at line 1123 and block 1130, the program is adjusted such that all of the reduction procedures, R, are carried out and the program continues as represented at line 1131. Correspondingly, where the query posed at block 1110 results in a negative determination, then as represented by line 1112, the program progresses to the first of the reduction procedures with the query posed at block 1140. At this block, the question is asked whether the "single and empty" reduction should be carried out. This is the first of a sequence of available reductions which are arranged in a canonical order. Thus, by first carrying out this initial reduction, the procedure for the next reduction in the sequence is improved. Because it is quite computationally expensive to carry out reductions, where patterns are recognized and reduced, it is important not to be required to traverse the tree structure recursively or on numerous occasions. The single and empty reduction removes extraneous parentheses and the like. Accordingly, with an affirmative determination at block 1140, then as represented at line 1142 and block 1500, that single and empty reduction is applied and, as represented at line 1144, the program proceeds to the query at block 1150. Block 1150 also is accessed next in the event of a negative determination at block 1140 as represented at line 1146. Block 1150 queries as to whether to carry out the "collapse AND's" reduction. This reduction is performed inasmuch as, in general, there is no need within the structure to have nested AND rules. In the event of an affirmative determination, then as represented at line 1152 and block 1800, that reduction is carried out. The program then proceeds to the inquiry at block 1160 as represented at line 1154. Block 1160 also is accessed as represented at line 1156 in the event of a negative determination with respect to the query at block 1150. Block 1160 queries as to whether the reduction identified as "collapse OR's" should be carried out. In the event of an affirmative determination, then as represented at line 1162 and block 2100, this reduction is carried out. The reduction in general is performed on the observation that there is no need within the structure to have a nested rule of ORs within the tree structure. On the other hand, the user may not wish to carry out this reduction in view, for example, of having already parenthesized the patterns of interest. Accordingly, in the event of a negative determination with respect to the query at block 1160, then as represented at line 1166, the program progresses to the query at block 1170. The block similarly is addressed following the application of the collapsed ORs reduction at block 2100 as represented at line 1164.

Block 1170 queries as to whether the "repeating" or repeating atoms reduction should be carried out. This reduction looks for simple repeating patterns. In the event of an affirmative determination with respect to the query posed at block 1170, then as represented at line 1172 and block 2400, the repeating reduction procedure is carried out and the program progresses as represented by line 1174 to the query posed at block 1180. Block 1180 similarly is accessed in the event of a negative determination with respect to the inquiry at block 1170 as represented at line 1176. The inquiry at block 1180 is one as to whether the "PCDATA to OR'S" reduction should be carried out. This reduction is one wherein any AND rule which has a PCDATA appearing anywhere in it is convened to an OR rule. This is a somewhat powerful reduction based upon the semantics of SGML wherein, when text is present at the same level of structure, then the structure probably is errant. With an affirmative determination with respect to the query at block 1180, then as represented at line 1182 and block 2700, the PCDATA to OR'S reduction is carried out and the procedure continues as represented at line 1184 to the query at block 1190. Similarly, with a negative determination with respect to the query at block 1180, block 1190 is accessed as represented at line 1186. At block 1190, the query is made as to whether the "identical bases" reduction should be carried out. This reduction ignores repetition symbols and tries to combine rules based on the elements they contain. Where a negative determination is made with respect to the query posed at block 1190, then as represented at line 1196, the program continues to the query at block 1200. On the other hand, where a determination is made to apply the identical bases reduction, then as represented at line 1192 and block 3000, the reduction is applied and, as represented at lines 1194 and 1196, the program continues to block 1200.

Block 1200 inquires as to whether the "off by one" reduction is to be applied. With this reduction, for instance, a zero-based approach is employed with respect to repetition symbols including where a rule can be repeated 0 or more times. For example, ABC is off by 1 from BC and under this reduction A can be made optional. Accordingly, with an affirmative determination with respect to the inquiry at block 1200, then as represented at line 1202 and block 3300, the off-by-one reduction is applied. The program then continues to the query at block 1210 as represented at line 1204. Alternately, with a negative determination to the query posed at block 1200, then as represented at line 1206, block 1210 then is considered. At block 1210, any other reductions desired on the part of the user can be applied. Accordingly, as represented at line 1212 and block 4000, other reductions can be applied in the sequence of reductions at this juncture. The program then continues to block 1220 as represented at line 1214. Block 1220 also is addressed in the event of a negative determination to the query posed at ! block 1210 as represented at line 1216. Block 1220 queries as to whether a procedure for removing redundancies should be carried out. This algorithm removes rules which are identical or semantically subsumed. In the event that an affirmative determination is made with respect to the query at block 1220, then as represented at line 1222 and block 4100, the redundant reduction is applied. It may be recalled that this same reduction was called in conjunction with block 895 in FIG. 5 in the course of building a grammar as represented generally at 800 in that figure and by block 800 in FIG. 1. The result of this last reduction is the derivation of the grammar element reduced rules as represented at line 1224 and block 1035. Block 1035 additionally is accessed from lines 1226 and 1224 in the event of a negative determination with respect to the query posed at block 1220.

Figure 8:
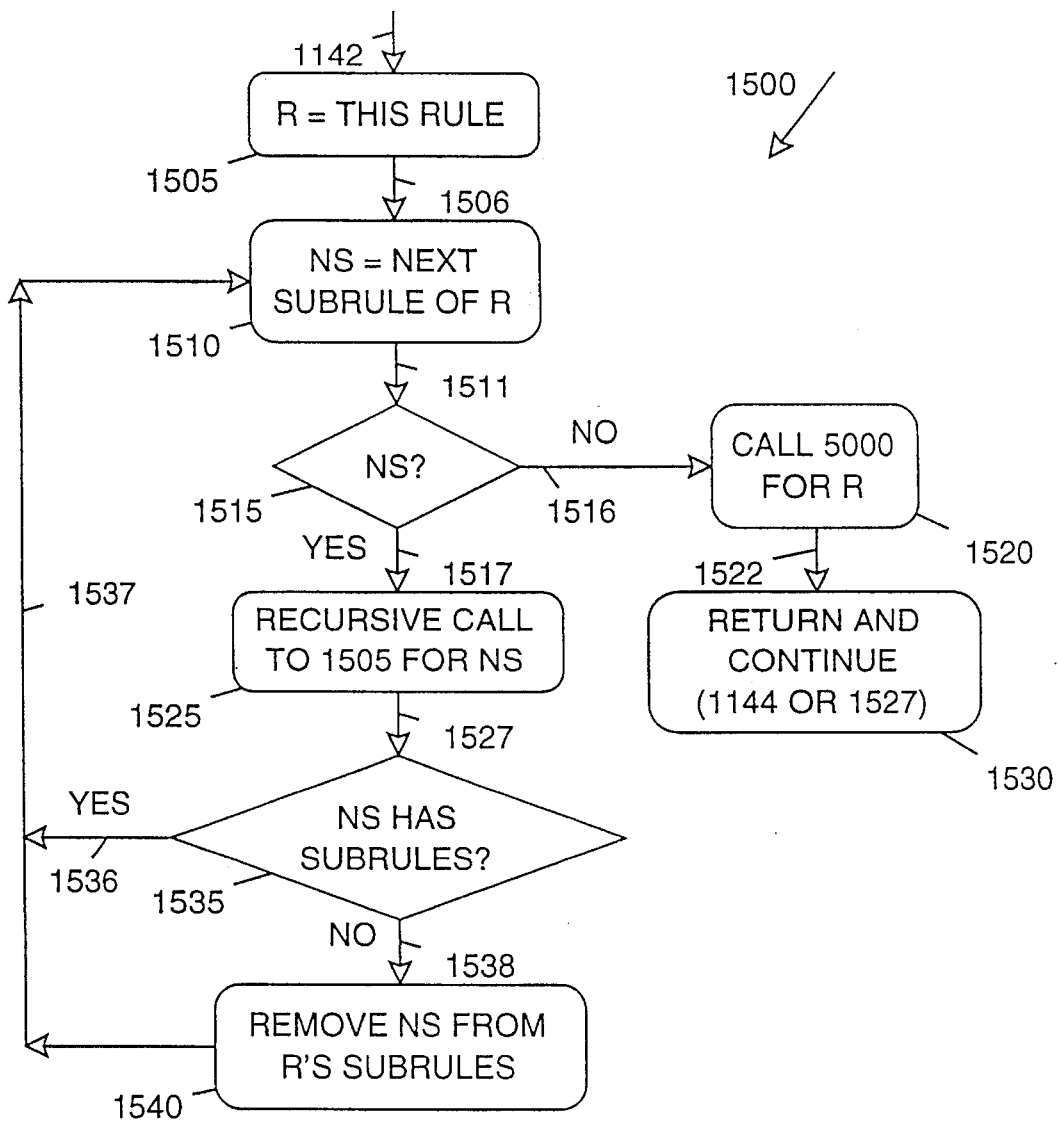
FIG. 8 is a flow chart showing the method for carrying out a single and empty reduction as described generally in FIG. 7.

Referring to FIG. 8, the single and empty reduction procedure as discussed in connection with block 1500 in FIG. 7 is revealed at an enhanced level of detail. In the figure, line 1142 as utilized in FIG. 7 is reproduced leading to the initial step of the procedure wherein the variable R is set to THIS RULE in view of the recursive nature of the technique. It should be noted that any of the reductions as described in connection with FIG. 7 can be called essentially from any point in the program to work on the rules of a grammar element, thus the variable, R. Next, as represented at line 1506 and block 1510, the variable NS is set as the next subrule of R. Then, as represented at line 1511 and block 1515, a determination is made as to whether a next subrule is present. In the event that it is not, then as represented at line 1516 and block 1520, a reduction procedure is called for R which involves an attempt to collapse the rule tree structure and, as represented at line 1522 and block 1530, the program returns and continues as described at line 1144 in FIG. 7 or line 1527 in the instant figure. Where the inquiry posed at block 1515 is in the affirmative, then as represented at line 1517 and block 1525, a call is made to block 1505 recursively such that R is NS. Then the procedure is carried out for the sub-tree. Next, as represented at line 1527 and block 1535, a query is made as to whether the next subrule, NS, has subrules. If that is the case, then as represented at line 1536 and line 1537, the program reverts to block 1510. On the other hand, as represented at line 1538 and block 1540, in the event of a negative determination to the query posed at block 1535, the subrule is removed from R's subrules. In effect, the heirarchical tree is pruning itself. Examples of the application of procedure 1500 are given hereinbelow under the heading: "Reduction Guide Examples".

Figure 9:
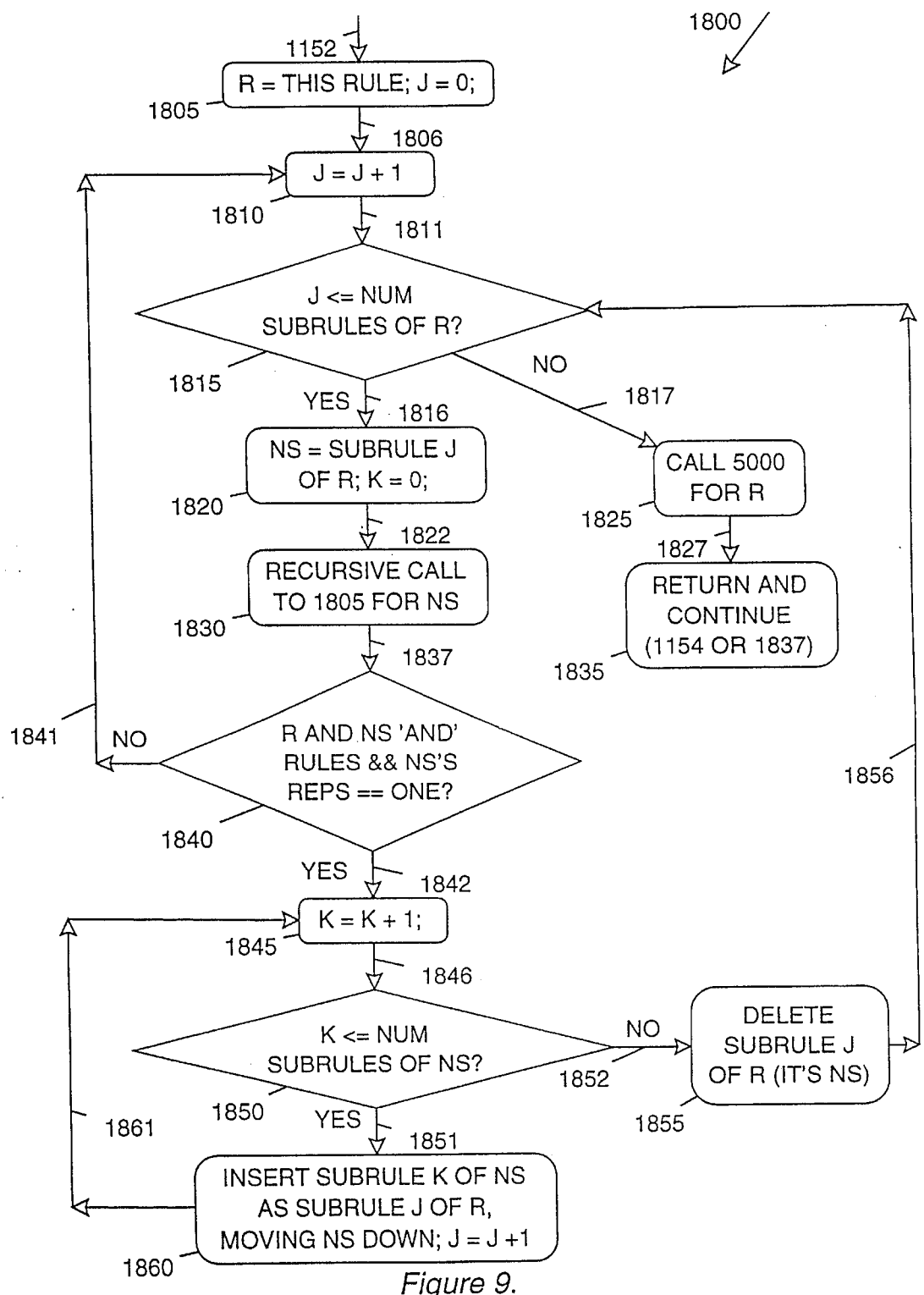
FIG. 9 is a flow chart showing the reduction method for collapsing AND rules as described generally in FIG. 7.

Referring to FIG. 9, the collapse AND's reduction described in connection with FIG. 7 at block 1800 is revealed at an enhanced level of detail, and is identified in general by that same numeration. Line 1152 also is repeated from the latter figure. In this reduction, an AND rule is provided in the grammar element which has AND-type subrules. The process seeks to pull the subrules into the original. In the figure, line 1152 is shown addressing block 1805 where the variable R is set to THIS RULE and a pointer J, which ultimately will represent the number of subrules in R is set to zero. J is not set immediately to the number of subrules inasmuch as subrules may be added with this procedure. In effect, this procedure 1800 prunes the depth of the heirarchical tree making it momentarily wider. The procedure continues as represented at line 1806 and block 1810 to increment J, whereupon, as represented at line 1811 and block 1815, where a determination is made as to whether J is less than or equal to the number of subrules. If that is the case, then there is a subrule requiring consideration. In the event such subrule is determined to be present, then as represented at line 18 16 and block 1820, the variable NS is set equal to the subrule J of R and a variable K is set to zero. The latter variable is employed to examine any children of subrule NS. Next, as represented at line 1822 and block 1830, the program makes a recursive call to block 1805 for the next subrule, NS. And, as represented at line 1837 and block 1840, the query is made as to whether rule R and the next subrule NS, are AND rules, and, the next subrules repetitions symbol is one. The AND rules are only pulled up in the heirarchical Structure if the repetition symbol is 1, meaning one occurrence. In the event of a negative determination with respect to the query thus posed, the program returns to block 1810 as represented at line 1841, the value of J being incremented. In the event of an affirmative determination with respect to the query at block 1840, then as represented at line 1842 and block 1845, the variable K is incremented by 1 and the subrules of NS are "walked through" or examined seriatim utilizing the pointer, K. In this regard, line 1846 is seen extending to the query at block 1850 questioning whether K is less than or equal the number subrules of NS. In the event of an affirmative determination, then as represented at line 1851 and block 1860, the subrule K of NS is inserted as a subrule of J of R, moving NS down and incrementing J to J+1 so as to be pointing at NS. The procedure then loops to block 1845 as represented by line 1861. Thus, each one of the subrules of NS are moved up into the subrules of R before NS.

In the event of a negative determination to the query at block 1850, then as represented at line 1852 and block 1855, the subrule J of R is deleted. Subrule J of R now is pointing at NS; thus it can be deleted. Accordingly, as represented at line 1856, the program returns to the query at block 1815.

Where the determination at block 18 15 is that J is not less than or equal to the number of subrules of R, then as represented at line 1817 and block 1825, the earlier-noted reduction procedure identified as "5000" is called for R and as represented at line 1827 and block 1835, the program returns and continues at line 1837 of this FIG. 9 or at line 1154 of FIG. 7. Examples of the application of procedure 1800 are given hereinbelow under the heading: "Reduction Guide Examples".

Figure 10:
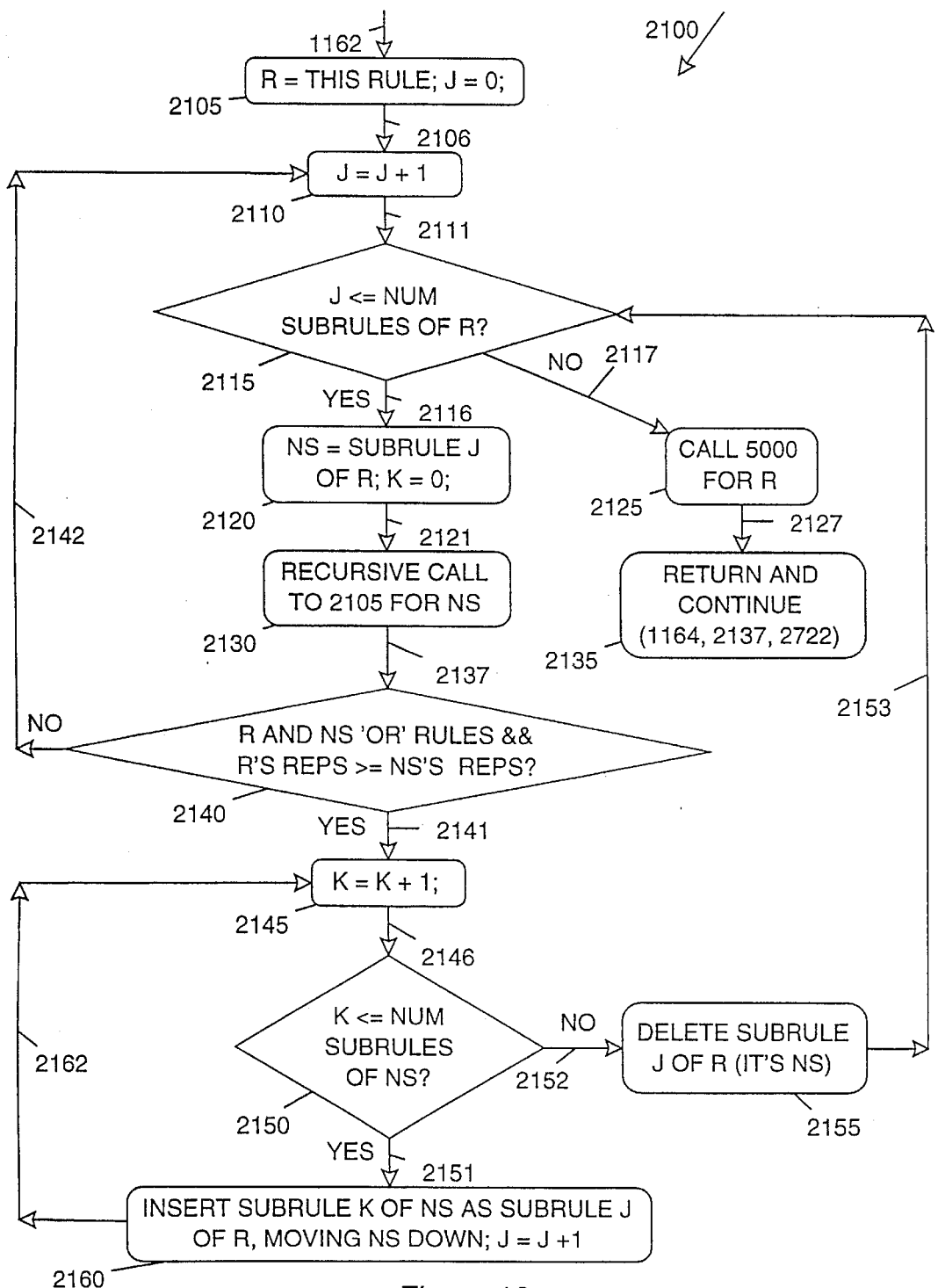
FIG. 10 is a flow chart describing the method for collapsing OR rules as referred to generally in FIG. 7.

Referring to FIG. 10, the reduction in identified in FIG. 7 at block 2100 for collapsing ORs is revealed at an enhanced level of detail and is represented by the same general numeration, 2100. Line 1162 reappears from FIG. 7. Reduction 2100 is quite similar to that at 1800 with the exception that OR rules are considered. Line 1162 is seen directed to block 2105 providing for obtaining the current rule which is identified by the variable, R, and setting the pointer J to zero.

Then, as represented at line 2106 and block 2110, J is incremented by 1 and, as set forth at line 2111 and block 2115, a determination is made as to whether J is less than or equal to the number of subrules of R. In the event that an affirmative determination is made, then as represented at line 2116 and block 2120, the variable NS is Set as the subrule J of R and the variable K, looking at the subrules of NS, is set to zero. Then, as represented at line 2121 and block 2130, a recursive call is made to block 2105 for the subrules NS. Next, as represented by line 2137 and block 2140, a query is made as to whether R and NS are OR rules along with the-logical AND condition that R's repetition characteristic as designated by a repetition symbol is equal or greater in number than NS's repetition symbol, i.e. they subsume NS's repetition symbols. For instance, this means that R can be occurring one or more times while the subrule can occur perhaps one time. This step assures that the parent may occur more times than the child as a condition for moving the latter up. In the event of a negative determination with respect to the query thus posed, the program returns to block 2110 as represented at line 2142, the value of J being incremented. In the event of an affirmative determination with respect to the query posed at block 2140, then as represented by line 2141 and block 2145, the variable K is incremented and, as represented at line 2146 and block 2150, a determination is made as to whether K is less than or equal to the number of subrules of NS. In the event that it is, then as represented at line 2151 and block 2160, the subrule K of NS is inserted as a subrule of J or R. NS is moved down and J is incremented by one to still point at NS. The procedure then loops to block 2145 as represented by line 2162. Thus, each one of the subrules of NS are moved up into the subrules of R before NS. Where the test at block 150 fails, then as represented at line 2152 and block 2155, the subrule J of R is deleted inasmuch as it is NS, which can be deleted. The program then continues as represented at line 2153 to reiterate the inquiry at block 2115. Where the test at block 2115 fails, then the procedure for this element is completed and, as represented at line 2117 and block 2125, the noted reduction identified as "5000" is called for and, as represented at line 2127 and block 2135, the program returns to line 2137 of the instant routine, or to line 1164 of FIG. 7, or to line 2722 of FIG. 12. Examples of the application of procedure 2100 are given hereinbelow under the heading: "Reduction Guide Examples".

Figure 11:
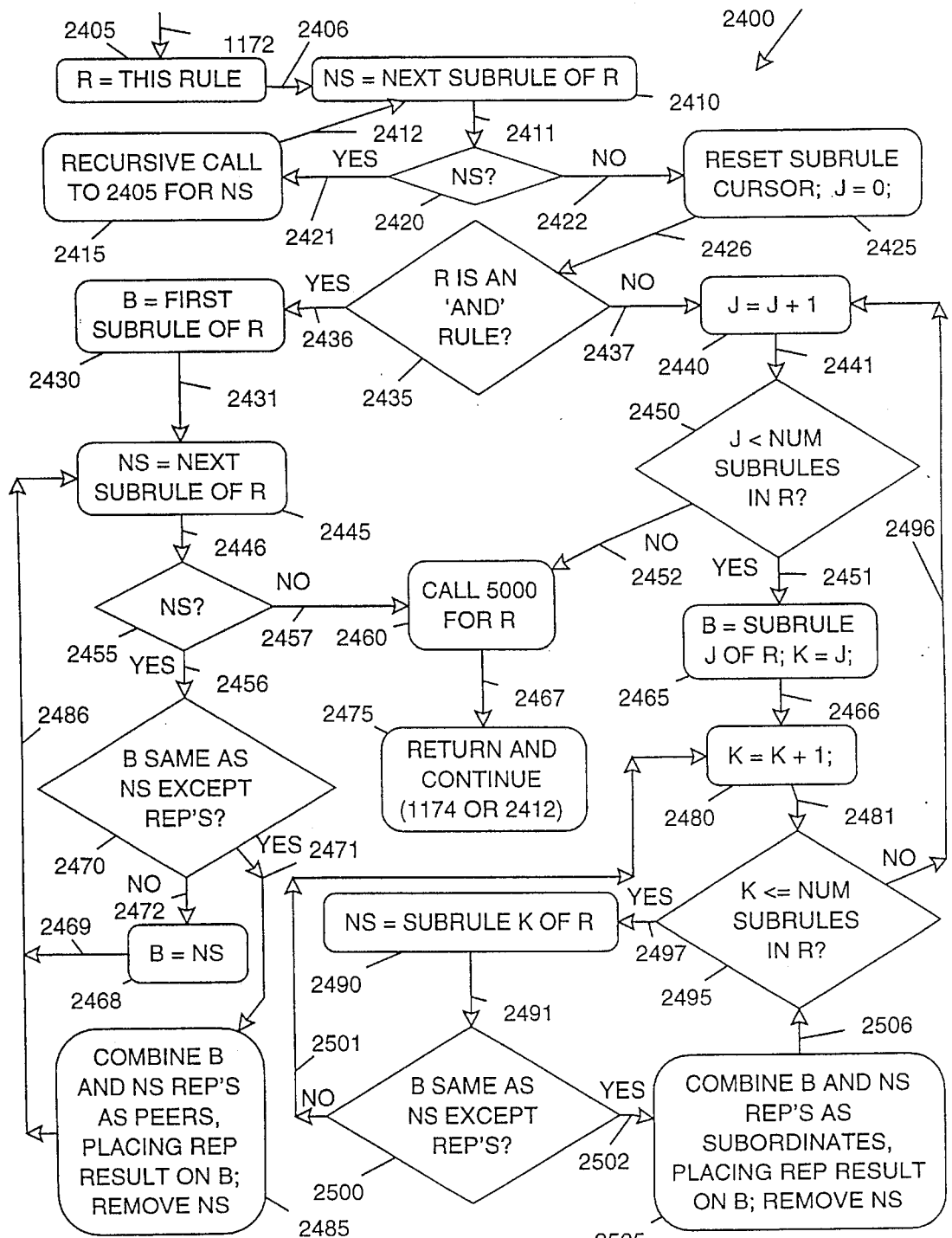
FIG. 11 is a flow chart showing the method for carrying out a repeating reduction as described generally in connection with FIG. 7.

Referring to FIG. 11, the remove repeating or repeating atoms reduction procedure as described generally at block 2400 in FIG. 7 is illustrated-in enhanced detail and represented by the general numeration 2400 in consonance with the identification of block 2400. Line 1172 from FIG. 7 also is reproduced leading to block 2405 which provides for setting the variable R as the rule being considered. Then, as represented at line 2406 and block 2410, the variable NS is set as the next subrule of R. Next, as represented at line 2411 and block 2420, a determination is made as to whether a next subrule is present. In the event that it is, then as represented at line 2421 and block 2415, a recursive call is made to block 2405 for all the subrules of R as indicated by line 2412 returning to block 2410. When no further subrules are present, then as represented at line 2422 and block 2425, the subrule cursor J is reset to zero such that the subrules may be reconsidered, having now been recursively collapsed. The program then continues as represented at line 2426 which is directed to the query posed at block 2435. The present procedure is applied based upon whether or not the rule R is an AND rule such that appropriate patterns can be detected. Thus, an affirmative determination at block 2435, as represented at line 2436 identifies an AND rule. Line 2436 is directed to block 2430 which sets the variable B as the first subrule of R. That subrule becomes a base rule which is compared with the next subrule as a technique for pattern identification. Accordingly, as represented at line 2431 and block 2445, the variable NS is set as the next subrule of R, and as represented at line 2446 and, block 2455, the presence of a next subrule is determined. Where a next subrule is at hand, then as represented at line 2456 and block 2470, a comparison is made to determine whether B and NS are the same except for repetition symbols. If that condition is true, then as represented at line 2471 and block 2485, B and NS are combined as peers because it now is known that the bases are the same. An appropriate repetition symbol is placed on the base and NS is removed. Thereafter, as represented at line 2486, the program returns to block 2445 for the next subrule of R and the comparison thereof with B. Where the inquiry at block 2470 results in a negative determination, then as represented at line 2472 and block 2468, the next subrule is set as the variable B and as represented at lines 2469 and 2486, the variable NS is set as the next subrule of R. This procedure continues until the inquiry posed at block 2455 results in a negative determination as represented at line 2457 which is directed to block 2460. At the latter block, the reduction identified as "5000" is called for R, and, as represented at line 2467 and block 2475, the procedure returns to line 2412 of the instant figure or line 1174 of FIG. 7.

Looking in more detail to the procedure carried out at block 2485, the combination of repetition symbols is based in logic and some assumptions. The repetition symbols involved are a plus sign (+) representing one or more; a Kleene star symbol (*) representing zero or more; a 1 representing one; and a question mark (?) representing zero or 1. To collapse peers, the following Table 1 will be employed.

TABLE 1

|  | outer or second atom | | | | |
|---|---|---|---|---|---|
|  | ? | 1 | + | * |
| inner or first atom | ? | ? | * | + | * |
|  | 1 | * | 1 | + | * |
|  |  | 1 | + | + | + | + |
|  | + | + | + | + | + |
|  | * | * | + | + | * |

In utilizing the table, peer rules are collapsed, e.g. FOO* FOO?=FOO* or, as another example, (----) (----)=(----)+. It may be noted that Table 1 is symmetrical about the equality axis and has certain characteristics, for example, 1 may be combined with anything to achieve a plus sign repetition symbol. In the table, the result of a combination of a first atom in the leftmost column with an outer atom in the uppermost row is at the intersection of the column and row. The table is developed from the following set of combinations and their valid iterations.

| combination | | valid iterations | resultant op | |
|---|---|---|---|---|
| ? | ? | 0, 1, 2 | * | <-Generalization |
| ? | 1 | 1, 2 | + | <-Generalization |
| ? | + | 1, 2, ... | + | |

-continued

| combination | | valid iterations | resultant op | |
|---|---|---|---|---|
| ? | * | 0, 1, ... | * | |
| 1 | ? | 1, 2 | + | <-Generalization |
| 1 | 1 | 2 | + | <-Generalization |
| 1 | + | 1, 2, ... | + | |
| 1 | * | 1, 2, ... | + | |
| + | ? | 1, 2, ... | + | |
| + | 1 | 1, 2, ... | + | |
| + | + | 1, 2, ... | + | |
| + | * | 1, 2, ... | + | |
| * | ? | 0, 1, ... | * | |
| * | 1 | 1, 2, ... | + | |
| * | + | 1, 2, ... | + | |
| * | * | 0, 1, ... | * | |

Of the above, all but the following four generalizations are absolutely correct. It is because of the generalizations that the user is afforded the opportunity to elect a desired reduction procedure as described at block 1170 in conjunction with FIG. 7.

| ? | ? | 0, 1, 2 | * | <-Generalization |
|---|---|---|---|---|
| ? | 1 | 1, 2 | + | <-Generalization |
| 1 | ? | 1, 2 | + | <-Generalization |
| 1 | 1 | 2 | + | <-Generalization |

Returning to block 2435, where the test posed thereat results in a false determination, then an OR role is at hand and, as represented at line 2437 and block 2440, the pointer J is incremented. Under the condition of an OR role, each subrole must be evaluated with every other subrole. J will be the base pointer while another pointer K will be the comparison pointer. From block 2440, the routine is seen to progress as represented at line 2441 and block 2450 wherein the query is made as to whether J is less than the number of subrules in R. Where it is less than that number, then as represented at line 2451 and block 2465, the base, B, is set as the subrule J of R and K is set as J. Next, as represented at line 2466 and block 2480, the pointer K is incremented by 1. Then, as represented at line 2481 and block 2495, a determination is made as to whether this new base has been checked against all of the subrules. If that is not the case, then K will be less than or equal to the number of subrules in R. Accordingly, with a failure of the test at block 2495, the routine loops as represented at line 2496 to block 2440 and the incrementation of the pointer J. With an affirmative determination at block 2495, then as represented at line 2497 and block 2490, the variable NS is set as the subrole K of R. Then, as represented at line 2491 and block 2500, a determination is made as to whether the base, B, is the same as NS except for the repetition symbols. Where that test fails, then as represented at line 2501, the routine returns to block 2480 and the incrementation of K. However, with an affirmative determination at block 2500, then as represented at line 2502 and block 2505, the repetition symbols at B and NS are combined. However, in this instance, they are combined as subordinates placing the repetition symbol result on B and removing NS.

The logic for combining repetition symbols to be placed on B as subordinates is set forth in the following Table 2.

TABLE 2

```
                  outer or second atom
              +---+---+---+---+---+
              | ? | 1 | + | * |
          +---+---+---+---+---+---+
          | ? | ? | ? | * | * |
   inner  +---+---+---+---+---+---+
   or     | 1 | ? | 1 | + | * |
   first  +---+---+---+---+---+---+
   atom   | + | * | + | + | * |
          +---+---+---+---+---+---+
          | * | * | * | * | * |
          +---+---+---+---+---+---+
```

Table 2 is utilized in the same manner as Table 1. In this regard, the repetition symbol of the leftmost column is compared with the repetition symbol in the uppermost row to locate the selected repetition symbol at their intersection. Generally, Table 2 is utilized whenever it is desired to collapse a single subrule with its parent and typically serves to locate extra parentheses during the reduction process: For example, the reduction: (FOO*)?reduces to: (FOO*), or ((----)+)? reduces to: (----)*. Of interest, the table shows that a 1 replicates the column header of the table.

Returning to FIG. 11, with the selection-and positioning of the repetition symbol, placing it upon B, and the removal of NS at block 2505 then as represented at line 2506 the program returns to the inquiry at block 2495. Returning to block 2450, when the TEST at that block fails, then as represented at line 2452 and block 2560, the earlier-noted program reduction program identified as "5000" is called for R. Then, as represented at line 2467 and block 2475, the program returns as earlier-described. Examples of the application of procedure 2400 are given hereinbelow under the heading: "Reduction Guide Examples".

Figure 12:
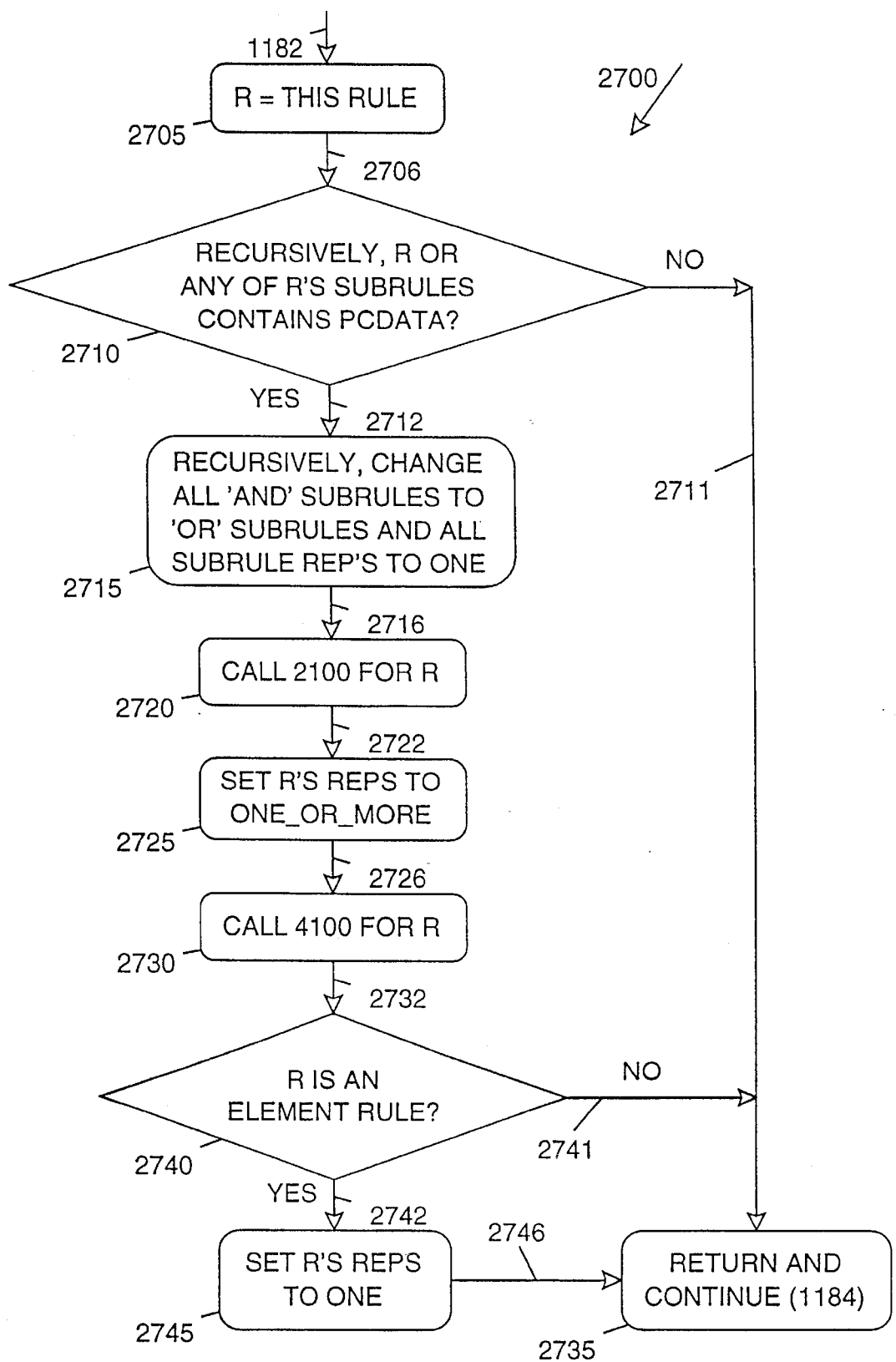
FIG. 12 is a flow chart showing the method for carrying out a PCDATA to OR rules reduction as described generally in connection with FIG. 7.

Referring to FIG. 12, the PCDATA to ORs reduction referred to at block 2700 in FIG. 7 is illustrated in enhanced detail. In the figure, the latter block identification at 2700 is reproduced as a general designation and line 1182 from FIG. 7 reappears. This reduction procedure is one wherein a determination initially is made to find out if PCDATA occurs anywhere within the rule or subrule at hand. If PCDATA does occur anywhere in the rule structure, then all of the AND subrules are recursively changed to OR subrules, and all of the repetition symbols are changed to 1. This is carried out no matter how complex the tree structure is, should PCDATA be located. The reduction is premised upon the argument that text and structure should not be mixed.

Line 1182 is seen to be directed to block 2705 where the variable R is set to this rule. Then, as represented at line 2706 and block 2710, a determination is made as to whether R or any of the subrules thereof contain PCDATA. In the event this test fails, then as represented at line 2711, the program returns as represented at block 2735 to line 1184 of FIG. 7. On the other hand, where PCDATA is located, then as represented at line 2712 and block 2715, all of the AND subrules are changed to OR subrules, and all subrule repetition symbols are changed to 1, representing one. The alteration of the subrules to OR rules facilitates the reduction process as does the alteration of the repetition symbols to 1. Then, as represented at line 2716 and block 2720, program 2100 as described in connection with FIGS. 7 and 10 is called, which functions to collapse all of the OR rules up to the top level of the tree heirarchy. Then, as represented at line 2722 and block 2725, the repetition of rule R is set to one or more. As represented at line 2726 and block 2730, the program identified as "4100" is called as is described in connection with FIG. 17. This program removes redundancies, which eliminates duplicates, and simplifies the tree structure. The reduction is premised upon the argument that text and structure shouldn't be mixed. Next, as represented at line 2732 and block 2740, a test is made as to whether R now is an element rule, i.e. has the tree collapsed to one simple element rule. Where the test fails, then as represented at lines 2741 and 2711, the program returns as represented at block 2735. On the other hand, where the test at block 2740 does not fail, then as represented at line 2742 and block 2745 the repetition symbol is set to 1 and, as represented at line 2746, the program returns as described in connection with block 2735. Examples of the application of the procedure 2700 are given herein below under the heading "Reduction Guide Examples".

Figure 13:
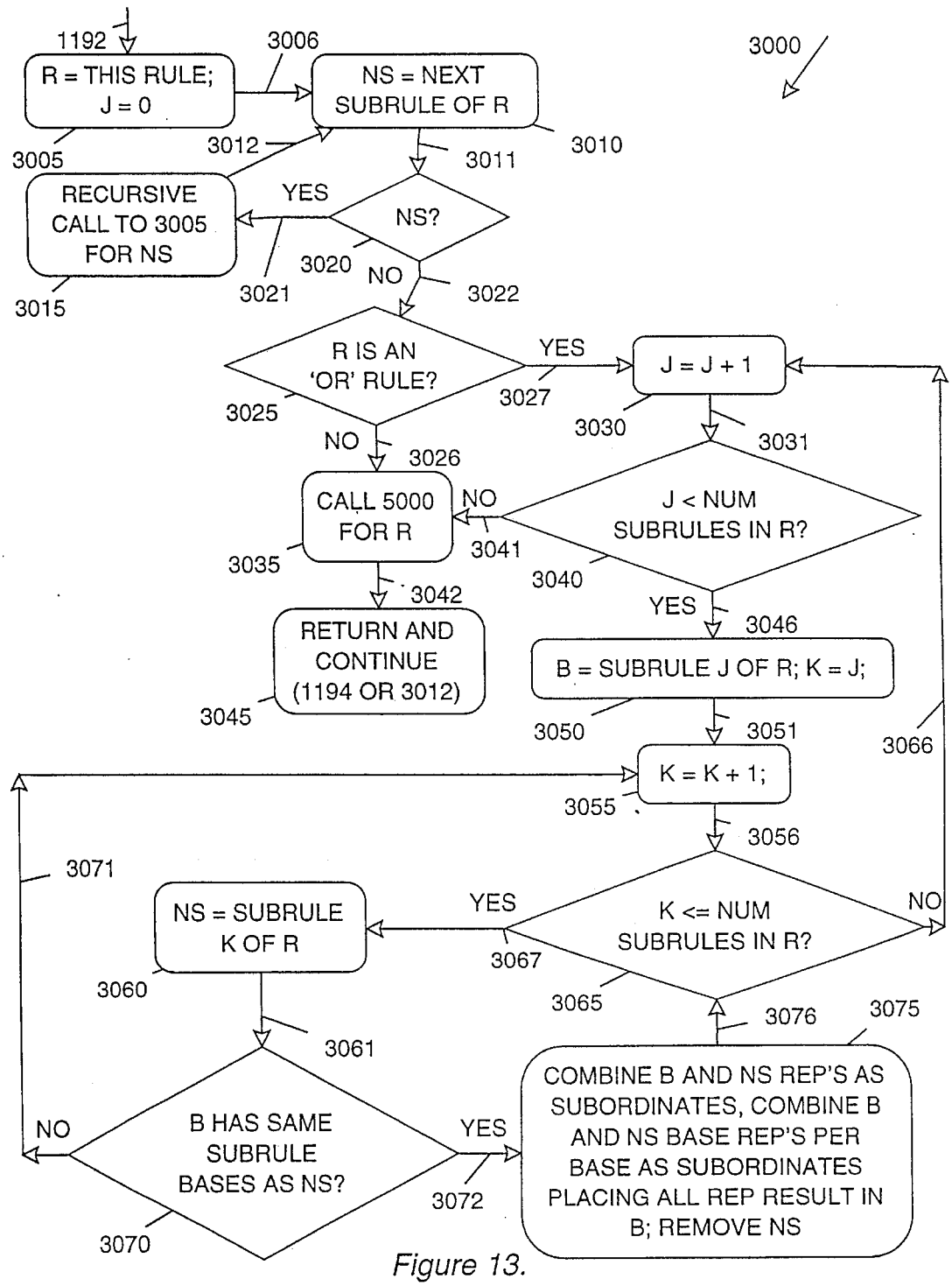
FIG. 13 is a flow chart showing the method for carrying out an identical basis reduction as described generally in FIG. 7.

Referring to FIG. 13, the identical bases reduction described at block 3000 in FIG. 7 is revealed in enhanced detail, and is identified by the same general numeration in conjunction with the earlier-described introductory line 1192. This reduction procedure looks for rules having the same base, repetition symbols on the rules and subrules being ignored. The term "base" or "base component" herein means the grammar component alone, such as "title" or author. Two rules having the same base are, for example: A*B+and A?B. Where the bases are the same, they are combined. In the drawing, line 1192 is seen introducing block 3005 wherein variable R is set to this rule and the pointer J is set to zero. Then, as represented at line 3006, and block 3010, variable NS is set to the next subrule of R and, as represented at line 3011 and block 3020, a query is made as to whether a next subrule is present. In the event of an affirmative determination, then as represented at line 3021 and block 3015, a recursive call is made to block 3005 for the next subrule and the program loops as represented at line 3012 to block 3010 to call for all subrules until such time as the test posed at block 3020 fails and the program continues as represented at line 3022. The bases are comparable under the present reduction where the rule, R, is an OR rule, a query which is posed at block 3025. Where R is not an OR rule, then as represented at line 3026 and block 3035, the routine identified as 5000 is called, and, as represented at line 3042 and block 3045, the program returns and continues at line 1194 as seen in FIG. 7 or 3012 of the present figure.

Where the test posed at block 3025 shows that R is an OR rule, then the program will compare every subrule with every other subrule. Accordingly, as represented at line 3027 and block 3030, J is incremented and, as represented at line 3031 and block 3040, a test is made as to whether J is less than the number of subrules in R. If that test fails, then as represented at line 3041 and block 3035, the program 5000 is called and the instant program returns as represented at block 3045. On the other hand, where the test at block 3040 is true, then as represented at line 3046 and block 3050, the base variable B is set as the subrule J of R. Next, K is initially set to start at J. Then, immediately, as represented at line 3051 and block 3055, K is incremented by 1 and, as represented at line 3056 and block 3065, a test is made as to whether K is less than or equal to the number of subrules in R. In the event of a negative determination, then as represented at line 3066, the program reverts to block 3030 and J is incremented. With an affirmative determination at block 3065, then as represented at line 3067 and block 3060, the variable NS or next subrule is set as the subrule K of R. Then, as represented at line 3061 and block 3070, a test is made as to whether B has the same subrule bases as NS. In the event that it does not, then as represented at line 3071, and block 3055, K is incremented and the tests are repeated. With an affirmative determination with respect to the query at block 3070, then, as represented at line 3072 and block 3075, the program combines the base B and next subrule NS repetition symbols as subordinates as discussed above in connection with Table 2. Additionally, the base B and next subrule NS base repetition symbols per base are combined as subordinates, placing all repetition symbols which result in B. Finally, NS is removed, in effect, two levels of repetition symbols are combined, the subrules and the subrules of the subrules. Next, as represented at line 3076, the test at block 3065 is reasserted. Where that test fails, as represented at line 3066 and block 3030, J is incremented and the procedure is repeated with a new base rule. Examples of the application of procedure 3000 are given hereinbelow under the heading: "Reduction Guide Examples".

Figure 14:
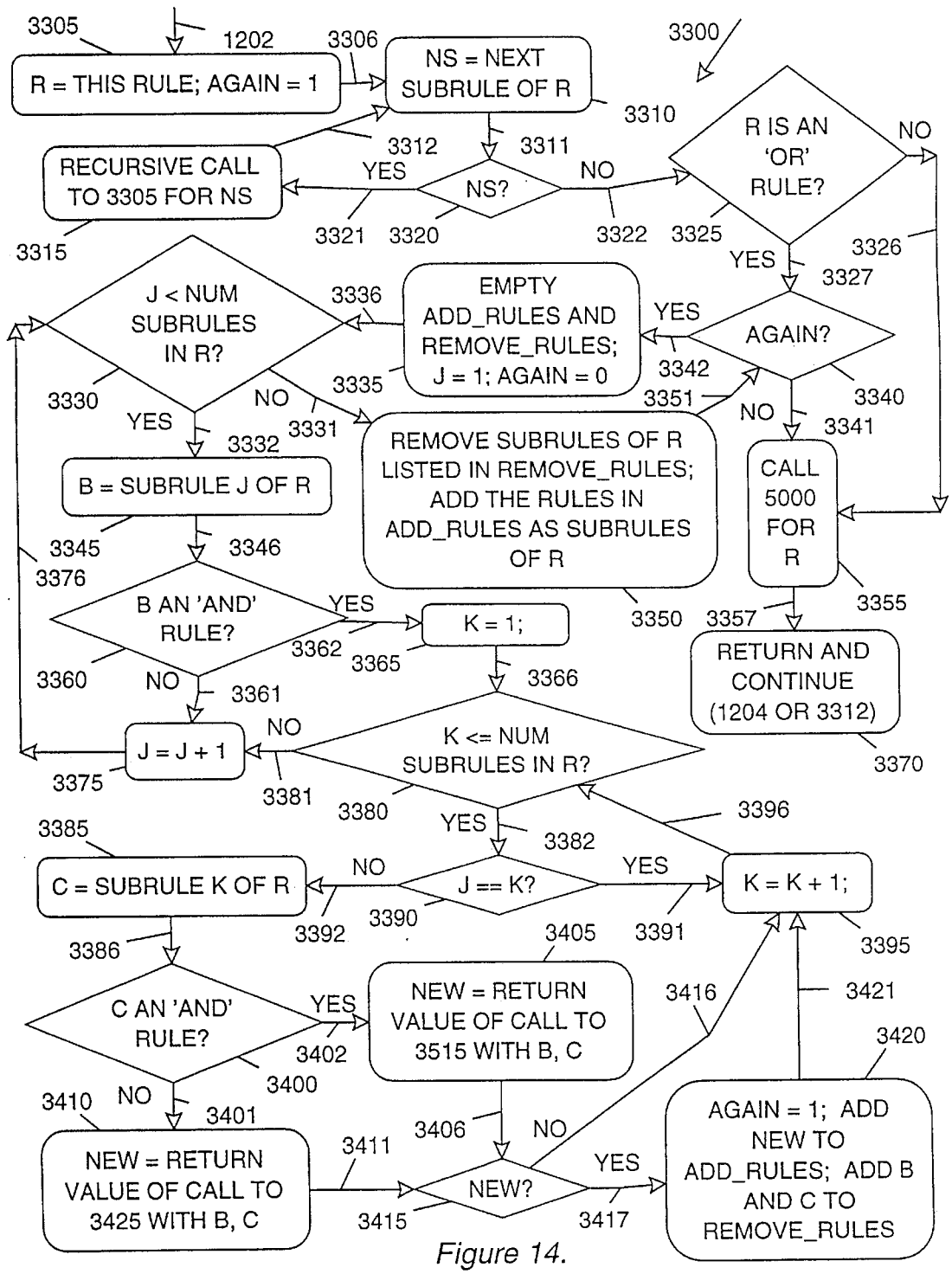
FIG. 14 is a flow chart showing the method for carrying out an off-by-one reduction as described generally in connection with FIG. 7.

Referring to FIG. 14, the off-by-one reduction described in conjunction with block 3300 in FIG. 7 is shown at an enhanced level of detail and represented in general by that same numeration. The present reduction treatment, just as the previous one, works exclusively with OR rules inasmuch as there have been multiple sub-AND rules to work with. The procedure queries whether a given subrule is off-by-one from another subrule. Thus, two subrules are compared. Abstractly, where two rules inside of an OR rule are compared, and are off-by-one, the off location subrule repetitions are made zero based. Thus, in comparing the rule ABC with the rule BC, a new rule with A marked as optional is created (e.g. A?BC) and the initial two rules are marked for deletion, the new rule created being then employed. As is apparent, the procedure cannot be employed in place, in that the optional A of the initial rule above cannot be marked in place and then the procedure be permitted to continue. If that were to occur, a comparison would be made of that rule with the other rules in the original pool of rules. In order to maintain an accounting of new rules and rules marked for deletion, two lists will be seen to be employed, an add rules list and a remove rules list.

Looking to the top of the figure, line 1202 reappears from FIG. 7 leading to block 3305 wherein R is set to this rule and the AGAIN flag is set to 1. This flag is utilized for determining whether or not the pass through the procedure is to be repeated. The program then, as represented at line 3306 and block 3310 sets the variable NS as the next subrule of R and, as represented at line 3311 and block 3320, a test is made as to whether a next subrule is present. In the event that it is, then as represented at line 3321 and block 3315, a recursive call is made to block 3305 for the subrule and, as represented at line 3312, the program continues as developed through blocks 3310 and 3320. Where the test at block 3320 fails, then as represented at line 3322 and block 3325, a test is made as to whether R is an OR rule. Where it is not, then as represented at line 3326, the program diverts to block 3355 and the routine identified at 5,000 is called for R. Thereupon, as represented at line 3357 and block 3370, the program returns and continues at line 1204 in FIG. 7 or in the instant figure at line 3312. Where an OR rule is determined to be present in connection with the query posed at block 3325, then as represented at line 3327 and block 3340, a test is made as to whether the AGAIN flag is set to 1. In the event that it is not, then as represented at line 3341 and block 3355 the routine 5000 is called and the program returns as represented at line 3357 and block 3370. Where the query posed at block 3340 has an affirmative response, which will occur upon any first pass by virtue of the setting of the AGAIN flag at block 3305, then, as represented at line 3342 and block 3335, the add rules list and the remove rules list are emptied, J is set to 1, and the AGAIN flag is set to zero. Next, as represented at line 3336 and block 3330, a query is made as to whether J is less than the number of subrules in R. In the event this test fails, then the program is completed and as represented at line 3331 and block 3350, the subrules of R which are listed in the remove rules list are removed and the rules in the add rules list are added as subrules of R. The program then, as represented at line 3351 carries out the test at block 3340. In general, the AGAIN flag will have been set where rules have been added to the add rules list.

Figure 15:
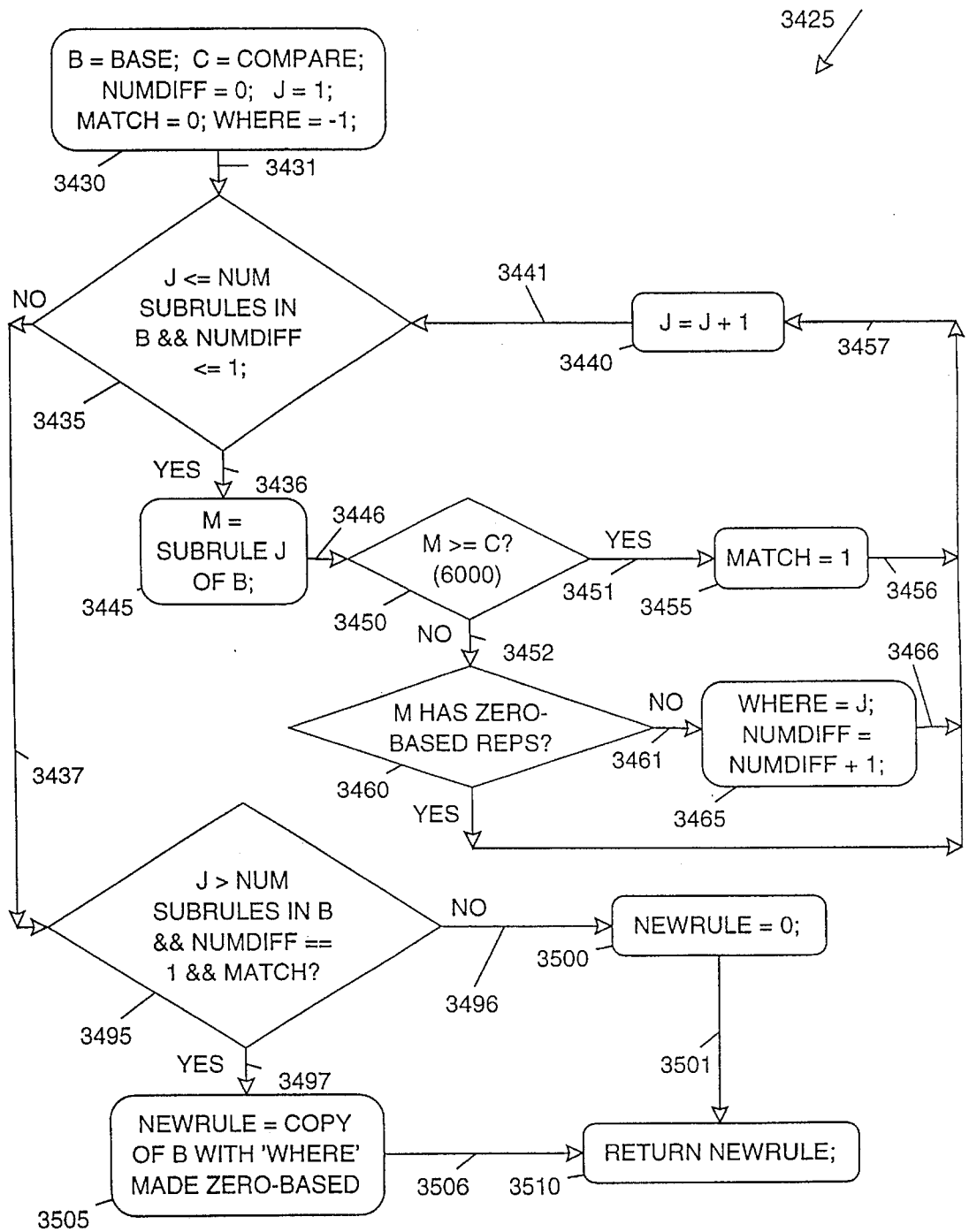
FIG. 15 is a flow chart of a routine for developing a new rule which is called from the flow chart of FIG. 14.

Returning to block 3330, where the response to the query thereat is in the affirmative, then as represented at line 3332 and block 3345, the base rule B is acquired as the subrule J of R. Then, as represented at line 3346 and block 3360, a determination is made as to whether the base B is an AND rule. The base rule is required to be an AND rule. Should the base rule not be an AND rule, then as represented at line 3361 at block 3375, J is incremented and, as represented at line 3376 leading to block 3330, the next base rule is acquired.

Where it is determined in conjunction with the query at block 3360 that B is an AND rule, then as represented at line 3362 and block 3365, the comparison rule counter K is set to 1 and, as represented at line 3366 and block 3380, a test is made as to whether K is less than or equal to a number of subrules in R. If it is not, then there is no further comparison rule to obtain and, as represented at line 3381, the base rule pointer J is incremented by 1 as shown at block 3375. Where the query posed at block 3380 results in an affirmative determination, then as represented at line 3382 and block 3390, a test is made as to whether J and K are equal. If they are, the program will not compare J with K, inasmuch as they are the exact same rule. Accordingly, with an affirmative determination with respect to the query at block 3390, then as represented at line 3391 and block 3395, K is incremented and, as represented at line 3396, the program reverts to the query posed at block 3380. Where it is determined that J is not equal to K in connection with the query at block 3390, and as represented at line 3392 and block 3385, the comparison rule C is set as the subrule K of R. Then, as represented at line 3386 and block 3400, the test is made as to whether C is an AND rule. If that inquiry results in a negative determination, then C is an OR rule or an element rule. With a failure of the test at block 3400, then as represented at line 3401 and block 3410, a program identified at 3425 which is described in conjunction with FIG. 15 is called in connection with the base rule B and comparison rule C. That procedure may return a new rule or an indication Of zero which, as represented at line 3411 and block 3415 is tested to determine whether a new rule is present. In the event that it is not, then as represented at line 3416 and block 3395, variable K is incremented. On the other hand, where a new rule has been returned in connection with block 3410, then as represented at line 3417 and block 3420, the AGAIN flag is set to 1. The new rule is added to the add rules list, and the base rule B and comparison rule C are added to the removed rules list. The program then continues as represented at line 3421 to block 3395 and the incrementation of the variable K.

Where the test for an AND rule at block 3400 results in an affirmative determination, then as represented at line 3402 and block 3405, a call is made to a procedure identified generally at 3515 and described in connection with FIG. 16 which may or may not return a new rule. The return from program 3515 is represented at line 3406 which is tested for the presence of a new rule at block 3415 as before. Where a new rule is present, the above-noted procedures of block 3420 are carried out. Examples of the application of procedure 3300 are given hereinbelow under the heading: "Reduction Guilde Examples".

Referring to FIG. 15, the program identified generally at 3425 as is called from block 3410 of FIG. 14 is illustrated. This program commences at block 3430 where the base AND rule B is made the base rule and the OR or element rule is set as C, the comparison rule. These rules have been provided from the previous procedure of FIG. 14. The variable NUMDIFF, which is the number of places where B and C differ is set to zero. J is set to 1. The flag indicating a match, i.e. MATCH, is set to zero, and the variable WHERE, which indicates where the two rules differ is set to a minus one value. This −1 is provided in View of the convention of establishing a zero-based position for rule components. Following the procedures at block 3430, then as represented at line 3431 and block 3435, the query is made as to whether J is less than or equal to the number of subrules in B with the ANDed condition that NUMDIFF is less than or equal to 1. In effect, the procedure will "walk over" the rules and note the number of places where they are different. If they are different in one place only, then that one place in the base rule can be made optional or zero based. If the two rules are off by more than one, then a new rule is not available. Where the condition posed at block 3435 is true, then as represented at line 3436 and block 3445, the variable M is set as the subrule J of B and, as represented at line 3446 and block 3450, since C is an OR or an element rule, the program immediately queries whether M is greater than or equal to the comparison rule C. This in effect questions whether M subsumes the comparison rule C. This determination is made in conjunction with the procedure represented generally at 6000 described in connection with FIG. 19. Where M does subsume C, then, as represented at line 3451 and block 3455, the MATCH flag is set to 1 and, as represented at lines 3456, 3457, and block 3440, J is incremented and, as represented at line 3441, the tests posed at block 3435 again are carried out. Thus, if M subsumes C, a match is present and the subrule M matches the comparison rule C. Where the test at block 3450 results in a negative determination, then as represented at line 3452 and block 3460, a test is made as to whether subrule M is zero-based, it being recalled that the base rule is the AND rule. If M does have a zero based repetition symbol, then the program continues as represented at line 3457 and carries out the incrementation of J as represented at block 3440. Where the determination at block 3460 is to the effect that M is not zero based, then as represented at line 3461 and block 3465, the WHERE variable is set to J and the NUMDIFF variable is incremented by 1. The program then continues as represented by lines 3466 and 3457 to increment J as represented at block 3440. The incrementation of the variable NUMDIF now indicates that the rules are off by 1 at the location J. In this regard, in a next pass, should another non-zero based condition be present, NUMDIFF again will be incremented at block 3465 and the procedure will terminate under the conditions posed at block 3435.

Where the test posed at block 3435 fails, it may have done so inasmuch as J is greater than the number of subrules. This indicates that all of the subrules have been evaluated to ascertain that they are all zero based; the NUMDIFF variable is exactly 1, and a match has occurred. Accordingly, it is necessary to create a new subrule for those conditions. With a negative determination at block 3435, then as represented at line 3437 and block 3495, the test for determining whether or not a new rule is to be generated is made. In this regard, the conditions posed at the test at block 3495 are that J is greater than the number of subrules in B and that the NUMDIFF variable is exactly 1, and there is a match. Where that test fails, then as represented at line 3496 and block 3500, the new rule returns as tested at block 3415 in FIG. 14 is 0 and as represented at line 3501 and at block 3510 is returned as such. Where the test posed at block 3495 is true, then as represented at line 3497 and block 3505, the new rule is established as a copy of the base rule B with the "WHERE" position element made zero based. Then, as represented at line 3506 and block 3510, the new rule is returned.

Figure 16:
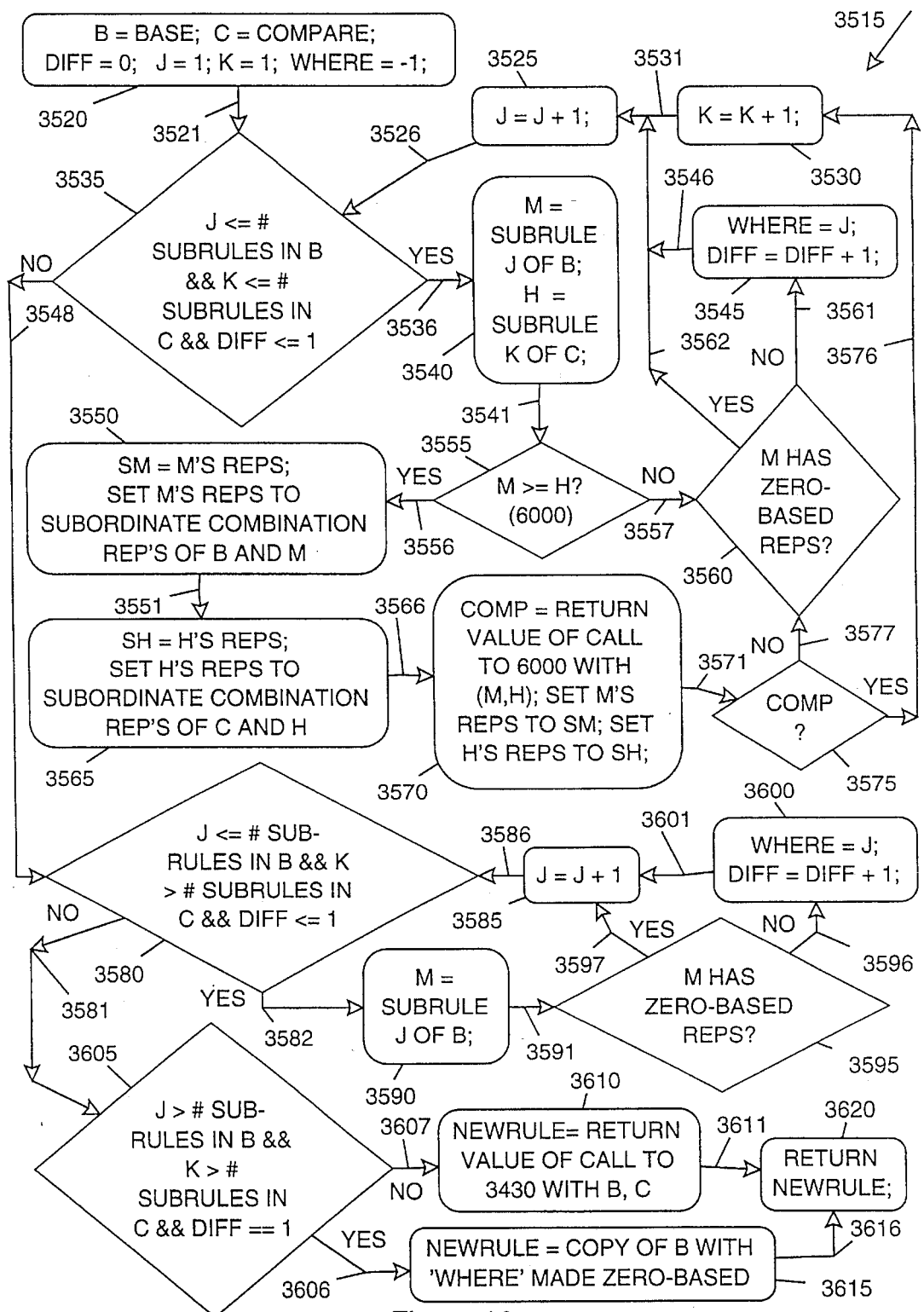
FIG. 16 is a flow chart for a routine for developing a new rule which is called from the flow chart of FIG. 14.

Referring to FIG. 16, the procedure called in connection with block 3405 of FIG. 14 is revealed at an enhanced level of detail. This procedure compares two AND rules which are a base rule and a comparison rule. The routine commences as represented at block 3520 where B is set as the base rule and. C is set as the comparison rule. The variable DIFF is set to zero. The pointer J which is associated with the base rule is set to 1. The pointer K which monitors comparison rule C is set to 1, and the variable WHERE is set to −1. The program proceeds as represented at line 3521 to a top loop test block 3535 which tests whether J is less than or equal the number of subrules in B and whether K is less than or equal the number of subrules in C, and the difference variable is less than or equal to 1. In the event of an affirmative determination with respect to the test posed at block 3535, then as represented at line 3536 and block 3540, M is set as the subrule J of B and H is set as the subrule K of C. Then, as represented at line 3541 and block 3555, question is made as to whether. M subsumes H as determined in connection with the program 6000 described in connection with FIG. 19. In the event of an affirmative determination with respect to the test at block 3555, then as represented at line 3556 and block 3550, an additional comparison is called for. With the arrangement thus far described, the question is asked, does one subrule subsume the other?. Where that is the case, the program carries out an assurance procedure to ascertain the original determination to be correct. In this regard, it is important to be certain that the context where that rule appears is appropriate such that one rule subsumes the other. Therefore, the program saves the repetition symbols and combines the original repetition symbols with their parent symbols and repeats the question as to whether one subsumes the other. If that is the case, the repetition symbols are restored. On passing all tests, J and K are incremented as represented at respective blocks 3525 and 3530 inasmuch as, in effect, both compared successfully. As seen at block 3550, the repetition symbol of subrule M are saved in SM. The repetition symbol of M is set to the subordinate combination of the repetition symbols of B and M. Then, as represented at line 3551 and block 3565, the same procedure is carried out with respect to subrule H. In this regard, SH is set to save the repetition symbol of H and the repetition symbol of H is set to a subordinate combination of the repetition symbols of C and H. The subordinate repetition combinations were explained in conjunction with Table 2. Then, as represented at line 3566 and block 3570, the value of a comparison, COMP, is set to be the return value of a call to the program identified at 6000 with respect to M, H. M's repetition symbol is reset to SM and subrule H's repetition symbol is reset to SH. Then, as represented at line 3571 and block 3575, a determination is made as to whether the comparison succeeded. If it did, then as represented at line 3576 and block 3530, K is incremented and as represented at line 3531 and block 3525, J additionally is incremented. The routine then returns as represented at line 3526 to the test at block 3535.

Looking now to a failure of comparison which is determined either at block 3555 or at block 3575, then, as represented at respective lines 3557 or 3577 and block 3560, a determination is made as to whether subrule M has zero based repetitions, i.e. a repetition symbol having zero as an option. If that is not the case, then as represented at line 3561 and block 3545, the location where B and C differ is set as J and the variable difference, DIFF, is incremented by 1. The program then proceeds as represented by lines 3546 and 3562 to line 3531 and block 3525 whereupon J is incremented and the program resumes with the test at block 3535. Where two J's would differ, then it may be observed that the test at block 3535 would fall.

Where a determination is made at block 3560 that subrule M has zero based repetition symbols, then as represented at lines 3562 and 3531 as well as block 3525, J is incremented. Then the program continues.

A test at block 3535, inter alia, will continue until all of the K positions have been compared. At such time as the test falls, it is necessary to ascertain that all the remaining J's are zero based. Accordingly, as represented at line 3548 and block 3580, the test is set forth that J is less than or equal to the number of subrules in base B and K is greater than the number of subrules in comparison rule C, and that the DIFF variable is less than or equal to 1. Where that is the case, then as represented at line 3582 and block 3590, M is set as the subrule J Of B. This commences the procedure of looking through the remaining subrules in the base rule and ascertaining that they are zero-based. Accordingly, as represented at line 3591 and block 3595, the query is made as to whether M has zero-based repetition symbols. Where it does not, the program will locate this position as where B and C are different. Accordingly, with a negative determination with respect to the query at block 3595 as represented at line 3596 and block 3600, the variable WHERE is set at J and the variable DIFF is incremented by 1. Then, as represented at line 3601 and block 3585, the pointer J is incremented and, as represented at line 3586 and block 3580, the test at the latter block again is asserted. Where the query at block 3595 indicates that M has a zero based repetition symbol, then the program proceeds as represented at line 3597 to increment J as represented at block 3585.

Where the test posed at block 3580 fails, then a situation where the rules are off by one may be present. Accordingly, with the failure of the test posed at block 3580, as represented at line 3581 and block 3605, a next test is called for requiring that J be greater than the number of subrules in subrule B and that K be greater than the number of subrules in subrule C, and that the difference is exactly 1. Where that test is true, then as represented at line 3606, the new rule is made as a copy of subrule B with the WHERE position made zero based. Then, as represented at line 3616 and block 3620, the new rule is returned. Where the test at block 3605 falls, then, as represented at line 3607 and block 3610, the new rule now is made the return value of a call to routine 3430 with base rule B and comparison rule C. Routine 3430 will be seen to be positioned within the program represented generally at 3425 and described in conjunction with FIG. 15. The return of this new rule is represented by line 3611 and block 3620.

Figure 17:
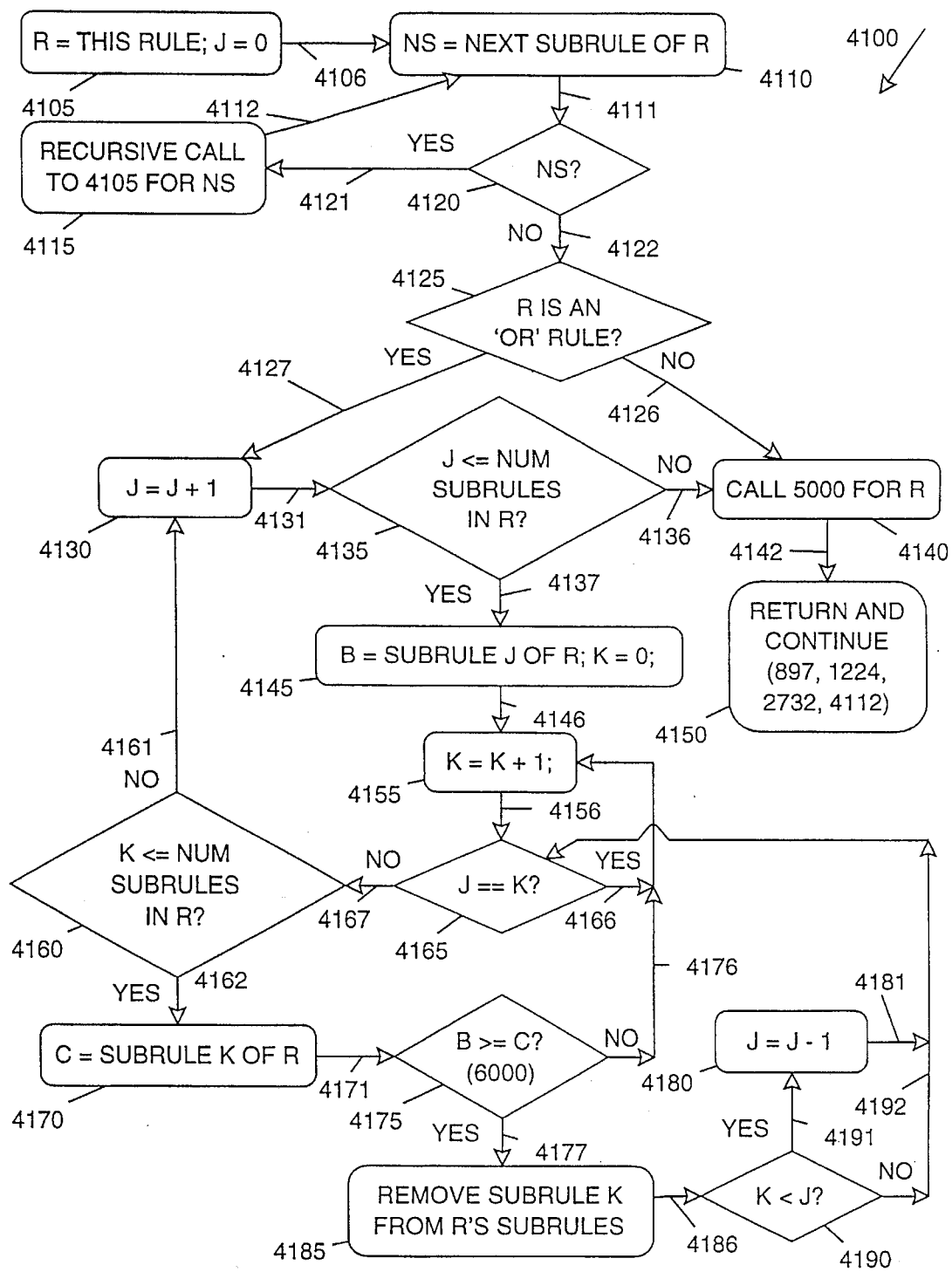
FIG. 17 is a flow chart for a redundant reduction routine described in connection with FIG. 7.

The final reduction procedure is described in connection with block 4100 in FIG. 7 and is termed a redundant reduction. The routine is illustrated with the same general numeration in FIG. 17 and functions to compare two rules to determine whether or not they are redundant. In FIG. 17, the program commences with block 4105 assigning variable R to THIS RULE and the pointer J to zero. Then as represented at line 4106 and block 4110, the variable NS is assigned as the next subrule of R and, as represented at line 4111 and block 4120, a query is made as to whether a next subrule of R is present. In the event that it is, then as represented at line 4121 and block 4115, a recursive call is made with respect to block 4105 for the next subrule and the program recursively loops to block 4110 as represented by line 4112. The subrules will have been called up when the test posed at block 4120 is false as represented ,at line 4122 directed to the inquiry posed at block 4125 which determines whether R is an OR rule. In the event of a negative determination with respect to this inquiry, then R is an AND rule or an element rule and, as represented at line 4126 and block 4140, the program calls the program identified as 5000 for R. Then, as represented at line 4142 at block 4150, the program returns and continues as represented at line 897 in connection with FIG. 5. Additionally, the return may be made to line 1224 as shown in FIG. 7; line 2732 as shown in FIG. 12; or line 4112 of the present figure.

Where it is determined that R is an OR rule in connection with block 4125, then as represented at line 4127 and block 4130, J is incremented. Then, as represented at line 4131 and block 4135, the value of J is tested to determine if it is less than or equal to the number of subrules in R. If it is not, then as represented at line 4136 and block 4140, the program is exited, the routine 5000 being called and the appropriate return of block 4150 being carried out, depending upon the caller.

Where the test posed at block 4135 is true, then as represented at line 4137, there are more subrules to compare, and next the base. B is set equal to the subrule J of R, and the pointer K is set to zero. Immediately thereafter, as represented at line 4146 and block 4155, K is advanced one increment and, as represented at line 4156 and block 4165, a determination is made as to whether J is exactly the same as K. If that is the case, then as represented at lines 4166 and 4176 leading to block 4155, K is incremented by 1 and the process continues. Where it is determined in connection with block 4165 that J is not equal to K, then as represented at line 4167 and block 4160, the query is posed as to whether K is less than or equal the number of subrules in R. If it is not, then K has been fully incremented and, as represented at line 4161 and block 4130, J is incremented. Where the test posed at block 4160 is true, then as represented at line 4162 and block 4170, the comparison rule C is set to be the subrule K of R. Then as represented at line 4171 and block 4175, a determination is made as to whether the base rule B subsumes the comparison rule C, the program identified at 6000, and described in connection with FIG. 19 being employed. Where a negative determination results from this inquiry, then as represented at line 4176 and block 4155, K is incremented. However, if the test posed at block 4175 is true, then as represented at line 4177 and block 4185, subrule K is removed from R's subrules. In carrying out this removal, it must be recalled that K could have been located before J inasmuch as K sequences through the comparison rules many times as J is sequencing through the base rules. This leads, as represented by line 4186, to the query posed at block 4190 as to whether K is less than J. If that is the case, then as represented at line 4191 and block 4180, J is decremented and, as represented at lines 4181 and 4192, the program returns to the query at block 4165. Where the test posed at block 4190 fails, then as represented at line 4192, that same return to block 4165 occurs.

REDUCTION GUIDE EXAMPLES

Following is a general summarization of the available reductions, giving a simple and complex example application of each reduction, and presenting some limitations of certain of the reductions. Note that in the following description, an atom can be a complete rule tree or an element.

(1500) Single and Empty:

Removes empty subrules and extraneous parentheses:

| A ( ) (B) | ==> A B |
| ((A?)+) ( ) ((B I (C))) (B)? | ==> A* (B I C) B? |

(1800) Collapse ANDs:

Collapses AND subrules up into parent AND rules, if repetition of subrules is ONE:

| (A B) C | ==> A B C |
| A B (C D) F (G H) * | ==> A B C D F (G H) * |

NOTE: This reduction can remove groupings that could be used to recognize patterns:

| (A B) (A B) + | ==> A B (A B) + |

Whereas if left alone, the 'Repeating Atoms' reduction could have reduced the above to (A B)+.

(2100) Collapse ORs:

Collapses OR subrules up into parent OR rules, if the parent repetitions subsume the subrule repetitions:

| (A I B) I C | ==> A I B I C |
| (A I (B I C) I (D I E) +) * | ==> (A I B I C I D I E) * |

(2400) Repeating Atoms:

Collapse repeating atoms in a subrule, using '+' as the repetition symbol. This reduction assumes that if there are two or more identical atoms side by side, then there can be one or more. If it is desired to have a specific number of atom instances (i.e. two A's and three B'S) this reduction would not be utilized.

| A A A | ==> A+ |
| A A? (B I C I B+)+ (B I C I B+) D | ==> A * (B+ I C) + D |

(2700) PCDATA to ORs:

In the SGML world, any rule that contains PCDATA should be an OR rule. When parsing textual input to derive the grammar, PCDATA is often "seen" in an AND rule. This reduction allows a change of the AND PCDATA rules into OR rules. This often greatly simplifies a grammar. Note that the new OR rule is then assumed to allow repetition, and that this affects all subrules in this rule (e.g. in the second example, the subrule A B is also changed):

| A #PCDATA | ==> (A I #PCDATA) + |
| A B I #PCDATA B | ==> (A I B I #PCDATA) + |

(3000) Identical Bases:

Ignoring whether or not subrules subsume one another (other reductions maintain proper subsumes relations), this reduction combines all AND subrules that have identical base atoms. This sometimes expands the language of the grammar tremendously while only minimally reducing the number of rules:

| (A B) * | A? B? | ==> (A? B?) * |
| (A B) * | (A? B?) | A B | ==> (A? B?) * |

NOTE: Identical Bases may not be exactly what is desired since it can create a much more generous language than was intended. For instance, in the following, the original language did not include A A, but the combined rule does:

| (A B? | A * B) | ==> A * B? |

Or consider the following where the resulting rule is any string of A's and B's whereas the original language was 'A, B, and any number of repeating ABs':

| (A B) * | (A? B?) | ==> (A? B?) * |

(3300) Off by One

When creating a document grammar by example, one does not 'see' zero repetitions. So, reductions based on repetition summations are not exercised to the fullest. This reduction finds all subrules that differ by at most one place, noticing that the place they differ represents a zero-based repetition. Thus, this reduction allows the user to get '?' and '*' into the grammars that are 'produced by example':

| A B C | A C | ==> A B? C |
| A B C | A C | A B | ==> A B? C | A B C? |

NOTE: In the second example above, the reduced rule is NOT A B? C? as this would then allow an A to exist by itself. This would not be correct since in the original, A never appeared alone.

(4100) Redundant:

This reduction removes obvious duplicates based on subsumes rules for repetitions and equality of atoms. In a perfect world, this would exactly match theoretical language summation. However, most of the checking is fairly syntactic, staying away from computationally expensive checks. Still, it reduces a large amount:

| A B | A B * | ==> A B * |
| A B | A B * | A B | C | C | ==> A B * | C |

All:

Applies all of the above reductions, attempting to generate the best reduced grammar possible. In some cases, the user may want to select all of the above except 'Identical Bases' and apply them more than once. In this way, the results are closer to the original grammar. (See notes on Identical Bases as to why the user might want to do this.)

Figure 18:
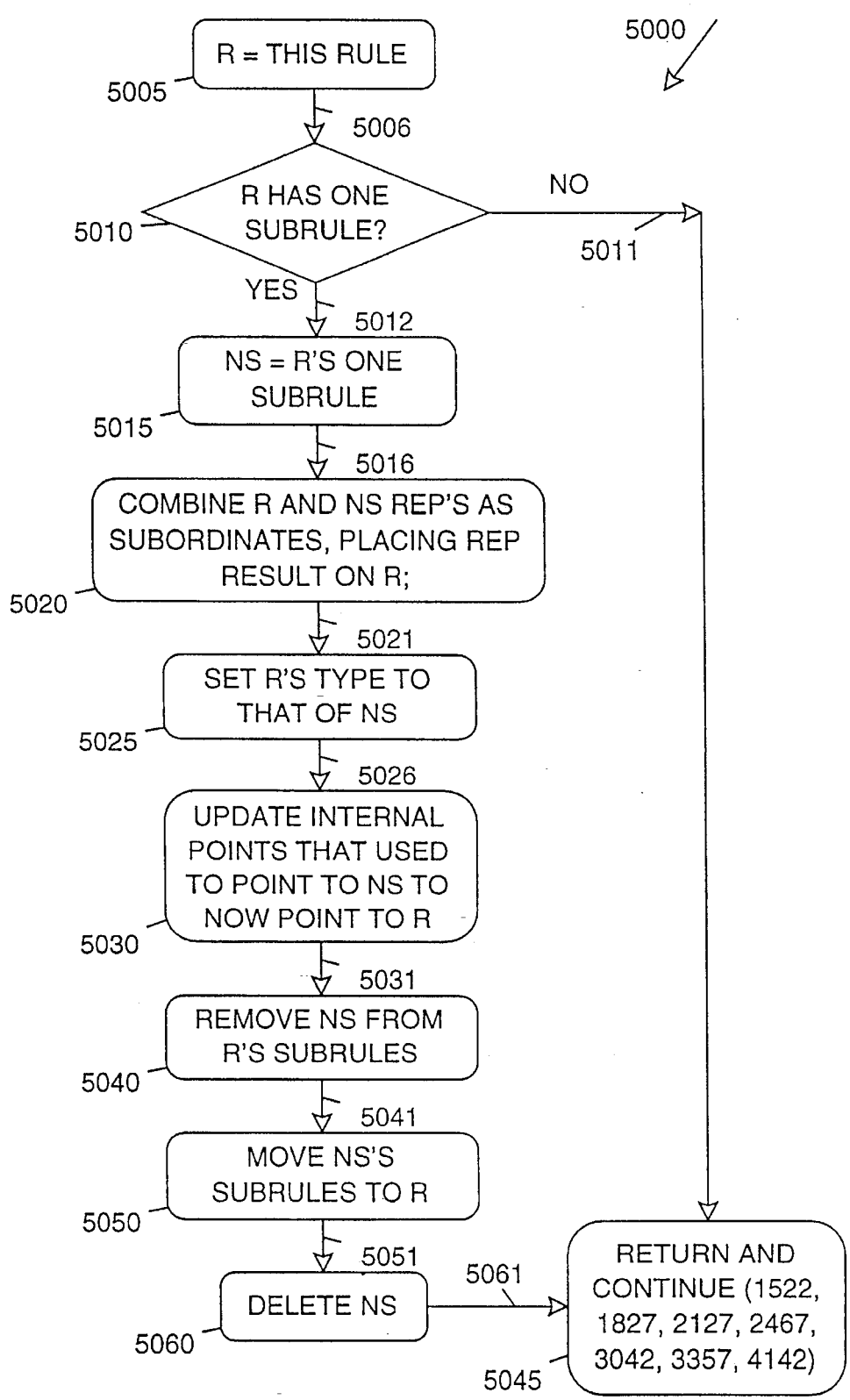
FIG. 18 is a flow chart for a reduction routine which is called in connection with the flow charts of FIGS. 8–11, 13, 14, and 17.

Referring to FIG. 18, the program referred to in numerous instances as "5000" is illustrated and identified by that general numeration. In effect, the reductions which have called this program have taken a heirarchical tree structure at some level and shrunk it widthwise so that there may remain3 only one subrule. For example, where R is an AND rule and only one subrule is involved it is logical to pull-up the subrule and change R accordingly. Looking to the program and block 5005, the variable R is set to THIS RULE, and, as represented at line 5006 and block 5010, a query is made as to whether R has one subrule. If it does not, then as represented by line 5011 and block 5045, the routine returns to any of the various positions from which it was called as listed in the latter block. Where R has one subrule, then as represented at line 5012 and block 5015, the next subrule variable NS is set to R's one subrule. Then, as represented at line 5016 and block 5020, the repetition symbols of R and NS are combined as subordinates, placing the repetition symbol result on R. It may be recalled that the logic for this technique has been described in connection with Table 2 above. Then, as represented at line 5021 and block 5025, in effect, the subrule NS is pulled up and R's type becomes that of NS. Then, as represented at line 5026 and block 5030, the internal pointers are updated inasmuch as NS will be removed and its subrules moved into R. Accordingly, as represented at line 5031 and block 5040, NS is removed from R's subrules and as represented at line 5041 and block 5050, NS's subrules are moved to R. Then, as represented at line 5051 and block 5060, NS is deleted. Then, as indicated by line 5061 and block 5045, the program returns to the position from whence it was called as identified in the latter block.

Program 5000 is quite useful inasmuch as it avoids a necessity for recursively working down the heirarchical tree for pruning purposes. Inasmuch as this pruning technique is called as the programs are returning up the tree, such returns in the opposite direction are not required. The result is a significant increase in the speed of the program and a maintenance of the heirarchical structure in canonical order.

Figure 19:
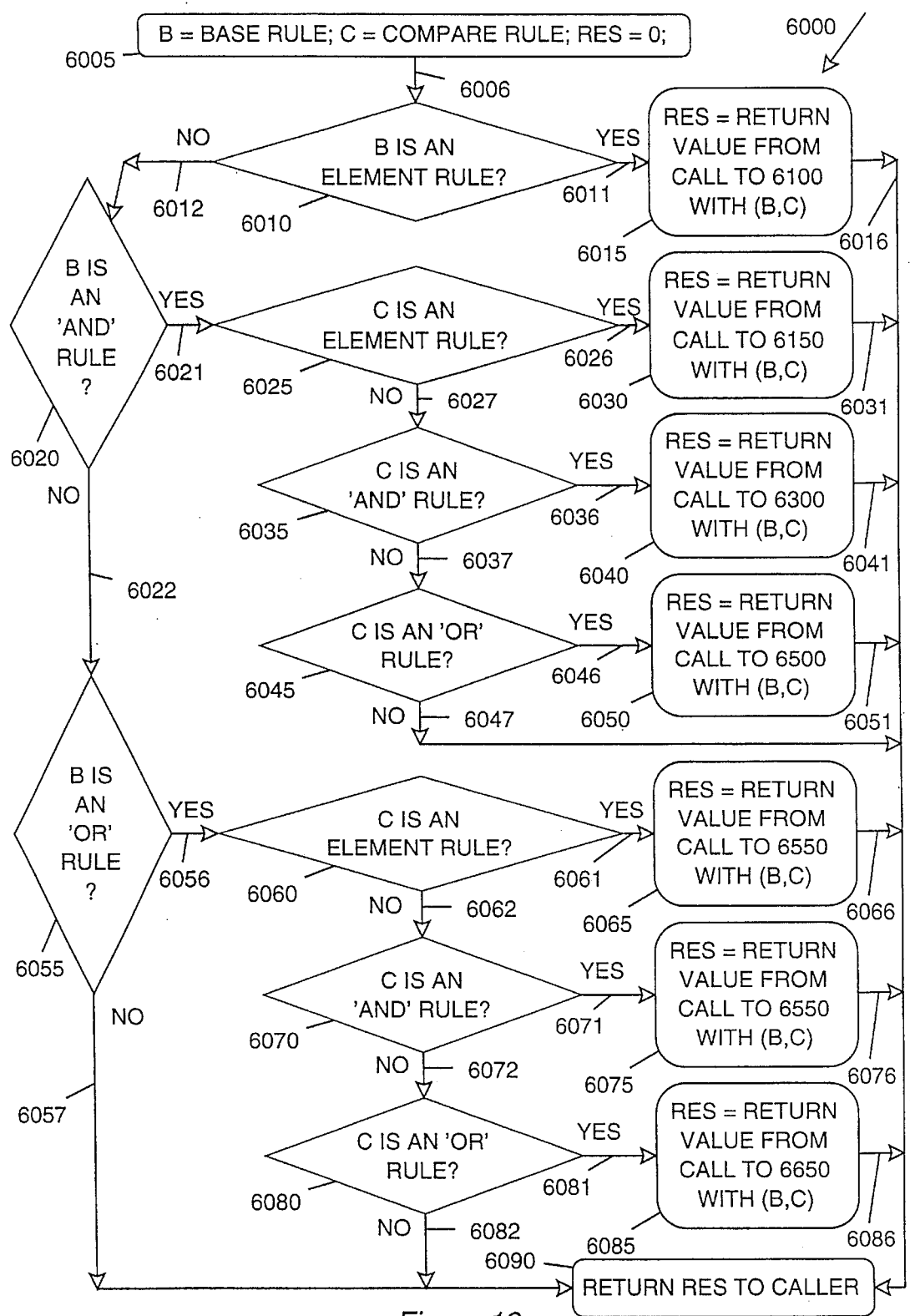
FIG. 19 is a flow chart showing a comparison procedure which is called from the flow charts of FIGS. 15–17.

Referring to FIG. 19, the comparison procedure which is indicated as being called at block 3450 in FIG. 15, block 3555 in FIG. 16, and block 4175 in FIG. 17 is illustrated at a first level of detail.

In the discourse to follow, in addition to carrying out a combination of repetition symbols as subordinates as discussed in connection with Table 2 above, logic will be employed in certain of the routines for carrying out a subsuming of one repetition symbol based rule by another. Such a subsumption is represented symbolically by > sign and is based upon the repetition symbols involved alone.

These observations may be set forth in tabular form as shown below in Table 3.

TABLE 3

| ≧ | ? | 1 | + | * |
|---|---|---|---|---|
| ? | = | A |   |   |
| 1 |   | = |   |   |
| + |   | B | = |   |
| * | C | D | E | = |

In the table, the above alphabetical identification is provided where the answer to the subsumption question is positive. These are described in the following listing:

| A:? ≧ 1: | zero or more | subsumes | one |
| B:+ ≧ 1: | one or more | subsumes | one |
| C:* ≧ ?: | zero or more | subsumes | zero or one |
| D:* ≧ 1: | zero or more | subsumes | one |
| E:* ≧ +: | zero or more | subsumes | one or more |

In the above listing, for example, at A, zero or one as represented by a ? symbol is seen to subsume 1. At B, one or more as represented by the + sign repetition symbol will subsume 1. At C, it may be observed that zero or more as represented by a star subsumes zero or one which is represented by a question mark. At D, zero or more as represented by a star subsumes one. At E, zero or more as represented by star subsumes one or more as represented by a + sign.

At places within the table which are empty, the subsumption is not available. Table 3 is based upon the posing of the question as whether a first repetition symbol subsumes a second repetition symbol. Reversing the table will answer the question posed oppositely, that is, is a given repetition symbol subsumed by another repetition symbol.

As initially presented in FIG. 19, the procedure 6000 will seek to compare two rules. It then becomes necessary to determine what the two types of rules are in order to determine what routine to call for the comparison. Accordingly, looking to the initial block at 6005, B is set to the base rule; C is the comparison rule, and the comparison result, RES is set to zero. Then, as represented at line 6006 and block 6010, a query is made as to whether the base is an element rule. If that is the case, then as represented at line 6011 and block 6015, the result will be the return value from a call to routine 6100 with B and C as described in connection with FIG. 20. Then, as represented at line 6016 and block 6090, the result is returned to the caller as identified above.

Where the base B is not an element rule, then as represented at line 6012 and block 6020, a test is made as to whether the base rule B is an AND rule. If it is, then as represented at line 6021 and block 6025 the query is made as to whether the compare rule is an element rule. In the event that it is, then as represented at line 6026 and block 6030, the result is set as the return value from a call to a routine identified at 6150 with B and C. The latter routine is described in conjunction with FIG. 21. As represented at line 6031 and 6016, the result is returned to the caller as described above. Where it is determined that the comparison rule C is not an element rule, then as represented at line 6027 and block 6035, the query is made as to whether C is an AND rule. In the event of an affirmative determination, then as represented at line 6036 and block 6040, the result will be the return value from a call to a routine identified as 6300 performing in conjunction with rules B and C. Upon receiving that result, then as represented at lines 6041 and 6016 as well as block 6090, the result is returned to the caller.

Where the test posed at block 6035 results in a negative determination, then as represented at line 6037 and block 6045, a query is made as to whether C is an OR rule. In the event that it is, then as represented at line 6046 and block 6050, the result is made the return value from a call to a return identified as 6500 with rules B and C. The latter routine is described in connection with FIG. 23 and the result, as represented by lines 6051 and 6016 as directed to block 6090 is returned to the caller. Where a determination is made that C is not an OR rule, then as represented at lines 6047 and 6016, the procedure returns at block 6090.

Returning to the query posed at block 6020, where the base rule B is not an AND rule, then as represented at line 6022 and block 6055, then the program inquires as to whether base rule B is an OR rule. In the event of an affirmative determination, then as represented at line 6056 and block 6060, a query is made as to whether the comparison rule C is an element rule. In the event that it is, then as represented at line 6061 and block 6065, the result is provided as the return value from a call to a routine identified as 6550 with base and comparison rules B and C. That routine is described in conjunction with FIG. 24. Then, as represented at lines 6066 and 6016, the program returns to the caller as represented at block 6090. Where the determination at block 6060 is that C is not an element rule, then as represented at line 6062 and block 6070, a determination is made as to whether C is an AND rule. In the event that it is an AND rule, then as represented at line 6071 and block 6075, the result is determined as the return value from a call to the above-noted routine identified at 6550 with base and comparison rules B and C. Then, as represented at lines 6076 and 6016, the result is returned to the caller as provided in conjunction with block 6090.

Where C is determined not to be an AND rule in conjunction with block 6070, then as represented at line 6072 and block 6080, the query is made as to whether C is an OR rule. In the event that C is an OR rule, then as represented at line 6081 and block 6085, the result will be the routine value from a call made to a return identified as 6650 with base and comparison rules B and C. The routine identified as 6650 is described in conjunction with FIG. 25. Then, as represented by lines 6086 and 6016, a return of the result to the caller is made as represented at block 6090. Where the determination at block 6080 is that C is not an OR rule, then as represented at line 6082 and line 6057, the procedure returns to the caller as represented at block 6090. As represented at line 6057, this same return is carried out in the event that the query posed at block 6055 results in a determination that B is not an OR rule.

Figure 20:
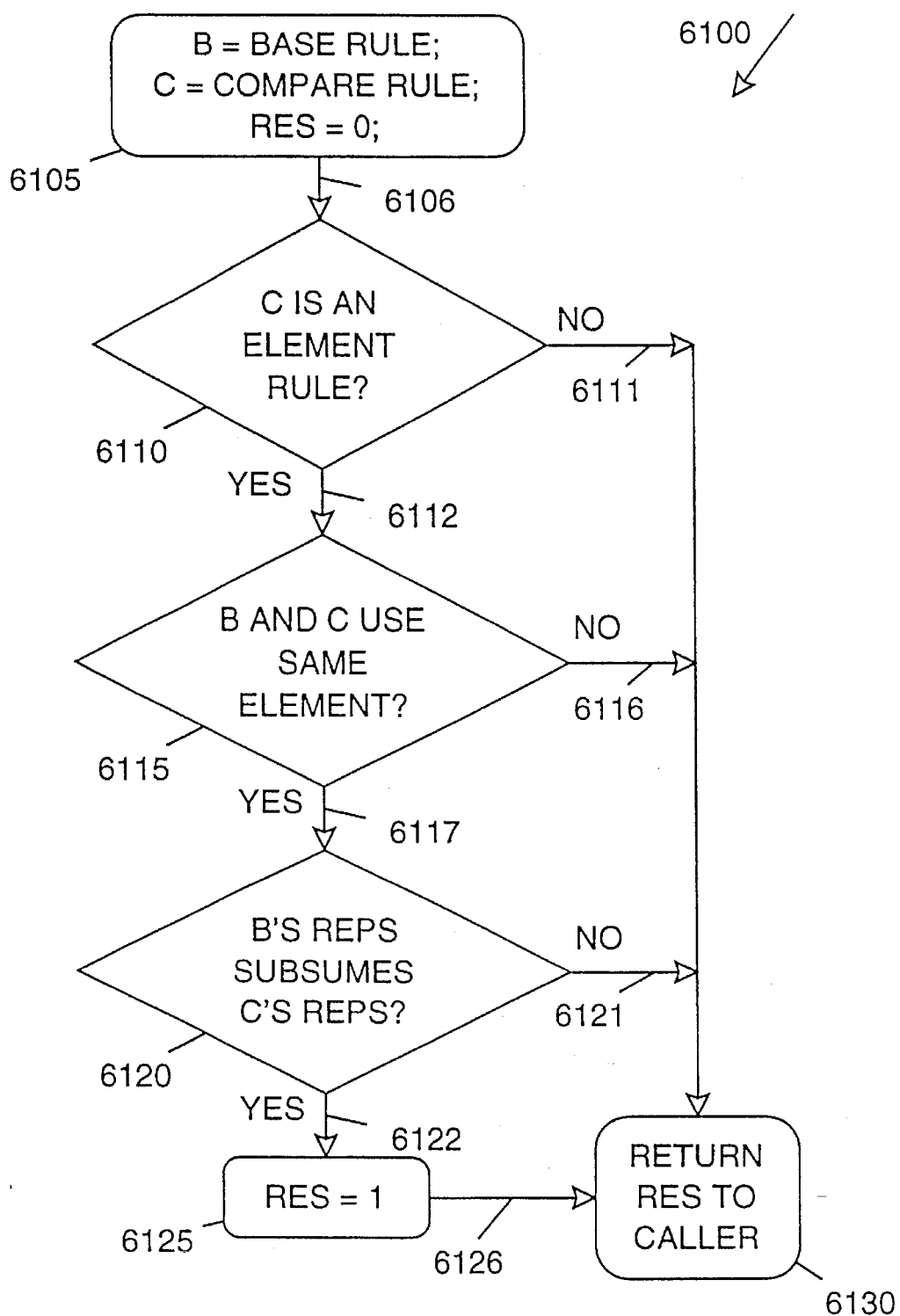
FIG. 20 is a flow chart of a routine which is called from the flow chart of FIG. 19.

Referring to FIG. 20, the routine identified at 6100 in conjunction with block 6015 in FIG. 19 is illustrated. The routine commences at block 6105 where B is set as the base role; C is set as the compare rule; and the result, RES, is set as zero. It is known that the base role B is an element rule and thus the comparison rule will have to be an element role. Accordingly, as represented at 6106 and block 6110, an inquiry is made as to whether C is an element role. If it is not, then as represented at line 6111 and block 6130, the result, which remains zero, is returned to the caller. Where the query at block 6110 results in a determination that C is an element rule, then as represented at line 6112 and block 6115, a determination is made as to whether base rule B and the comparison rule C use the same element. In the event they do not, then as represented at lines 6116 and 6111, the zero result is returned to the caller as represented at block 6130. Where the respective base rule and comparison role B and C use the same element, then as represented at line 6117 and block 6120, the inquiry is made as to whether the repetition symbols of the base rule B subsume the repetition symbols of the comparison rule C. This procedure is carried out employing logic described in conjunction with Table 3 above. In the event of a negative determination with respect to the query posed at block 6120, then as represented at lines 6121 and 6111, the zero result is returned to the caller as set forth at block 6130. Where a subsumption is possible as a result of the query at block 6120, then as represented by line 6122 and block 6125, the result is set at 1 and as represented at line 6126 and block 6130, the result is returned to the caller.

Figure 21:
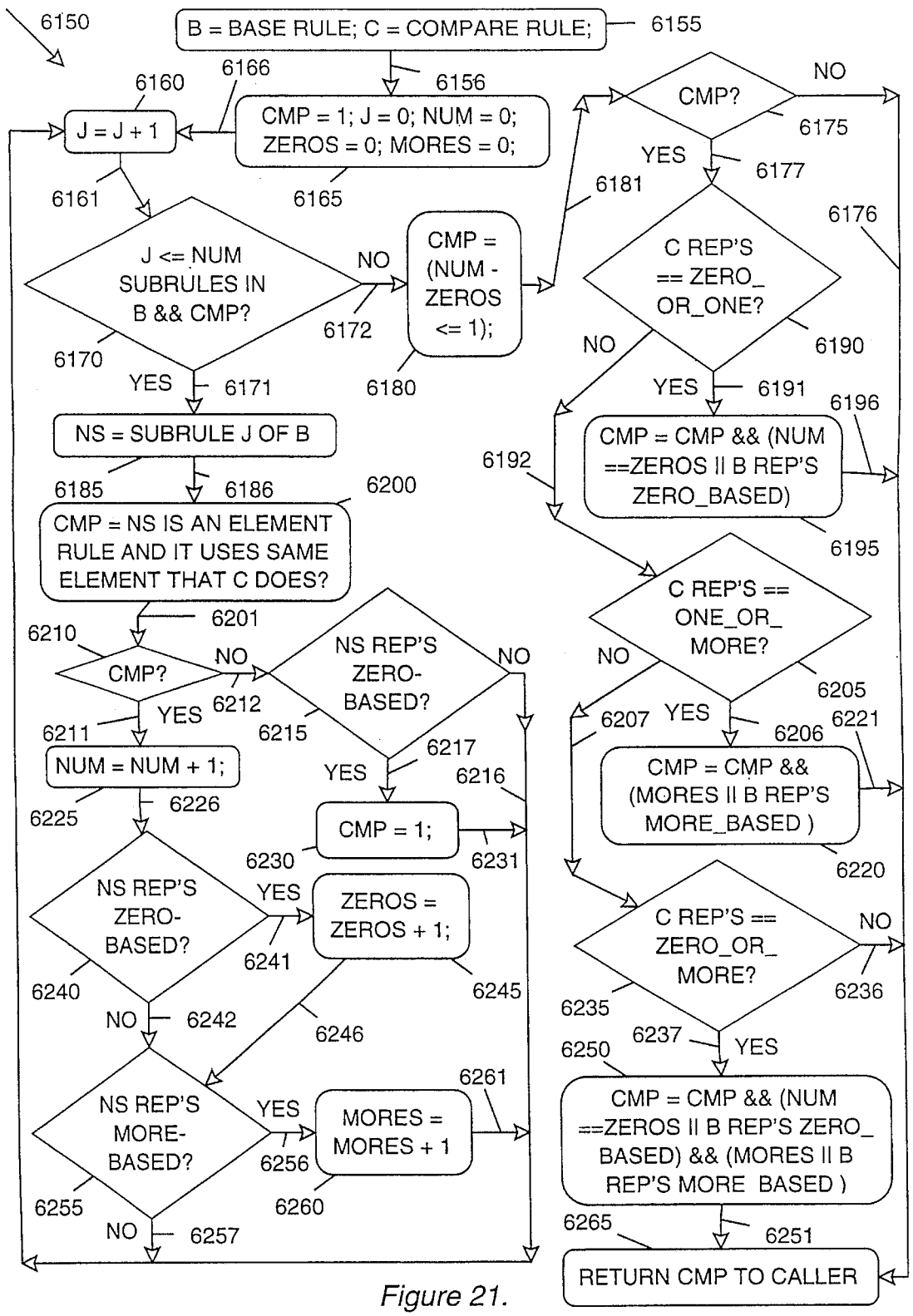
FIG. 21 is a flow chart of a routine which is called from the flow chart of FIG. 19.

Referring to FIG. 21, the routine identified as 6150 in conjunction with block 6030 in FIG. 19 is illustrated. This routine compares an AND role with an element rule. To carry this out, the repetition symbols must be accounted for. For instance, if the element rule is zero based, then if the AND rule has multiple occurrences of this element, the routine must assure that it can eliminate all of those occurrences of the element. That is, the AND rule itself must be zero based or all of the occurrences of the element in that AND rule must be zero based. For example, if the element rule is: author; if the AND rule is: author-title-author-title; then both of the components, author, in the AND rule must have zero based repetitions if the element rule, author, is zero based. Accordingly, the routine must assure that repetitions match up, taking account of all the occurrences of the element rule within the AND rule and further taking into account other repetition bases within each one of those.

In the figure, the routine commences at block 6155 wherein B is set as the base rule and C is set as the element comparison rule. Then, as represented at line 6156 and block 6165, a comparison flag, CMP is set to 1. The value of this comparison flag is returned. Accordingly, the routine initially assumes that a comparison was successful. Next, the number of comparison matches, NUM, is set to zero in that at this juncture no matches have been found. Further, the count for ZF-ROS is set to zero and the count for MORES is set to zero. In the above, MORES represent the number of more based matches where the matched element has a repetition symbol of + or *. ZEROS represent the number of zero based matches where the matched element has a repetition symbol of ? or *.

The routine then continues as represented at line 6166 and block 6160 where J, which is going to increment over the subrules of B, is incremented by 1. Then, as represented at line 6161 and block 6170, a determination is made as to whether J is less than or equal the number of subrules in B AND there is still a valid comparison. It may be recalled that CMP was set to 1 and thus an affirmative response on the first iteration or pass is achieved as represented at line 6171 which extends to block 6185. At block 6185 the next subrule is set as the subrule J of B and, as represented at line 6186 and block 6200, a determination is made as to whether NS, the next subrule, is an element rule and whether it uses the same element that C does. If that is the case, then a valid comparison is present. Then, as represented at line 620 1 and block 6210, a determination is made as to whether or not there is a valid comparison, CMP. If the subrule at hand is not an element, then as represented at line 6212 and block 6215, a determination is made as to whether the repetition symbol of subrule NS is zero-based. If it is not, then as represented at line 6216, the routine returns to block 6160 and increments J. Where the query at block 6215 determines that the repetition symbol of subrule NS is zero-based (* or ?), then as represented at line 6217 and block 6230, the comparison flag is set as 1, and as represented at line 6231 and 6216, the routine returns to increment J as represented at block 6160. Using the above example of author-title-author-title as the base rule with author as the comparison rule the result achieving a comparison at block 6230 would be if the component "title" were zero based. CMP will be at zero if the test at block 6215 fails, and the routine will enter into the testing at the right-hand side of FIG. 21.

Returning to block 6210, in the presence of an exact comparison, then as represented at line 6211 and block 6225, the variable NUM is incremented by 1 to mark the number of matches found so far. Next, the routine marks the repetition symbol of the component which was matched if it was zero based. Accordingly, as represented at line 6226 and block 6240, a query is made as to whether the repetition symbol of NS is zero based. If it is, then as represented at line 6241 and block 6245, the zero based count, i.e. ZEROS is incremented by 1 and, as represented at line 6246, the routine proceeds to determine whether or not that repetition symbol also is more based, it being understood that a star is both zero based and more based. Line 6246 as well as line 6242 from block 6240 are directed to the query at block 6255. Line 6242 represents that the repetition symbol of the subrule is not zero based. At block 6255, a determination is made as to whether the repetition symbol of the subrule is more based, i.e. if it is a plus sign or star. In the event of an affirmative determination, then as represented at line 6256 and block 6260, the MORES count is incremented by 1 and the routine loops to block 6160 and the incrementation of J as represented by lines 6261 and 6216. Similarly, with a negative determination With respect to the query posed at block 6255, the same return to block 6160 is made as represented at lines 6257 and 6216. At the completion of the query at block 255, the routine has accounted for the number of MORES, ZEROS, and matches. The routine will either eventually terminate due to the failure of themst for CMP at block 6170, or because the number of subrules of the base B is exhausted to cause a failure of the test at block 6170. Where a negative determination is made at block 6170, then as represented at line 6172 and block 6180, the murine resets the comparison value. In this regard, CMP is set to be NUM, the number of matches less ZEROS, the number of zero based matches there were, and the fact that that is less than or equal to 1 designates that there is at least one occurrence of the element. Thus, all of the repetition symbols to be considered include the definition of 1. For example, a ?, + or a *. Then, as represented at line 6181 and block 6175, a determination is made as to whether a valid comparison still is present. In the event that it is not, then the routine exits as represented at line 6176 and block 6265, returning the comparison result as CMP to the caller. Where the test at block 6175 is true, it is known that a match has been made with respect to the 1, then as represented at line 6177, the murine looks to the query posed at block 6190. This inquiry determines whether the repetition symbol C is zero or 1, i.e. a ?. In the event of an affirmative determination, then as represented at line 6191 and block 6195, the comparison, CMP will be present as positive and the number of matches must equal the number of zero based subrules or the repetition symbols of the base B must be zero based. With those conditions, then a match is made and the routine continues as represented at lines 6196 and 6176 to return CMP to the caller as a result.

On the occurrence of a negative determination with respect to the test at block 6190, then as represented at line 6192, the murine looks to the query posed at block 6205 which determines whether or not the repetition symbols of the comparison rule C are 1 or more, i.e. a + sign. In the event that is true, then as represented at line 6206 and block 6220, a comparison is present where CMP is positive and MORES are present, i.e. a more based match occurred, or the overall symbol on the base B is MORE based. Then, as represented at lines 6221 and 6176, the routine is directed to block 6265 where CMP is returned to the caller. An example of the conditions at block 6220, for example, will be a base rule which is (A T?)+ which will subsume a comparison element rule such as A+.

Where the test posed at block 6205 results in a negative determination, then as represented at line 6207 and block 6235, a determination is made as to whether the repetition symbol of the comparison rule C is zero or more, i.e. a *. In the event the symbol is not, then as represented at lines 6236 and 6176, the routine returns to the caller with CMP as the result, as represented at block 6265. An affirmative determination with respect to the query at block 6235 as represented at line 6237 leads to the determination at block 6250. This checks for both ZERO and MORES. For a comparison, NUM must equal ZEROS, i.e. all subrules are zero based, AND there are MORES or the repetition symbol of the base B is more based. Then, as represented at line 6251 and block 6265, CMP is returned to the caller as the result.

Figure 22:
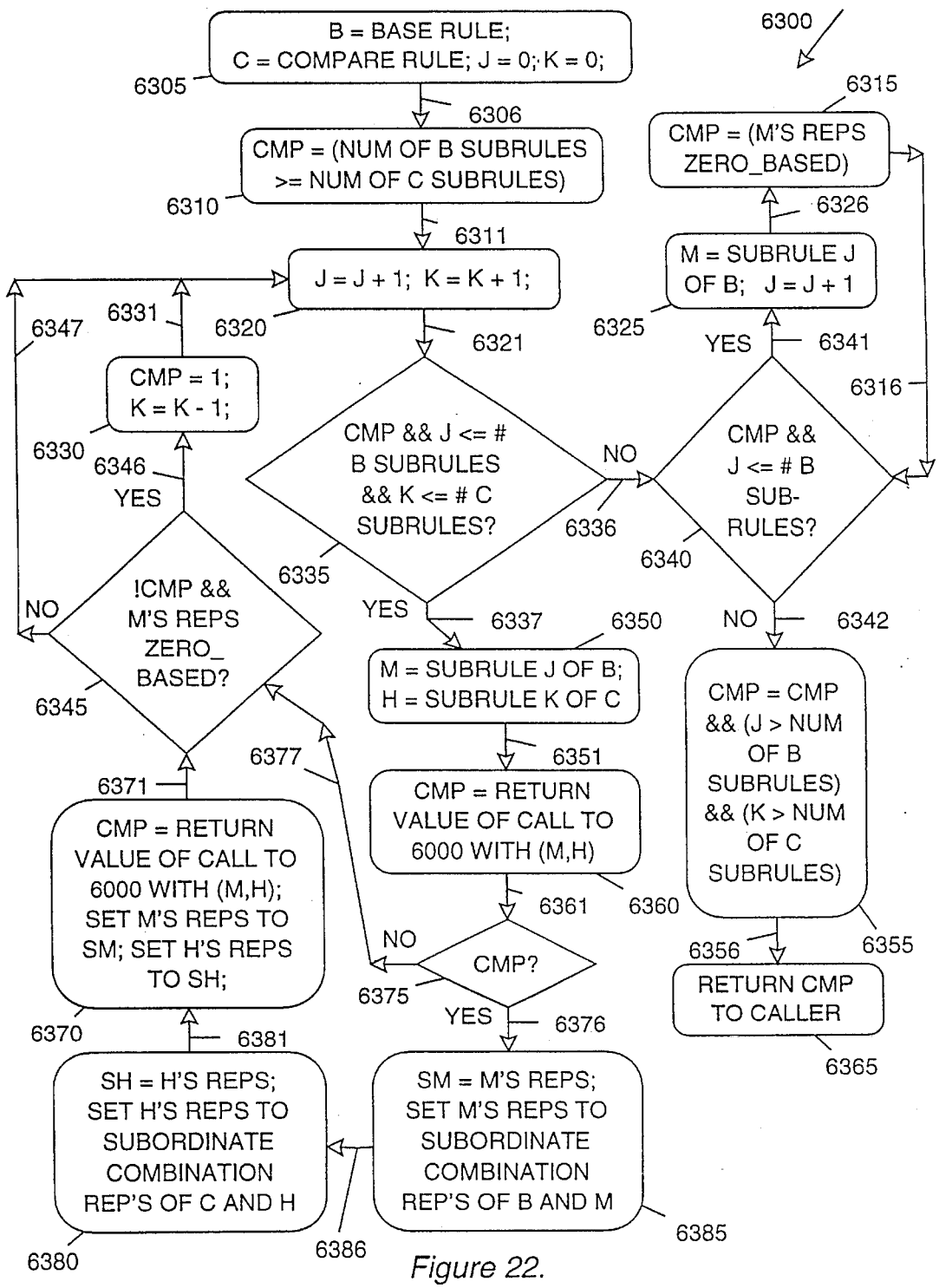
FIG. 22 is a flow chart of a routine which is called from the flow chart of FIG. 19.

Referring to FIG. 22, the routine identified as 6300 and called from block 6040 in FIG. 19 is illustrated. This routine functions to compare an AND rule with an AND rule. The routine considers each of the subrules from both the base rule and the comparison rule, and attempts matching during those comparisons. The routine commences at block 6305 where B is set to be the base rule and C is set as the comparison rule. The pointer J which looks to the subrules of B is set to zero, and pointer K which looks to the subrules of C is set to zero. As represented at line 6306 and block 6310, a check is made assuring that the number of subrules in B is greater than or equal to the number of subrules in C. Then, as represented at line 6311 and block 6320, J and K are incremented by 1 and, as represented at line 6321 and block 6335, a test is posed determining the presence of conditions as to whether a valid comparison value exists, which is ANDed with the condition that J is less than or equal to the number of subrules in the base B, and in turn, ANDed with the condition that K is less than or equal to the number of subrules in C. In the event that test fails, then as represented at line 6336 and block 6340, a determination is made as to whether the comparison, CMP is valid, and J is less than or equal the number of subrules in B, then it is necessary to ascertain that all of the remainder of the J positions are zero based. Accordingly, as represented at line 6341 and block 6325, M is set as the subrule J of B and J is incremented by 1. As represented at line 6326 and block 6315, the comparison remains valid if the repetition symbol of M is zero based. As represented at line 6316, the murine then returns to the query at block 6340. When the test posed at block 6340 is true, then as represented at line 6342 and block 6355, the comparison remains valid where the value of J is greater than the number of subrules in B, and the value of K is greater than the number of subrules in C, i.e. the subrules in each have been checked. Then, as represented at line 6356 and block 6365, the CMP value is returned to the caller as a result.

Where the test posed at block 6335 is true, then as represented at line 6337 and block 6350, M is set as the subrule J of the base rule B and H is set as the subrule K of the comparison rule C. Then as represented at line 6351 and block 6360, the comparison value is set as the return value of the call to program 6000 with M and H. The program 6000 is that described at FIG. 19. Thus, that entire program 6000 is called for the two subrules M and H. Then, as represented at line 6361 and block 6375, a determination is made as to whether the comparison is valid. It is necessary that these repetitions subsume themselves where they exist. Accordingly, with an affirmative determination with respect to the presence of a comparison at block 6375, the program continues as represented at line 6376 to save M's repetition symbol as SM and to set M's repetition symbol to a subordinate combination of the repetition symbols of B and M. This is as described in connection with Table 2. Then, as represented at line 6386, repetition symbol H is saved as SH. Then, the repetition symbol of H is set to a subordinate combination of the repetition symbols of C and H. The program then continues as represented at line 6381 and block 6370 where the comparison value now is the return value of a call to the earlier-noted program 6000 with M and H wherein M's repetition symbol is reset to SM and the repetition symbol of H is reset to SH, the earlier saved value. Then, as represented at line 6371 and block 6345, in the event that they do not compare and the repetition symbol(s) of M is zero based, a match can be called for as represented at line 6346 and block 6330 where CMP is set to 1. Additionally, it is necessary to acquire the root K. Therefore, the pointer K is decremented by land, as represented by line 6331, the program returns to block 6320 for carrying out a comparison with the previous K position and the next J position. Thus, the position of K is looked at another time since there was no match. Returning to block 6345, where there was a successful comparison, then as represented at line 6347 and 6331, the program continues as represented at block 6320 with the incrementation of the J and K pointers. Returning to block 6375, a negative result results in line 6377 and block 6345 being accessed. Block 6345 having been described above.

Thus, with the program procedure 6300, the subrules of the base and comparison rules are compared and any extra subrules of the base are ascertained to be zero-based as discussed in connection with block 6325 and 6315. Otherwise, the entire program 6000 is used recursively.

Figure 23:
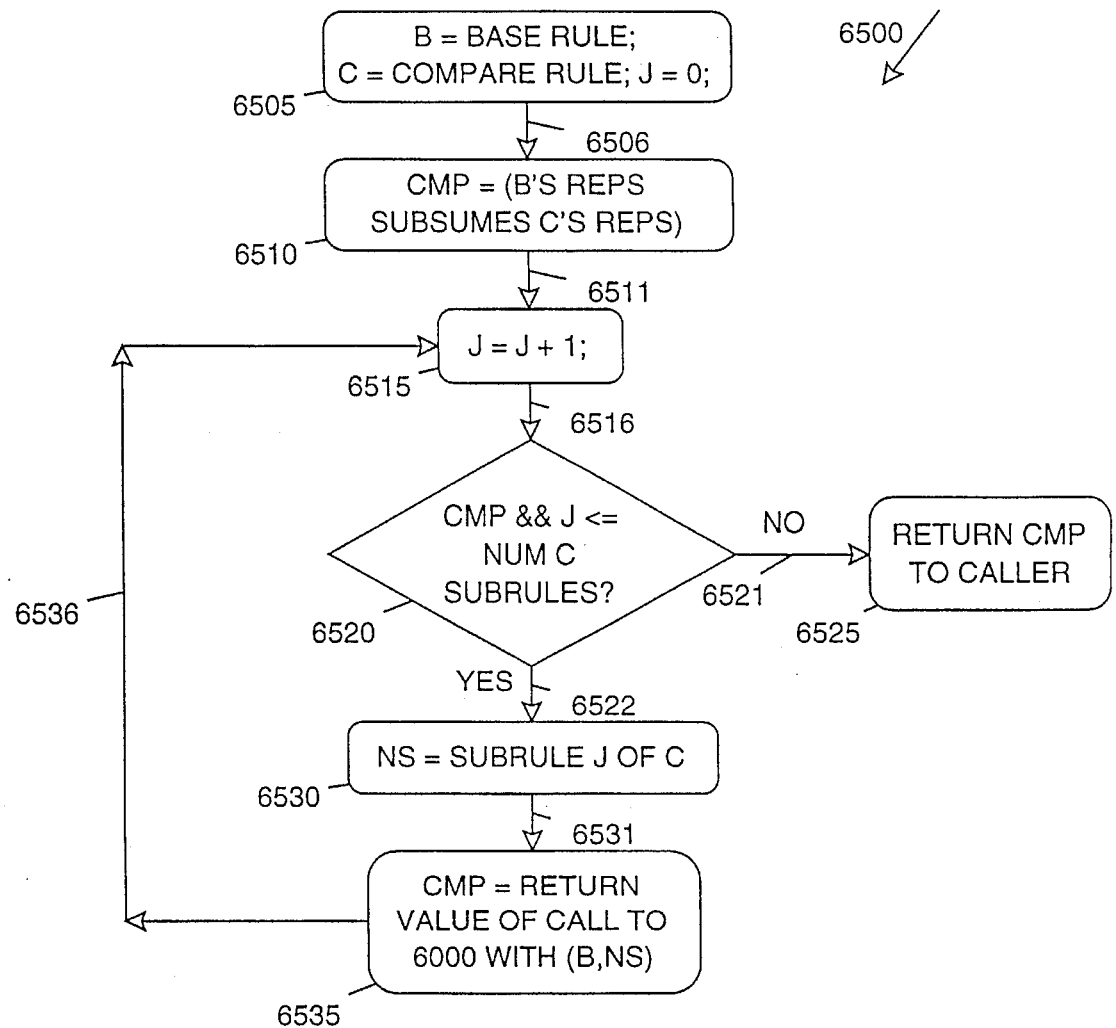
FIG. 23 is a flow chart of a routine which is called from the flow chart of FIG. 19.

Referring to FIG. 23, the procedure identified at 6500 which is called from block 6050 in FIG. 19 is illustrated. This procedure compares an AND rule to an OR rule.

Looking to block 6505, B is set to the base rule which is the AND rule, and C is set to the comparison rule which is the OR rule, the pointer J being set to zero. Then, as represented at line 6506 and block 6510, the comparison condition is set in general such that the repetition symbol of B must subsume the repetition symbol of C. Then, as represented at line 6511 and block 6515, J is incremented by 1 whereupon, the procedure continues as represented at line 6516 and block 6520. At block 6520, the test is made that the comparison, CMP, remains valid and J is less than or equal the number of subrules at C. Where that is not true, then as represented at line 6521 and block 6525, CMP is returned to the caller. Where the test posed at block 6520 is true, then, as represented at block 6530 the next subrule is set as the subrule J of C. Then, as represented at line 6531, the result of the comparison, CMP is the return value of a call to the program 6000 with B and NS. The procedure then loops to block 6515 as represented at line 6536. At some point, the test posed at block 6520 will indicate that CMP has convened to zero or that the value of J is then greater than the number of subrules of the comparison rule C.

Figure 24:
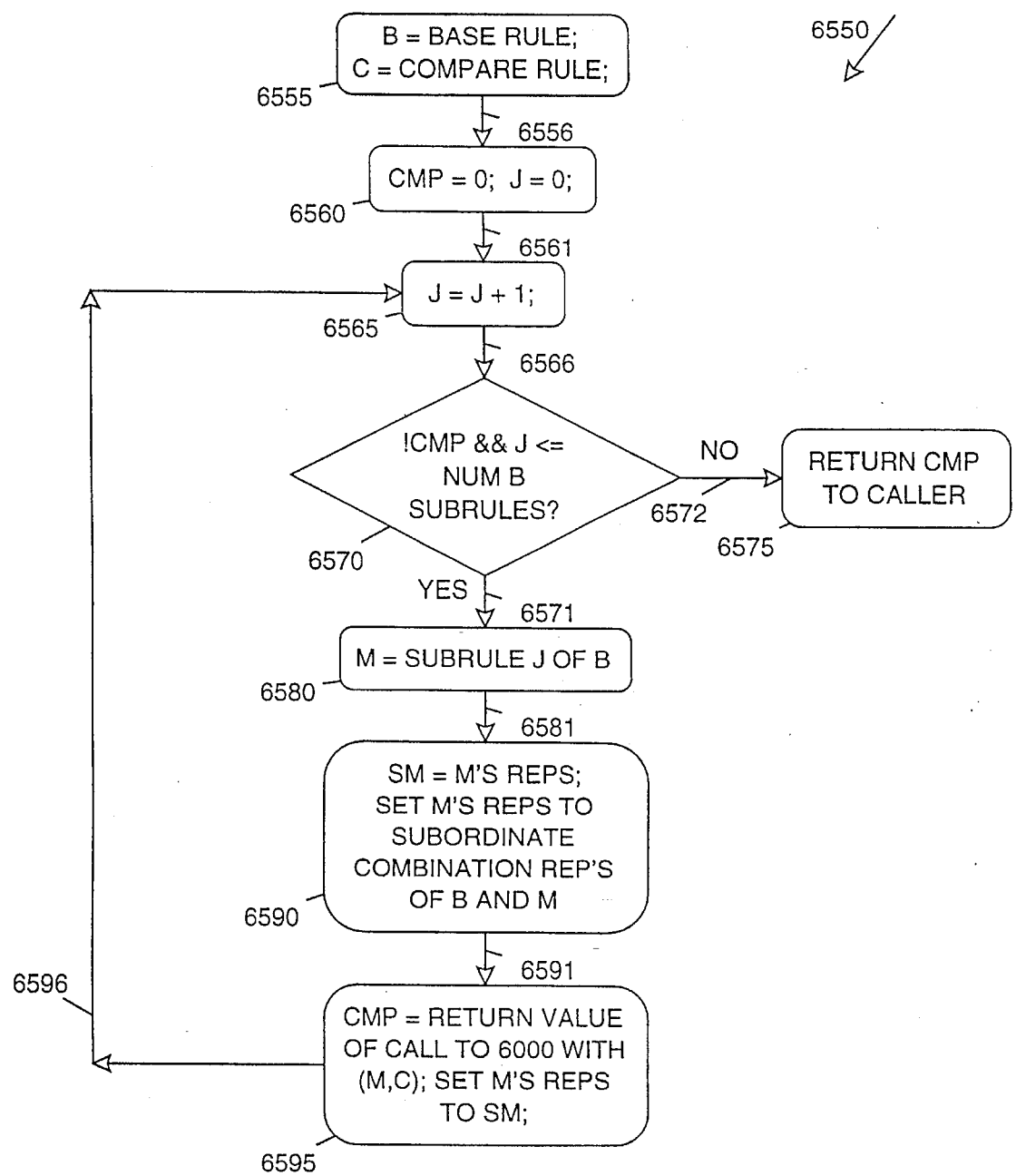
FIG. 24 is a flow chart of a routine which is called from the flow chart of FIG. 19.

Referring to FIG. 24, the procedure identified at 6550 in connection with blocks 6065 and 6075 in FIG. 19 is illustrated. In this regard, the procedure is called where the base B is an OR nile and the comparison rule is an element rule, or the comparison element is an AND rule. Thus, the comparison provides for the subsumption of either an element rule or an AND rule by an OR rule. The procedure is commenced at block 6555 where B is set as the base rule which is an OR rule and C is set as the comparison rule. Then, as represented at line 6556 and block 6560, the compare flag, CMP is set to zero and the base rule pointer J is set to zero. In general, inasmuch an OR rule is intended to subsume an element or an AND rule, only one matching is called for. Accordingly, as represented at line 6561 and block 6565, the base rule pointer J is incremented and, as represented at line 6566 and block 6570, a test is set forth wherein a true condition obtains if the comparison, CMP is zero, and the pointer J is less than the number of subrules in B. In the event that this condition is true, then as represented at line 6571 and block 6580, M is made the subrule J of B and, as represented at line 6581 and block 6590, the repetition symbols of M are saved as SM and, M's repetition symbols are .set to a subordinate combination of the symbols of B and M as discussed in connection with Table 2. The program then continues as represented at line 6591 where the comparison, CMP, is set as the return value of a call to the program 6000 with M and C. Additionally, M's repetition symbol is set to that saved, SM, and as represented at line 6596, the program continues to block 6565 and the incrementation of the pointer J. With a successful comparison during the looping via line 6596, the test at block 6570 will eventually fail and, as represented at line 6572 and block 6575, CMP is returned to the caller as the result.

Figure 25:
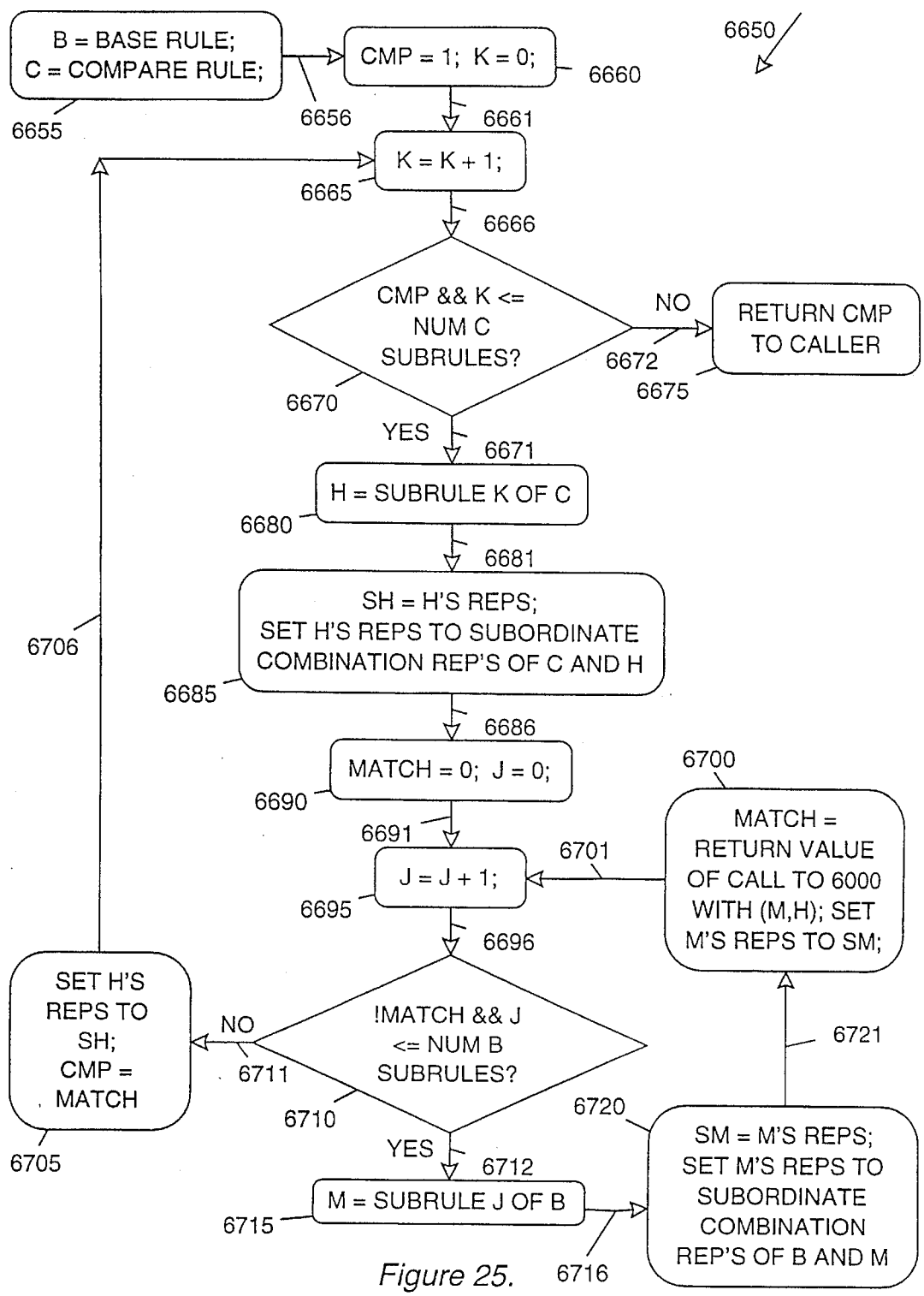
FIG. 25 is a flow chart of a routine which is called from the flow chart of FIG. 19.

Referring to FIG. 25, the procedure identified at 6650 which is called in conjunction with block 6085 of FIG. 19 is illustrated. This procedure calls for the comparing of a base rule which is an OR rule with a comparison rule which is an OR rule. The procedure commences at block 6655 where B is set as the base rule and C is set as the comparison rule. Then, as represented at line 6656 and block 6660, a successful comparison initially is assumed. Thus CMP is set to 1 and the comparison rule pointer K is set to zero. Then, as represented at line 6661 and block 6665, the pointer K is incremented by 1 and, as represented at line 6666 and block 6670, a test is posed that the comparison is valid and that pointer K is less than or equal to the number of subrules in C. Where that is true, then as represented at line 667 1 and block 6680, H is set as the subrule K of the comparison rule C. Then, as represented at line 6681 and block 6685, the repetition symbol or symbols of the Kth subrule of the comparison rule C which is H is saved as SH. The repetition symbols of H are set to the subordinate combination of the repetition symbols of C and H. Then, as represented at line 6686 and block 6690, the number of matches, MATCH, is set to zero and the pointer J of the base rule is set to zero. Then, as represented at line 6691 and block 6695 the pointer J of the base rule is incremented by 1, and as represented at line 6696 and block 6710, a test is posed for the condition of a match failure and where J is less than or equal to the number of subrules in B. Where that test fails, then as represented at line 6711 and block 6705, H's repetition symbol or symbols is set to the saved repetition symbol and compare CMP is set to the value of MATCH. The program loops to block 6665 as represented at line 6706 and K is incremented. Thus, for each position identified by the pointer K, all of the J defined comparison subrules are compared until a match is found. Returning to block 6710, where there still remains no match and J is still less than the number of subrules in B then as represented at line 6712 and block 6715, M is set as the subrule J of B. Then, as represented at line 6716 and block 6720, the repetition symbol of M is saved as SM and M's repetition symbols are set to a subordinate combination of the repetition symbols of B and M as discussed in connection with Table 2 above. The procedure then continues as represented at line 6721 and block 6700 where MATCH is set as a return value of a call to the program 6000 of FIG. 19 with M and H. The repetition symbols of M then are set to those saved as SM and, as represented at line 6701, the program returns to block 6695 and the incrementation of the pointer J by 1. This continues until the test posed at block 6710 fails and the procedure continues as represented at line 6706 ultimately to a failure of the test at block 6670. Then, as represented at line 6672 and block 6675, the value of CMP is returned to the caller.

Since certain changes may be made in the above-described method without departing from the scope of the invention herein involved, it is intended that all matter contained in the description thereof or shown in the accompanying drawings shall be interpreted as illustrative and not in a limiting sense.

I claim:

1. The method for generating a corpus grammar for a collection of document records with grammatical structure components identified by start and end tags, comprising the steps of:

extracting said start and end tags from samples of said records and forming a tag list therefrom;

matching each start tag of said list with a corresponding end tag with respect to each of said records to derive matched tags, said matched tags representing a tag structure of grammar elements paired in a parent-child defined relationship; and accumulating said grammar elements represented by said matched tags of said tag structures as corresponding rules substantially exhibiting hierarchical tree structures to establish a corpus grammar.

2. The method of claim 1 in which said step for extracting said start and end tags includes the steps of:

identifying an initial start character of a said tag;

identifying a second character next occurring after said start character, determining whether said second character is an end tag defining character, identifying a next occurring end character, adding a said start tag to said tag list when said second character is not an end tag character, and adding a said end tag to said tag list when said second character is an end tag defining character.

3. The method of claim 2 including the steps of:

identifying a next start character occurring subsequent to said initial start character, determining if said next start character occurs leftwardly of said end character; and identifying the presence of a stray start character when said next start character occurs leftwardly of said end character.

4. The method of claim 3 including the step of adding a text identifying tag to said tag list when said next start character does not occur leftwardly of said end character.

5. The method of claim 2 including the steps of:

determining whether said second character is an alphabetical character;

then carrying out said step determining whether said second character is an end tag determining character, and identifying a next occurring start character as an initial said start character when said second character is determined not to be a said alphabetical character and not to be a said end tag defining character.

6. The method of claim 1 in which said step for deriving matched tags further includes the steps of:

acquiring a given tag from a sequence of tags of said tag list; determining whether said given tag is a start tag; locating said given tag at the top of a first-in-first-out stack when it is determined to be a start tag;

acquiring a next tag which is next in sequence to said given tag;

determining whether said next tag is an end tag or a start tag;

determining when said next tag is an end tag, whether said next tag is a match with said given tag at a said stack in the relationship of end tag to start tag; and removing said given tag from said stack in the presence of a said match and identifying its relation to said next tag.

7. The method of claim 6 including the steps of:

providing a hierarchical root list; and adding said next tag to said root list when said next tag is determined to be a start tag and no said given tag is located at the top of said stack.

8. The method of claim 6 including the step of identifying said next tag as a hierarchical child at said given tag when said given tag is located at the top of said stack and said next tag is determined to be a start tag.

9. The method of claim 8 including the step of locating said next tag which is identified as a hierarchical child at the top of said stack.

10. The method of claim 6 including the steps of:

creating an empty end tag when said next tag is determined to be an end tag which is not a match with said given tag at said stack; and removing said given tag from said stack and identifying a start tag-end tag relation between it and said empty end tag.

11. The method of claim 6 including the steps of:

creating an empty end tag when a said next tag is not available for said step for acquiring a next tag; and removing said given tag from said stack and identifying a start tag-end tag relation between it and said empty end tag.

12. The method of claim 6 including the steps of:

creating an end tag which matches said given tag located at the top of said stack when said next tag is determined to be an end tag which is not a match with said given tag and a text identifying tag occurs next following said given tag in said tag list; and removing said given tag from said stack and identifying a start tag-end tag between it and said created end tag.

13. The method of claim 6 including the steps of:

providing a hierarchical root list;

adding said next tag to said root list when said next tag is determined to be a start tag and no said given tag is at the top of said stack;

identifying said next tag as a hierarchical child of said given tag when said given tag is located at the top of said stack and said next tag is determined to be a start tag; and said step of accumulating said grammar elements includes the steps of:

designating the grammar element of a said next tag with in said root list as a grammar root;

identifying the grammar element of the next occurring start tag of said tag structure;

identifying the next said hierarchical child of said start tag having said identified grammar element; and adding the grammar element of said identified next hierarchical child to an AND rule for said identified grammar element.

14. The method of claim 13 including the steps of:

creating a master root grammar element when there exists more than one entry within said root list; and adding each said grammar element of each said next tag within said root list to an AND rule for said master root grammar element.

15. The method for reducing the number of rules of a sample grammar present as an electronic compilation of grammar elements associated as AND and element rules within a hierarchical document describing tree smacture, comprising the steps of:

(a) acquiring a said grammar element with a rule, R, of a given type of said tree structure from said sample grammar, (b) applying a reduction guide selected recursive reduction procedure to .. said rule R and subrules thereof of said acquired grammar element;

(c) removing any of said subrules when said applied reduction procedure has eliminated them from said rule R of said acquired grammar element;

(d) acquiring a next said grammar element and reiterating the aforesaid steps a–c.

16. The method of claim 15 in which said step for applying a recursive reduction procedure includes the step of applying a single and empty reduction effecting the removal of element rules combined as subrules with said acquired grammar element rule, R.

17. The method of claim 15 in which said step for applying a recursive reduction procedure includes the step of applying a collapse ANDs reduction procedure wherein:

a determination is made as to whether the rule R of said acquired grammar element and the subrules thereof are AND rules and that there are no repetitions of said AND subrules; and each subrule of said AND subrule is made to be said AND subrule.

18. The method of claim 17 in which said collapse ANDs reduction procedure is carried out subsequent to the execution of a single and empty reduction procedure effecting the removal of element rules combined as subrules with said acquired grammar element rule, R.

19. The method of claim 15 in which said step for applying a recursive reduction procedure includes the step of applying a collapse OR's reduction procedure wherein:

a determination is made as to whether the rule R of said acquired grammar element and the subrule NS thereof is an OR rule and whether the repetition characteristic of said OR rule R subsumes the repetition characteristics of said OR subrule NS; and in the event that the said rule R and subrules NS are OR rules, and said subsumption is available, then each subrule of said OR subrule NS is made said OR subrule.

20. The method of claim 19 in which said collapse OR's reduction procedure is carried out subsequent to the execution of a collapse AND's reduction procedure.

21. The method of claim 15 in which said step for applying a recursive reduction procedure includes the step of applying a repeating reduction procedure wherein:

a determination is made as to whether the rule, R, of said acquired grammar element is an AND rule or an OR rule;

when said rule, R, of said acquired grammar element is an AND rule, then subrule B, the first subrule of R, is acquired with its repetition symbol, and the subrule NS, the next rule of rule R is acquired with its repetition symbol;

a determination is made whether the subrule B is the same as the subrule NS excepting the said repetition symbol of each;

in the event subrule B is the same as subrule NS, said repetition symbol of subrule B is combined as a peer with said repetition symbol of NS to derive a resulting repetition symbol which is made the repetition symbol of subrule B; and subrule NS is removed.

22. The method of claim 21 wherein the steps set forth therein are iterated for all subrules of rule R.

23. The method of claim 21 in which:

said rule, R of said acquired grammar element is determined to be an OR rule;

then subrule C, a subrule of rule R is acquired with its repetition symbol, and another subrule of rule R, subrule N is acquired with its repetition symbol;

a determination is made whether the subrule C is the same as the subrule N excepting the said repetition symbol of each;

in the event subrule C is the same as subrule N, said repetition symbol of subrule C and said repetition symbol of subrule N are combined as subordinates to derive a resulting repetition symbol which is made the repetition symbol of subrule C; and subrule N is removed.

24. The method of claim 21 in which said step of applying a repeating reduction procedure is carried out subsequent to the execution of a collapse OR's reduction procedure, a collapse AND's reduction procedure, and a single and empty reduction procedure.

25. The method of claim 15 in which said step for applying a recursive reduction procedure includes the step of applying a redundant reduction procedure wherein:

a determination is made with respect to whether the rule R of said acquired gammar element is an OR rule;

where rule R is determined to be an OR rule, then each subrule B thereof, designated as a base subrule, is compared with each other subrule C thereof designated as a compare subrule to determine if the subrule B subsumes the subrule C; and where subrule B subsumes subrule C, then subrule C is removed from the subrules of rule R.

26. The method of claim 25 in which said redundant reduction procedure is the last reduction carried out as part of said step for applying a reduction procedure.

27. The method of claim 19 or 25 in which said step for applying a reduction procedure includes the step of applying a PCDATA to OR's reduction procedure wherein:

a determination is made as to whether the rule R of said acquired grammar element and a subrule NS thereof at any depth within said tree structure contain a text identifier tag;

all said subrules NS at any depth within said tree structure which are AND subrules are changed to OR subrules and any repetition symbol of any said subrule NS at any depth within said tree structure is changed to one when said rule R or any said subrule NS contains a said text identifier tag;

then, said step of applying a said collapse OR's reduction is carried out with respect to said rule R;

then, a repetition symbol of one or more is applied to said rule R; and then, said step of applying a redundant reduction procedure is carried out with respect to said rule R.

28. The method of claim 27 including the steps of:

determining whether said rule R is an element rule subsequent to said step of applying a redundant reduction procedure; and setting the repetition symbol of rule R to one where rule R is determined to be an element rule.

29. The method of claim 27 in which said step of applying a PCDATA to OR's reduction procedure is carried out subsequent to the execution of a repeating reduction procedure, a collapse OR's reduction procedure, a collapse AND's reduction procedure, and a single and empty reduction procedure.

30. The method of claim 15 in which said step for applying a recursive reduction procedure includes the step of applying an identical bases reduction procedure which comprises the steps of:

determining whether the rule R of said acquired grammar element is an OR rule;

when said rule R is determined to be an OR rule, then comparing each subrule B thereof, designated as a base subrule, with each other subrule NS thereof to determine if the subrule B has the same subrule bases as the subrule NS;

where subrule B has the same subrule base as the subrule NS, then combining the repetition symbols of subrule B and subrule NS as subordinates, combining the base repetition symbols of subrule B and NS per base as subordinates, placing all repetition symbols resulting from such combinations in subrule B, and removing subrule NS.

31. The method of claim 15 in which said step for applying a recursive reduction procedure includes the step of applying an off-by-one reduction procedure which comprises the steps of:

determining whether the rule R of said acquired grammar element is an OR rule;

providing an add rules list;

providing a remove rules list;

when said rule R is determined to be an OR rule, then acquiring each subrule B thereof which is an AND rule and acquiring each other subrule C thereof, comparing each acquired subrule B with each acquired subrule C and determining from said comparison whether they differ by one subrule M of subrule B;

identifying said differing one base component when said acquired subrule B and said acquired subrule C differ by one base component;

generating a new rule formed of acquired subrule B with said differing one subrule M having a zero-based repetition symbol;

adding said new rule to said add rules list;

adding said acquired said rule B and said acquired subrule C to said remove rules list;

when all said subrules B have been compared with all said subrules C, removing said subrules of said remove rules list and adding said rules of said add rules list as subrules of said rule R;

then emptying said remove rules list and said add rules list; and repeating the above steps until said step for adding said new rule to said add rules list does not occur.

32. The method of claim 31 in which said step of comparing each acquired subrule B with each acquired subrule C includes the steps of:

determining whether subrule M of subrule B subsumes said subrule C when said subrule C is not an AND rule;

when a said subrule M does not subsume said subrule C, then determining whether said subrule M has a zero-based repetition symbol;

when said subrule M does not have a zero-based repetition symbol, then identifying said subrule M;

then, carrying out said step for generating a new rule.

33. The method of claim 31 in which said step of comparing each acquired subrule B with each acquired subrule C includes the steps of:

determining whether subrule M of subrule B subsumes subrule H of subrule C;

when said subrule M does subsume said subrule H, then the repetition symbol of subrule M is saved as SM, said symbol of subrule M is set to the subordinate combination repetition symbol of the repetition symbols of subrule B and subrule M, the repetition symbols of subrule B and subrule M, the repetition symbols of subrule H are saved as SH, and said symbols of subrule H are set to the subordinate combination repetition symbol of the repetition symbols of subrules C and H;

then, determining whether subrule M subsumes subrule H, subsequently restoring the respective saved repetition symbols SM and SH; and then carrying out said step of generating a new rule.

34. The method of claims 16, 17, 19, or 25 including the steps of:

determining whether rule R has only one subrule NS;

when rule R is determined to have only one subrule NS, then combining the repetition symbols of rule R and subrule NS as subordinates, placing the resulting repetition symbol on rule R, and setting the type of rule R to the type of subrule NS; and when the type of rule R has been set to the type of subrule NS, removing subrule NS as a subrule of R and moving all subrules of subrule NS to rule R.

35. The method of claim 25 or 32 or 33 in which a determination of subsumption of two rules, said base subrule B and said compare rule C, includes the steps of:

determining whether said base rule B is an element rule;

carrying out a first subsumption analysis with respect to compare rule C when said base rule B is an element rule;

determining whether the base rule B is an AND rule;

carrying out a second subsumption analysis when said base rule B is an AND rule and said compare rule C is an element rule;

carrying out a third subsumption analysis when said base rule B is an AND and rule C and said compare rule is an AND rule;

carrying out a fourth subsumption analysis when said base rule B is an AND rule and said compare rule C is an OR rule;

determining whether base rule B is an OR rule;

carrying out a fifth subsumption analysis when said base rule B is an OR rule and said compare rule C is an element rule;

carrying out a fifth subsumption analysis when said base rule B is an OR rule and said compare rule C is an AND rule; and carrying out said sixth subsumption analysis when said base rule B is an OR rule and said compare mile C is an OR rule.

36. The method of claim 35 in which said first subsumption analysis includes the steps of:

determining whether compare rule C is an element rule;

when compare rule C is an element rule, determining whether base rule B and compare rule C exhibit a common element; and when compare rule C and base rule B exhibit a common element, and when said repetition symbols of base rule B subsumes said repetition symbol of compare rule C, then indicating the presence of said subsumption.

37. The method of claim 35 in which said second subsumption analysis includes the steps of:

determining whether each subrule NS of base rule B is an element rule and whether a said subrule NS and said compare rule C exhibit a common element;

incrementing a comparison match count value NUM when a said subrule NS and said compare rule C exhibit a common element;

indicating the presence of a valid subsuming comparison CMP when the said repetition symbol of a said subrule NS is zero based and said comparison match value NUM is not incremented;

incrementing a zero-based count value ZEROS when the said repetition symbol of a said subrule NS is zero-based and said comparison match count value NUM has been incremented;

incrementing a more-based count value, MORES when the said repetition symbol of a said subrule NS is more-based and said comparison match count value NUM has been incremented; and then redetermining the presence of a valid comparison CMP when the said comparison match value NUM less the count value, ZEROS is less than or equal to one.

38. The method of claim 37 including the steps of:

confirming the redetermined presence of said valid comparison CMP when the repetition symbol of compare rule C is zero or one and the match count value NUM equals the zero-based count value, ZEROS or when the repetition symbol of base rule B is zero-based;

confirming the redetermined presence of said valid comparison CMP when the repetition symbol of compare rule C is one or more and the more-based count value MORES is at least one, or when the repetition symbol of base rule B is more-based; and confirming the redetermined presence of said valid comparison CMP when the repetition symbol of compare rule C is zero or more and the said comparison match count value NUM equals the zero-based count value ZERO or the repetition symbol of the base rule B is zero based, and the said more-based count value MORES is at least one or the repetition symbol of base rule B is more-based.

39. The method of claim 35 in which said third subsumption analysis includes the steps of:

initially indicating the presence of a subsuming comparison CMP when the number of subrules of said base rule B is greater than the number of subrules of said compare rule C;

setting an indexible pointer J to sequentially identify the subrules M of base rule B;

setting an indexible pointer K to sequentially identify the subrules H of compare rule C;

carrying out a test upon each incrementation of pointers J and K for the said presence of said comparison CMP and the condition that the value of pointer J is less than or equal to the number of subrules M of base rule B, and that the value of pointer K is less than or equal to the number of subrules H of compare rule C;

when said test fails for the reason that the value of pointer K is not less than or equal to the number of subrules H of compare rule C, then indicating the presence of a valid comparison CMP when all remaining subrules M of base rule B are zero-based;

when said test is true, carrying out a said first, second, third, fourth, fifth, or sixth subsumption analysis for said subrule M as a base rule and said subrule H as a compare rule to determine the presence of a subrule comparison CMP;

in the presence of a said subrule comparison CMP, saving the repetition symbols SM of subrule M and setting the repetition symbol of subrule M as a subordinate combination of the repetition symbols of base rule B and subrule M;

in the presence of said subrule comparison CMP, saving the repetition symbol SH of subrule H and setting the repetition symbol of subrule H as a subordinate combination of the repetition symbols of compare rule C and subrule H;

then, carrying out a said first, second, third, fourth, fifth, or sixth subsumption analysis for said subrule M as a base rule and said subrule H as a compare rule;

then, in the presence of a subsuming comparison CMP of said subrule M and said subrule H, setting the repetition symbol of subrule M to said repetition symbol SM and the repetition symbol of subrule H to said repetition symbol SH; and indicating the presence of a subsuming comparison CMP when the repetition symbol of subrule M is zero-based, in the presence of a previous failure of the comparison CMP.

40. The method of claim 35 in which said fourth subsumption analysis includes the steps of:

determining the presence of the condition wherein any repetition symbol of said base rule B subsumes the repetition symbol of the compare rule C; and in the presence of said condition, carrying out a said first, second, third, fourth, fifth, or sixth subsumption analysis for said base rule B and each subrule of said compare rule C.

41. The method of claim 35 in which said fifth subsumption analysis includes the steps of:

saving the repetition symbol of each subrule M of said base rule B as SM, and setting the repetition symbol of each subrule M to the subordinate combination of the repetition symbol of base rule B and said subrule M;

carrying out a said first, second, third, fourth, fifth, or sixth subsumption analysis for a said subrule M as a base rule and said compare rule C; and identifying an initial subsuming comparison CMP from said subsumption analysis as a valid comparison, CMP and setting said repetition symbol SM as the repetition symbol of corresponding subrule M.

42. The method of claim 35 in which said sixth subsumption analysis includes the steps of:

saving the repetition symbol of each subrule H of said comparison rule C as SH, and setting the repetition symbol of each said subrule H to the subordinate combination of the repetition symbol of compare rule C and subrule H;

saving the repetition symbol of each subrule M of said base rule B as SM, and setting the repetition symbol of each said subrule M to a subordinate combination of the repetition symbol of base rule B and said subrule M;

carrying out a said first, second, third, fourth, fifth or sixth subsumption analysis for each said subrule M with respect to each said subrule H until a valid subsuming comparison CMP is determined;

setting said repetition symbol SM as the repetition symbol for the corresponding subrule M; and setting said repetition symbol SH as the repetition symbol for the corresponding subrule H.

43. The method for generating a corpus grammar for a collection of document records with grammatical structure components identified by start and end tags, and for reducing the number of rules of said grammar, comprising the steps of:

(a) extracting said start and end tags from samples of said records and forming a tag list therefrom;

(b) matching each start tag of said list with a corresponding end tag with respect to each of said records to derive matched tags, said matched tags representing a tag structure of grammar elements paired in a parent-child defined relationship;

(c) accumulating said grammar elements represented by said matched tags of said tag structures as corresponding AND and element rules substantially exhibiting hierarchical tree structures to establish a corpus grammar, (d) acquiring a said grammar element with a rule, R of a given type of said tree structure from said corpus grammar, (e) applying a reduction guide selected recursive reduction procedure to said rule R and subrules thereof of said acquired grammar element;

(f) removing any of said subrules when said applied reduction procedure has eliminated them from said rule R of said acquired grammar element;

(g) acquiring a next said grammar element and reiterating the aforesaid steps d–f.

* * * * *